US012677288B2

(12) United States Patent
Kwak et al.

(10) Patent No.: US 12,677,288 B2
(45) Date of Patent: Jul. 7, 2026

(54) BASE STATION, USER EQUIPMENT, AND METHODS FOR COMMUNICATING TRANSMISSION TIME INTERVAL CONTROL INFORMATION

(71) Applicant: Samsung Electronics Co., Ltd., Gyeonggi-do (KR)

(72) Inventors: Youngwoo Kwak, Gyeonggi-do (KR); Jeongho Yeo, Gyeonggi-do (KR); Sungjin Park, Gyeonggi-do (KR); Juho Lee, Gyeonggi-do (KR); Jinyoung Oh, Gyeonggi-do (KR); Hoondong Noh, Gyeonggi-do (KR); Taehan Bae, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 442 days.

(21) Appl. No.: 18/122,967

(22) Filed: Mar. 17, 2023

(65) Prior Publication Data

US 2023/0254872 A1     Aug. 10, 2023

Related U.S. Application Data

(63) Continuation of application No. 16/477,680, filed as application No. PCT/KR2018/000462 on Jan. 10, 2018, now abandoned.

(30) Foreign Application Priority Data

Jan. 17, 2017  (KR) ........................ 10-2017-0008315
Jan. 18, 2017  (KR) ........................ 10-2017-0008887
Jun. 14, 2017  (KR) ........................ 10-2017-0074903

(51) Int. Cl.
*H04W 72/23*     (2023.01)
*H04B 7/06*     (2006.01)
(Continued)

(52) U.S. Cl.
CPC .......... *H04W 72/23* (2023.01); *H04B 7/0626* (2013.01); *H04L 1/18* (2013.01); (Continued)

(58) Field of Classification Search
CPC ............. H04W 72/23; H04W 72/0446; H04W 72/0453; H04W 72/1273; H04W 72/20; (Continued)

(56) References Cited

U.S. PATENT DOCUMENTS

2010/0080137 A1      4/2010   Vedantham
2010/0260081 A1 *   10/2010   Damnjanovic ....... H04L 5/0053
                                                                        455/70
(Continued)

FOREIGN PATENT DOCUMENTS

CN          103843260          6/2014
CN          104620518          5/2015
(Continued)

OTHER PUBLICATIONS

PCT/ISA/210 Search Report dated Apr. 11, 2018 issued on PCT/KR2018/000462, pp. 5.
(Continued)

*Primary Examiner* — Omar J Ghowrwal
(74) *Attorney, Agent, or Firm* — The Farrell Law Firm, P.C.

(57) ABSTRACT

The present disclosure relates to a method performed by user equipment (UE) in a communication system, the method including receiving, from a base station, control information on a frequency region configured by system information, wherein the control information defines a transmission time interval for a physical downlink shared channel (PDSCH) among a plurality of transmission time intervals, identifying a transport block size associated with a number of symbols, and receiving, from the base station, the PDSCH associated
(Continued)

1 subframe = 14 OFDM symbols = 1 msec

1 RB = 12 subcarriers = 180kHz

C
D
A     E     I
B     F     J
      G
      H
      C
      D
A     E     I
B     F     J
      G
      H

CRS  ⟶ 100
DMRS ⟶ 110
PDSCH ⟶ 120
CONTROL CHANNEL ⟶ 130
CSI-RS/MUTING ⟶ 140

CONTROL REGION ⟶ 150     DATA REGION ⟶ 160 with the transport block size in the number of symbols from a start symbol based on the resource allocation information, wherein the resource allocation information indicates the start symbol of the transmission time interval, and the transmission time interval is defined based on the number of symbols from the start symbol.

12 Claims, 33 Drawing Sheets

(51) Int. Cl.

| | |
|---|---|
| H04L 1/18 | (2023.01) |
| H04L 1/1867 | (2023.01) |
| H04L 5/00 | (2006.01) |
| H04W 24/10 | (2009.01) |
| H04W 72/0446 | (2023.01) |
| H04W 72/0453 | (2023.01) |
| H04W 72/1273 | (2023.01) |
| H04W 72/20 | (2023.01) |
| H04L 1/1822 | (2023.01) |
| H04L 1/1829 | (2023.01) |

(52) U.S. Cl.
CPC .......... *H04L 5/0007* (2013.01); *H04L 5/0044* (2013.01); *H04L 5/0048* (2013.01); *H04L 5/0053* (2013.01); *H04L 5/0055* (2013.01); *H04L 5/0094* (2013.01); *H04L 5/0098* (2013.01); *H04W 24/10* (2013.01); *H04W 72/0446* (2013.01); *H04W 72/0453* (2013.01); *H04W 72/1273* (2013.01); *H04W 72/20* (2023.01); *H04L 1/1822* (2013.01); *H04L 1/1835* (2013.01); *H04L 1/1845* (2013.01); *H04L 1/1854* (2013.01); *H04L 1/1864* (2013.01)

(58) Field of Classification Search
CPC ........ H04W 24/10; H04L 1/18; H04L 1/1822; H04L 1/1835; H04L 1/1845; H04L 1/1854; H04L 1/1864; H04L 5/0007; H04L 5/0048; H04L 5/0053; H04L 5/0055; H04L 1/1887; H04L 5/0044; H04L 5/0094; H04L 5/0098; H04L 5/0057; H04B 7/0626
See application file for complete search history.

(56) References Cited

U.S. PATENT DOCUMENTS

| | | |
|---|---|---|
| 2011/0090808 A1 | 4/2011 | Chen |
| 2011/0194523 A1 | 8/2011 | Chung |
| 2013/0195041 A1 | 8/2013 | Papasakellariou |
| 2013/0242817 A1 | 9/2013 | He |
| 2014/0126490 A1 | 5/2014 | Chen |
| 2014/0204825 A1 | 7/2014 | Ekpenyong |
| 2014/0219238 A1 | 8/2014 | Park et al. |
| 2014/0247816 A1 | 9/2014 | Kim |
| 2014/0254410 A1 | 9/2014 | Seo |
| 2015/0078272 A1 | 3/2015 | Kim et al. |

| | | |
|---|---|---|
| 2015/0172022 A1 | 6/2015 | Guo |
| 2015/0319776 A1 | 11/2015 | Seo |
| 2016/0128028 A1 | 5/2016 | Mallik et al. |
| 2017/0135116 A1 | 5/2017 | Kuchibhotla |
| 2017/0164384 A1* | 6/2017 | Wang .................... H04L 5/0053 |
| 2017/0290008 A1 | 10/2017 | Tooher et al. |
| 2018/0063865 A1 | 3/2018 | Islam |
| 2018/0234213 A1 | 8/2018 | Han |
| 2018/0242317 A1 | 8/2018 | Marinier |
| 2018/0317250 A1* | 11/2018 | Yi .......................... H04L 5/0082 |
| 2019/0181986 A1 | 6/2019 | Kitamura |
| 2019/0297601 A1 | 9/2019 | You |

FOREIGN PATENT DOCUMENTS

| | | | |
|---|---|---|---|
| WO | WO 2016/040290 | 3/2016 | |
| WO | WO-2016040290 A1 * | 3/2016 | ........... H04L 1/0003 |

OTHER PUBLICATIONS

PCT/ISA/237 Written Opinion dated Apr. 11, 2018 Issued on PCT/KR2018/000462, pp. 6.
Huawei, HiSilicon, 3GPP TSG RAN WG1 Meeting #86bis, R1-1608837, Lisbon, Portugal, Oct. 1, 2016, "Discussion on slot and mini-slot", pp. 6.
Samsung, 3GPP TSG RAN WG1#87, R1-1612438, Reno, USA, Nov. 4, 2016, "Slot Aggregation", pp. 4.
CATT, 3GPP TSG RAN WG1 Meeting #87, R1-1611366, Reno, NV, USA, Nov. 5, 2016, "NR Time domain structure: slot and mini-slot and time interval", pp. 7.
Huawei, HiSilicon, 3GPP TSG RAN WG1 Meeting #87, R1-1611662, Reno, USA, Nov. 5, 2016, "Scheduling scheme for slot aggregation", pp. 6.
NTT DOCOMO, Inc., "Mini-slot for Analog Beam-Forming". R1-1700629, 3GPP TSG RAN WG1 AH_NR Meeting, Jan. 16-20, 2017, 6 pages.
Ericsson, "HARQ Process Operation with Legacy TTIs, Reduced Processing, and TTIs", R2-168625, 3GPP TSG-RAN WG2 #96, Nov. 14-18, 2016, 4 pages.
European Search Report dated Nov. 13, 2019 issued in counterpart application No. 18741105.3-1219, 9 pages.
Chinese Office Action dated Jun. 1, 2021 issued in counterpart application No. 201880007084.8, 16 pages.
European Search Report dated Mar. 25, 2022 issued in counterpart application No. 18741105.3-1205, 8 pages.
CN Rejection Decision dated Oct. 26, 2022 issued in counterpart application No. 201880007084.8, 11 pages.
3GPP TS 136.213, LTE Evolved Universal Terrestrial Radio Access (E-UTRA); Phyiscal layer procedures, Version 13.2.0 (Year: 2016).
A new packet scheduling scheme and performance analysis of high speed packet data access, Sarvagya et al., IEEE Tencon 2008 (Year: 2008).
CN Decision of Reexamination dated Apr. 1, 2024 issued in counterpart application No. 201880007084.8, 29 pages.
Indian Notice of Hearing dated Sep. 1, 2023 issued in counterpart application No. 201937028694, 2 pages.
CN Notification of Reexamination dated Sep. 28, 2023 issued in counterpart application No. 201880007084.8, 14 pages.

* cited by examiner

FIG. 1
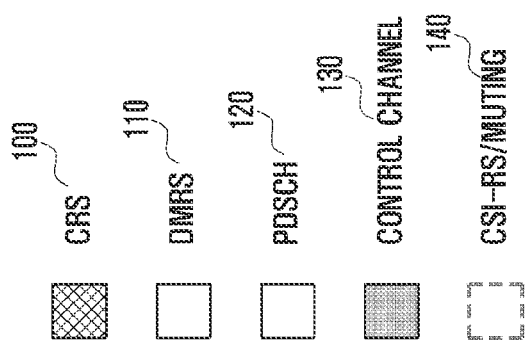
CRS — 100
DMRS — 110
PDSCH — 120
CONTROL CHANNEL — 130
CSI-RS/MUTING — 140
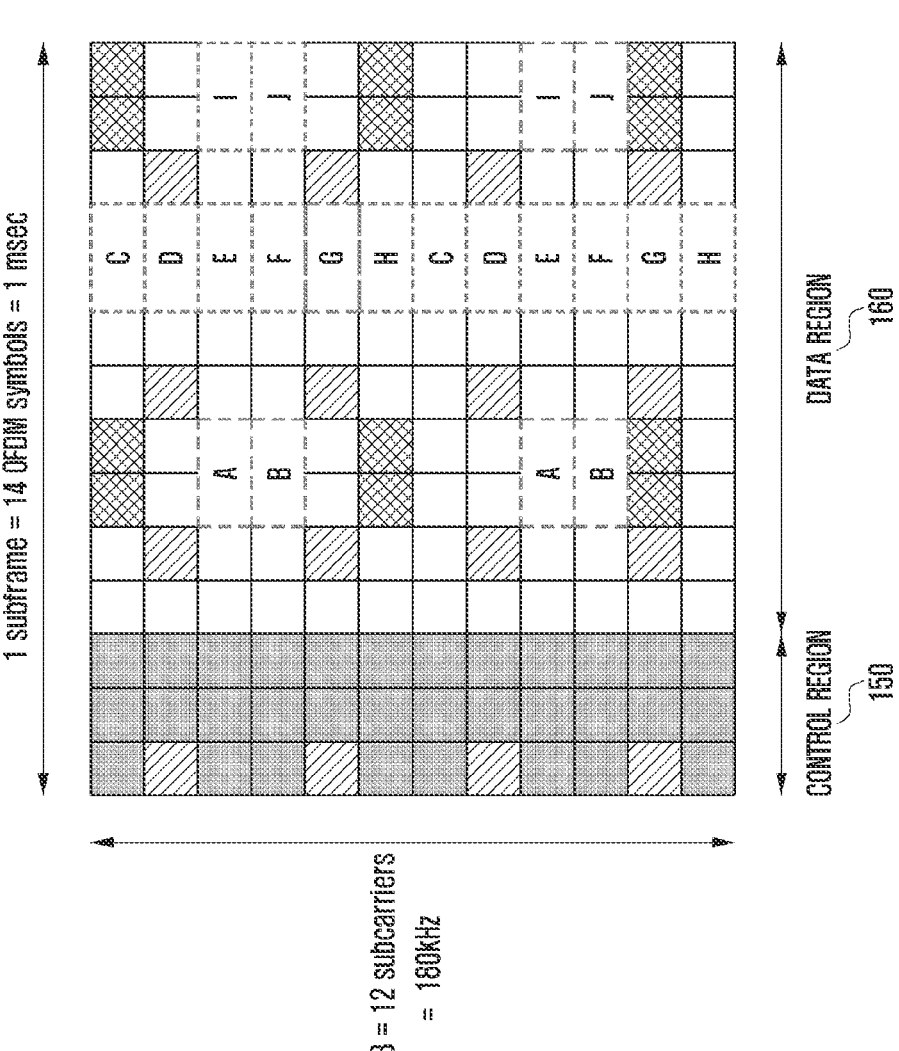
1 subframe = 14 OFDM symbols = 1 msec
1 RB = 12 subcarriers = 180kHz
CONTROL REGION 150
DATA REGION 160

FIG. 10

FIG. 11
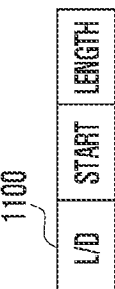

FIG. 14

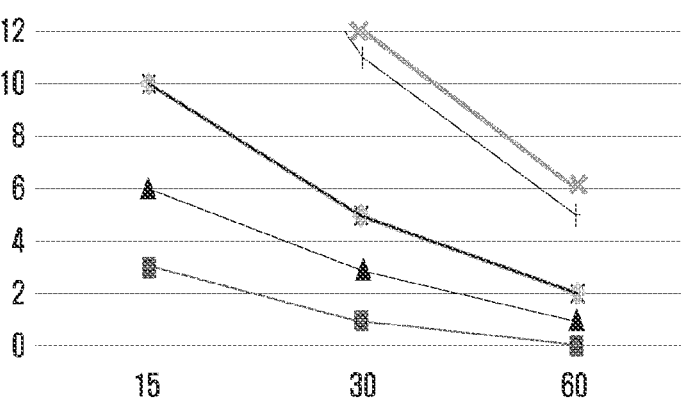

Subcarrier spacing [kHz]

-✛- TDL-C (Uma, normal delay), f=2GHz
-■- TDL-C (Uma, long delay), f=2GHz
-▲- ETU, f=2GHz
-✳- TDL-B (Umi, long delay), f=2GHz
-✳- TDL-C (Uma, normal delay), f=6GHz
-○- TDL-C (Uma, long delay), f=6GHz
-+- TDL-B (Umi, long delay), f=6GHz

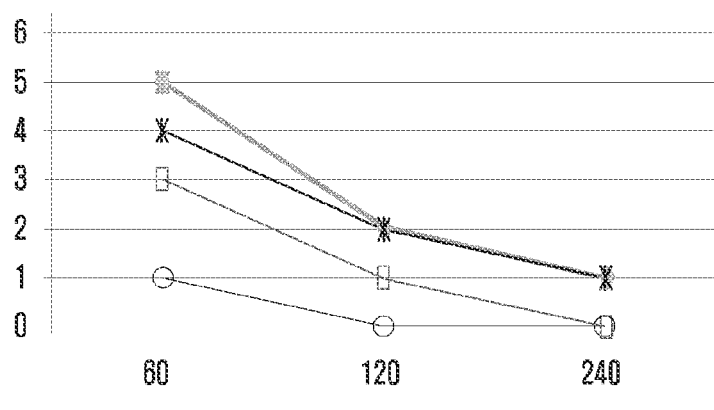

Subcarrier spacing [kHz]

-✛- TDL-B (Umi, long delay), f=28GHz
-□- TDL-C (Uma, normal delay), f=28GHz
-▲- TDL-C (Uma, long delay), f=28GHz
-✳- TDL-B (Umi, long delay), f=70GHz
-✳- TDL-C (Uma, normal delay), f=70GHz
-○- TDL-C (Uma, long delay), f=70GHz

FIG. 29

BASE STATION, USER EQUIPMENT, AND METHODS FOR COMMUNICATING TRANSMISSION TIME INTERVAL CONTROL INFORMATION

PRIORITY

This application is a Continuation Application of U.S. patent application Ser. No. 16/477,680, filed Jul. 12, 2019, which is a National Phase Entry of PCT International Application No. PCT/KR2018/000462, which was filed on Jan. 10, 2018, and claims priority to Korean Patent Application Nos. 10-2017-0008315, 10-2017-0008887, and 10-2017-0074903, which were filed on Jan. 17, 2017, Jan. 18, 2017, and Jun. 14, 2017, respectively, the content of each of which is incorporated herein by reference.

TECHNICAL FIELD

The disclosure relates to a wireless communication system and, more particularly, to a method and a device for performing semi-persistent channel state reporting (semi-persistent CSI reporting). Also, the disclosure relates to a method and a device for transmitting and receiving data.

BACKGROUND ART

In order to meet the demand for wireless data traffic, which has been increasing since the commercialization of a 4G communication system, efforts are being made to develop an improved 5G communication system or pre-5G communication system. For this reason, a 5G communication system or pre-5G communication system is referred to as a beyond-4G-network communication system or a post-LTE system. To achieve a high data transmission rate, implementing a 5G communication system in an extremely high frequency (mmWave) band (for example, a 60 GHz band) is being considered. To reduce the path loss of radio signals and to increase the transmission distance of radio signals in an extremely high frequency band, beamforming, massive multiple-input and multiple-output (massive MIMO), full dimensional MIMO (FD-MIMO), array antenna, analog beamforming, and large scale antenna techniques are under discussion for a 5G communication system. Further, to improve the network of the system, technical development in an evolved small cell, an advanced small cell, a cloud Radio Access Network (cloud RAN), an ultra-dense network, device-to-device (D2D) communication, wireless backhaul, a moving network, cooperative communication, coordinated multi-points (COMP), and reception interference cancellation is progressing for the 5G communication system. In addition, an advanced coding modulation (ACM) scheme including hybrid FSK and QAM modulation (FQAM) and sliding window superposition coding (SWSC) as well as an advanced access technique including filter bank multi carrier (FBMC), non-orthogonal multiple access (NOMA), and sparse code multiple access (SCMA) are being developed for the 5G system.

The Internet has evolved from a human-centered connection network, in which humans create and consume information, into an Internet of things (IoT) network, in which distributed components, such as objects, may exchange and process information. Internet-of-everything (IoE) technology, in which big-data processing technology is combined with the IoT through connection with a cloud server and the like, has also emerged. As technological elements such as sensing technology, wired/wireless communication and net-work infrastructure, service interface technology, and security technology are required to implement IoT, technologies for sensor networks, machine-to-machine (M2M) communication, and machine-type communication (MTC) have recently been studied for connecting objects. In an IoT environment, an intelligent Internet Technology (IT) service that collects and analyzes data generated from connected objects may be provided to create new value in human lives. The IoT is applicable to the fields of a smart home, a smart building, a smart city, a smart car or connected car, a smart grid, health care, a smart home appliance, advanced medical care services, and the like through convergence and integration of existing information technology with various industries.

Accordingly, various attempts are being made to apply a 5G communication system to the IoT network. For example, 5G communication technologies, such as a sensor network, M2M communication, and MTC, are implemented by beam-forming, MIMO, and array-antenna schemes. Applying a cloud radio access network (RAN) as the big-data processing technology described above is an example of the convergence of 5G technology and IoT technology.

With the recent development of a 5G communication system, New Radio (NR, which is interchangeable with a 5G system hereinafter) requires a method and a device for dynamically configuring periodic channel state reporting in order to efficiently use the reporting overhead of a terminal and to minimize the battery consumption of the terminal.

Further, since a plurality of pieces of data can be transmitted within one transmission interval in NR, there is a need for a method of designing and transmitting and receiving control information for determining whether the plurality of pieces of data is transmitted.

DISCLOSURE OF INVENTION

Technical Problem

An aspect of the disclosure is to support semi-persistence CSI reporting in addition to existing aperiodic and periodic channel state reporting so that a base station and a UE minimize the number of resources necessary for channel state reporting and efficiently use the resources in a new radio (NR) system. Here, various methods and settings, such as a method of configuring a channel state report, a triggering method, a method of generating a channel state information report, and a method of configuring a channel state reporting time, are required for semi-persistence CSI reporting. The disclosure proposes various methods, such as a triggering method, a method of generating an information report, and a method of configuring a report, to support semi-persistence CSI reporting.

Another aspect of the disclosure is to support transmitting two or more pieces of data for the same UE or respective pieces of data for different UEs in one transmission interval (minimum scheduling unit). Still another aspect of the disclosure is to provide a design and a transmission and reception method for control information for determining whether a plurality of pieces of data that can be transmitted in one transmission interval is transmitted.

Solution to Problem

In accordance with an aspect of the disclosure, a method performed by user equipment (UE) in a communication system includes receiving, from a base station, control information on a frequency region configured by system information, wherein the control information defines a transmission time interval for a physical downlink shared channel (PDSCH) among a plurality of transmission time intervals, identifying a transport block size associated with a number of symbols, and receiving, from the base station, the PDSCH associated with the transport block size in the number of symbols from a start symbol based on the resource allocation information, wherein the resource allocation information indicates the start symbol of the transmission time interval, and the transmission time interval is defined based on the number of symbols from the start symbol.

In accordance with an aspect of the disclosure, a method performed by a base station in a communication system includes identifying a transport block size, transmitting, to a UE, control information on a frequency region configured by system information, wherein the control information includes resource allocation information used for defining a transmission time interval for a PDSCH among a plurality of transmission time intervals, and transmitting, to the UE, the PDSCH associated with the transport block size in the number of symbols from a start symbol according to the resource allocation information, wherein the transport block size is associated with the number of symbols, wherein the resource allocation information indicates the start symbol of the transmission time interval, and wherein the transmission time interval is defined based on the number of symbols from the start symbol.

In accordance with an aspect of the disclosure, a UE in a communication system includes a transceiver, and at least one processor configured to receive, from a base station, control information on a frequency region configured by system information, wherein the control information defines a transmission time interval for a PDSCH among a plurality of transmission time intervals, identify a transport block size associated with a number of symbols, and receive, from the base station, the PDSCH associated with the transport block size in the number of symbols from a start symbol based on the resource allocation information, wherein the resource allocation information indicates the start symbol of the transmission time interval, and wherein the transmission time interval is defined based on the number of symbols from the start symbol.

In accordance with an aspect of the disclosure, a base station in a communication system includes a transceiver, and at least one processor configured to identify a transport block size, transmit, to a UE, control information on a frequency region configured by system information, wherein the control information includes resource allocation information used for defining a transmission time interval for a PDSCH among a plurality of transmission time intervals, and transmit, to the UE, the PDSCH associated with the transport block size in the number of symbols from a start symbol according to the resource allocation information, wherein the transport block size is associated with the number of symbols, wherein the resource allocation information indicates the start symbol of the transmission time interval, and wherein the transmission time interval is defined based on the number of symbols from the start symbol.

Advantageous Effects of Invention

According to one embodiment of the disclosure, there are proposed a triggering method, an information reporting generation method, and a reporting configuring method necessary to support semi-persistent CSI reporting that supports dynamic activation and deactivation. A base station may configure and trigger semi-persistent CSI reporting, and a UE may thus generate and transmit a channel state information report to the base station.

According to another embodiment of the disclosure, there is disclosed a method of transmitting a plurality of pieces of data in one transmission interval, and a base station and one or more UE may efficiently transmit and receive a plurality of pieces of data in one transmission interval according to the method.

BRIEF DESCRIPTION OF DRAWINGS

FIG. 1 illustrates one subframe and one resource block as a minimum unit for downlink scheduling in LTE and LTE-A systems;

FIG. 10 illustrates downlink resource allocation type 1;

FIG. 11 illustrates downlink resource allocation type 2;

FIG. 14 illustrates system performance that varies according to subcarrier spacing on the basis of various channel models;

FIG. 29 illustrates an example of resource allocation according to embodiment 2-4;

MODE FOR THE INVENTION

Figure 2:
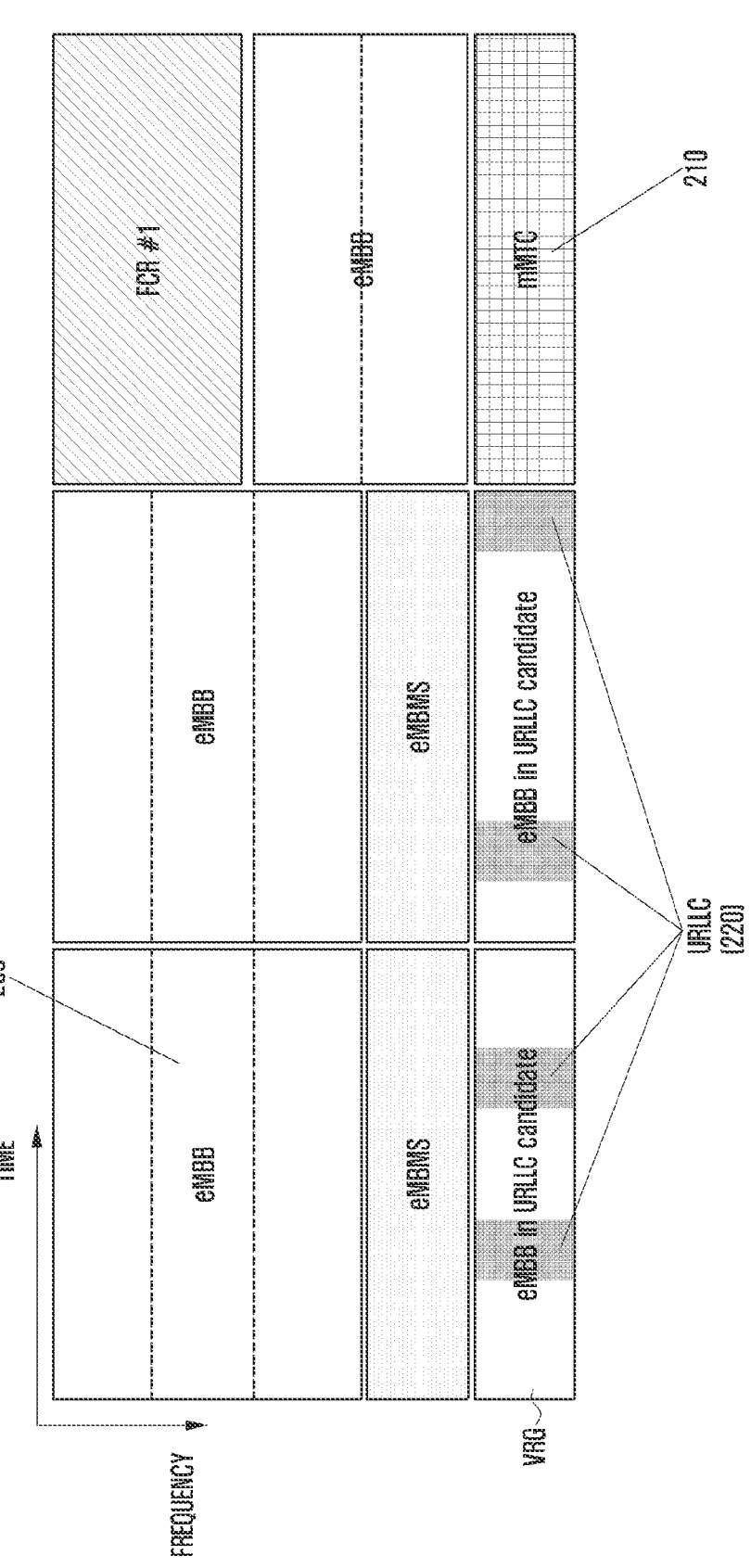
FIG. 2 shows that data for eMBB, URLLC, and mMTC services, which are considered in an NR system, are allocated along with an FCR in frequency-time resources.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flow-chart illustrations, and combinations of blocks in the flow-chart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

In the following description of the disclosure, a detailed description of related well-known functions or structures incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Embodiment 1

A current mobile communication system is evolving from initially providing voice-oriented services into a high-speed and high-quality wireless packet data communication system for providing a data service and a multimedia service. To this end, standardization organizations, such as the 3GPP, the 3GPP2, and the IEEE, are working on third-generation evolved mobile communication system standards adopting a multiple access scheme using a multi-carrier. Recently, various mobile communication standards, such as 3GPP Long-Term Evolution (LTE), 3GPP2 Ultra Mobile Broadband (UMB), and IEEE 802.16m, have been developed on the basis of a multiple access scheme using a multi-carrier in order to support a high-speed and high-quality wireless packet data transmission service.

Existing third-generation evolving mobile communication systems, such as LTE, UMB, and 802.16m, are based on a multi-carrier multiple access scheme and employ various techniques, for example, multiple-input multiple-output (MIMO), beam-forming, adaptive modulation and coding (AMC), and channel sensitive scheduling, in order to improve transmission efficiency.

These various techniques improve transmission efficiency by concentrating transmission power for transmission via a plurality of antennas or adjusting the amount of transmitted data according to channel quality or by selectively transmitting data to a user having a quality channel, thus enhancing system capacity. Since most of these techniques function on the basis of information about the state of a channel between a base station (evolved Node B, eNB, base station, or BS) and a terminal (user equipment, UE, mobile station, or MS), the eNB or UE needs to measure the state of a channel between a base station and a terminal, in which a channel status indication reference signal or channel state information reference signal (CSI-RS) is used.

The eNB refers to a downlink transmission and uplink reception device located at a certain place, and one eNB performs transmission and reception for a plurality of cells. In one mobile communication system, a plurality of eNBs is geographically distributed, and each eNB performs transmission and reception for a plurality of cells.

Existing third-generation and fourth-generation mobile communication systems, such as LTE and LTE-A systems, employ MIMO technology for enabling transmission using a plurality of transmission and reception antennas in order to increase data transmission rate and system capacity. According to MIMO technology, a transmitter spatially separately transmits a plurality of information streams using a plurality of transmission and reception antennas. Spatially separately transmitting a plurality of information streams is referred to as spatial multiplexing. Generally, the number of information streams to which spatial multiplexing can be applied varies depending on the number of antennas of a transmitter and a receiver. In general, the number of information streams to which spatial multiplexing can be applied is represented by the rank of relevant transmission. MIMO technology supported by the LTE and LTE-A standards including up to Release 11 supports spatial multiplexing for 16 transmission antennas and eight reception antennas and supports a rank of up to 8.

A New Radio access technology (NR) as a fifth-generation mobile communication system currently under discussion is designed to support various services, such as eMBB, mMTC, and URLLC mentioned above. To this end, an NR system may minimize the number of reference signals that are always transmitted and may aperiodically transmit a reference signal to be transmitted non-periodically, thereby flexibly using time and frequency resources.

The following description will be made with reference to, for example, an NR system and LTE and LTE-A systems in this specification, but the disclosure may be applied to other communication systems in the same manner.

FIG. 1 illustrates one subframe and one resource block (RB) as a minimum unit for downlink scheduling in LTE and LTE-A systems.

A radio resource illustrated in FIG. 1 includes one subframe on a time axis and one RB on a frequency axis. The radio resource includes 12 subcarriers in a frequency domain and 14 OFDM symbols in a time domain, and thus has a total of 168 natural frequency and time positions. In the LTE and LTE-A systems, each natural frequency and time position in FIG. 1 is referred to as a resource element (RE).

A plurality of different types of signals illustrated below may be transmitted via the radio resource illustrated in FIG. 1:

1. Cell-specific reference signal (CRS) 100: A CRS is a reference signal periodically transmitted for all UEs belonging to one cell and can be commonly used by a plurality of UEs.

2. Demodulation reference signal (DMRS) 110: A DMRS is a reference signal transmitted for a specific UE and is transmitted only when data is transmitted to the UE. The DMRS may include a total of eight DMRS antenna ports (hereinafter, interchangeable with ports). In LTE and LTE-A, ports 7 to 14 correspond to the DMRS ports, and the ports maintain orthogonality using code division multiplexing (CDM) or frequency division multiplexing (FDM) so as not to cause interference with each other.

3. Physical downlink shared channel (PDSCH) 120: A PDSCH is a data channel transmitted via a downlink, is used by a base station to transmit traffic to a UE, and is transmitted using an RE not transmitting a reference signal in a data region 160 of FIG. 1.

4. CSI-RS 140: A CSI-RS is a reference signal transmitted for UEs belonging to one cell and is used to measure the channel state. A plurality of CSI-RSs may be transmitted for one cell.

5. Other control channels 130: Other control channels include a physical HARQ indicator channel (PHICH), a physical control format indicator channel (PCFICH), and a physical downlink control channel (PDCCH). These control channels provide control information necessary for a UE to receive a PDSCH or transmit an ACK/NACK for operating an HARQ for uplink data transmission.

In addition to these signals, the LTE-A system may configure muting so that UEs in a cell can receive a CSI-RS transmitted from a different base station without interference. The muting may be applied at a position where the CSI-RS can be transmitted, and a UE generally receives a traffic signal by skipping the radio resource. In the LTE-A system, muting is also referred to as a zero-power CSI-RS, because muting is applied to a position for a CSI-RS in nature and transmission power is not transmitted at this position.

In FIG. 1, a CSI-RS is transmitted using some of positions indicated by A, B, C, D, E, F, G, H, I, and J according to the number of antenna ports used to transmit the CSI-RS. Muting may be applied to some of the positions indicated by A, B, C, D, E, F, G, H, I, and J. In particular, the CSI-RS may be transmitted on two, four, or eight REs depending on the number of configured antenna ports. When the number of antenna ports is two, the CSI-RS is transmitted using half of a specific pattern in FIG. 1. When the number of antenna ports is four, the CSI-RS is transmitted using the entire specific pattern. When the number of antenna ports is eight, the CSI-RS is transmitted using two patterns.

Muting is performed always in one pattern. That is, muting can be applied to a plurality of patterns, but cannot be applied to only part of one pattern when not overlapping in position with a CSI-RS. However, muting can be applied to only part of one pattern only when a position for a CSI-RS overlaps with a position for muting. When a CSI-RS is transmitted for two antenna ports, the CSI-RSs of the respective antenna ports are transmitted on two REs contiguous on the time axis, and the signals of the antenna ports are distinguished by orthogonal codes. In addition, when a CSI-RS is transmitted for four antenna ports, two additional REs are used in addition to those for the CSI-RSs for the two antenna ports, thereby transmitting the signals for the two additional antenna ports by the same method. When a CSI-RS is transmitted for eight antenna ports, the same method is used. For CSI-RSs supporting 12 and 16 antenna ports, three sets of existing CSI-RS transmission positions for four antenna ports or two sets of CSI-RS transmission positions for eight antenna ports are combined, thereby performing transmission.

A UE may be allocated a CSI-IM (or interference measurement resource (IMR)) along with a CSI-RS, and a CSI-IM resource has the same resource structure and position as a CSI-RS supporting four ports. A CSI-IM is a resource for a UE performing data reception from one or more base stations to accurately measure interference from a neighboring base station. For example, when a base station wants to measure the amount of interference where a neighboring base station transmits data and the amount of interference where the neighboring base station does not transmit data, the base station may configure a CSI-RS and two CSI-IM resources, may allow the neighboring base station to always transmit a signal on one CSI-IM, and may not allow the neighboring base station to always transmit a signal on the other CSI-IM, thereby effectively measuring the amount of interference by the neighboring base station.

Table 1 shows a radio resource control (RRC) field that configures a CSI-RS configuration, which is for supporting a periodic CSI-RS in a CSI process.

TABLE 1

| CSI-RS config | CSI-IM config | CQI report config | Etc |
|---|---|---|---|
| No. antenna ports<br>Resource config<br>Time and frequency<br>position in a subframe<br>Subframe config<br>Periodicity and subframe<br>offset<br>Cici-CRS-info (QCL<br>Type B)<br>CRS information for CoMP | Resource config<br>Time and frequency<br>position in a subframe<br>Subframe config<br>Periodicity and subframe<br>offset | Periodic<br>Mode, resource,<br>periodicity, offset . . .<br>Aperiodic<br>Mode . . .<br>PMI/RI report<br>RI reference CSI<br>process<br>SubframePattern | $P_C$<br>Codebook subset<br>restriction |

Configurations for channel state reporting based on a periodic CSI-RS in a CSI process may be classified into four types illustrated in Table 1a. First, a CSI-RS config is for configuring the frequency and time position of a CSI-RS RE. Here, the number of ports a CSI-RS has is configured by setting the number of antennas. A Resource config sets the position of an RE in an RB, and a Subframe config sets the period and offset of a subframe. Table 2 is a table for configuring the Resource config and the Subframe config currently supported by LTE.

TABLE 2

| CSI Reference signal configuration | | Number of OSI reference signals configured | | | | | |
|---|---|---|---|---|---|---|---|
| | | 1 or 2 | | 4 | | 6 | |
| | | (k', l') | $n_s$ mod 2 | (k', l') | $n_s$ mod 2 | (k', l') | $n_s$ mod 2 |
| frame structure type 1 and 2 | 0 | (9, 5) | 0 | (9, 5) | 0 | (9, 5) | 0 |
| | 1 | (11, 2) | | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | |
| | 4 | (9, 5) | | (9, 5) | | (9, 5) | 1 |
| | 5 | (8, 5) | 0 | (8, 5) | 0 | | |
| | 6 | (10, 2) | | (10, 2) | | | |
| | 7 | (8, 2) | | (8, 2) | | | |
| | 8 | (6, 2) | 1 | (6, 2) | | | |
| | 9 | (8, 5) | 1 | (8, 5) | 1 | | |
| | 10 | (3, 5) | | | | | |
| | 11 | (2, 5) | 0 | | | | |
| | 12 | (6, 2) | 1 | | | | |
| | 13 | (4, 2) | 1 | | | | |
| | 14 | (3, 2) | 1 | | | | |
| | 16 | (2, 2) | 1 | | | | |
| | 18 | (1, 2) | | | | | |
| | 17 | (0, 2) | | | | | |
| | 18 | (3, 5) | 1 | | | | |
| | 19 | (2, 5) | 1 | | | | |

TABLE 2-continued

| | | | | | | | |
|---|---|---|---|---|---|---|---|
| frame structure type 2 only | 20 | (11, 1) | 1 | (11, 1) | | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (8, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

| CSI-RS Subframe config $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 6 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

A UE can check the frequency and time position, the period, and the offset of a CSI-RS through Table 2. Qcl-CRS-info sets quasi co-location information for a coordinated multi-point (CoMP).

Second, a CSI-IM config is for configuring the frequency and time position of a CSI-IM to measure interference. Since a CSI-IM is always configured with respect to four ports, it is not necessary to configured the number of antenna ports, and a Resource config and a Subframe config are configured in the same manner as a CSI-RS.

Third, a CQI report config is included to configure how to report a channel state using the CSI process. This configuration includes a periodic channel state report configuration, an aperiodic channel state report configuration, a PMI/RI report configuration, a reference RI CSI process configuration, and a subframe pattern configuration.

A subframe pattern is used to configure a measurement subframe subset for supporting measurement of channels and interference having temporally different characteristics in measuring a channel and interference received by a UE. A measurement subframe subset was first introduced in the enhanced inter-cell interference coordination (eICIC) in order to perform estimation in view of other interference characteristics of an almost blank subframe (ABS) and a general non-ABS subframe. The measurement subframe subset has evolved into a form that configures two IMRs to measure different channel characteristics of a subframe that always functions as DL and a subframe that can be dynamically switched from DL to UL in enhanced interference mitigation and traffic adaptation (eIMTA).

Tables 3 and 4 illustrate measurement subframe subsets for supporting eICIC and eIMTA, respectively.

TABLE 3

```
CQI-ReportConfig-r10 : := SEQUENCE {
    cqi-ReportAperiodic-r10            CQI-ReportAperiodic-r10
    OPTIONAL, -- Need ON
    nomPDSCH-RS-EPPE-Offset            INTEGER (-1..6),
    cqi-ReportPeriodic-r10             CQI-ReportPeriodic-r10    OPTIONAL,
    -- Need ON
    pmi-RI-Report-r9                   ENUMERATED {setup}    OPTIONAL,
    -- Cond PMIRIPCell
    csi-SubframePatternConfig-r10          CHOICE {
        release                            NULL,
        setup                              SEQUENCE {
            csi-MeasSubframeSet1-r10           MeasSubframePattern-r10,
            csi-MeasSubframeSet2-r10           MeasSubframePattern-r10
        }
    }                                  OPTIONAL -- Need ON
}
```

TABLE 4

```
CQI-ReportConfig-v1250 : :=        SEQUENCE {
    csi-SubframePatternConfig-r12         CHOICE {
        release                           NULL,
        setup                             SEQUENCE {
            csi-MeasSubframeSets-r12          BIT STRING (SIZE (10))
        }
    }                                                   OPTIONAL, Need ON
    cqi-ReportBoth-v1250              CQI-ReportBoth-v1250      OPTIONAL,
    -- Need ON
    cqi-ReportAperiodic-v1250 CQI-ReportAperiodic-v1250        OPTIONAL, --
Need ON
    altCQI-Table-r12                 ENUMERATED {
                                     allSubframes, csi-SubframeSet1,
                                     csi-SubframeSet2, spare1}       OPTIONAL, --
Need OP
}
```

The eICIC measurement subframe subset supported by LTE is configured up using csi-MeasSubframeSet1-r10 and csi-MeasSubframeSet2-r10. MeasSubframePattern-r10 that this field refers to is illustrated in Table 5.

TABLE 5

```
-- ASN1START
MeasSubframePattern-r10 : := CHOICE {
    subframePatternFDD-r10       BIT STRING (SIZE (40)),
    subframePatternTDD-r10       CHOICE {
        subframeConfig1-5-r10        BIT STRING (SIZE (20)),
        subframeConfig0-r10          BIT STRING (SIZE (70)),
        subframeConfig6-r10          BIT STRING (SIZE (60)),
        . . .
    },
    . . .
}
-- ASN1STOP
```

In the field, the left MSB indicates subframe #0, and the field set to 1 indicates that a subframe is included in a measurement subframe subset. Unlike the eICIC measurement subframe subset which configures each subframe configured through each field, the eIMTA measurement subframe subset uses one field, in which 0 indicates a first subframe set and 1 indicates a second subframe set. Therefore, a subframe may not be included in two subframe sets in eICIC, while a subframe needs to be always included in one of two subframe sets in the case of the eIMTA subframe set.

Fourthly, there is a $P_C$ that indicates the power ratio between PDSCH and CSI-RS REs and a codebook subset restriction to set a codebook to use may be necessary for a UE to generate a channel state report. $P_C$ and the codebook subset restriction are configured by a p-C-AndCBSRList field (Table 6) including two P-C-AndCBSR fields in Table 7 in a list form, and each field denotes a configuration for each subframe subset.

TABLE 6

```
CSI-Process-r11 ::=   SEQUENCE {
    ...
    p-C-AndCESRList-r11SEQUENCE (SIZE (1..2)) OF P-C-AndCBSR-r11,
    ...
}
```

TABLE 7

```
P-C-AndCBSR-r11 ::=SEQUENCE {
    p-C-r11                          INTEGER (-8..15),
    codebookSubsetRestriction-r11 BIT STRING
}
```

$P_C$ may be defined by Equation 1 and may specify a value ranging from −8 to 15 dB.

$$P_C = \frac{PDSCH\ EPRE}{CSI - RS\ EPRE} \qquad \text{[Equation 1]}$$

A base station may variably adjust CSI-RS transmission power for various purposes, for example, to improve channel estimation accuracy, and a UE may identify, through reported $P_C$, how much transmission power to be used for data transmission is lower or higher than transmission power used for channel estimation. Accordingly, even though the base station changes CSI-RS transmission power, the UE can accurately calculate the CQI and can report the CQI to the base station.

The codebook subset restriction is a function of configuring code points of a codebook supported by the standard according to the number of CRSs or CSI-RS ports of a base station such that the base station does not report the code points to a UE. The codebook subset restriction can be configured by a codebookSubsetRestriction field included in AntennaInfoDedicated in Table 8.

TABLE 8

```
AntennaInfoDedicated :=            SEQUENCE {
    transmissionMode                   ENUMERATED {
                                       tm1, tm2, tm3, tm4, tm5, tm6,
                                       tm7, tm8-v920},
        codebookSubsetRestriction          CHOICE {
            n1txAntenna-tm3                    BIT STRING (SIZE (2)),
            n4TxAntenna-tm3                    BIT STRING (SIZE (4)),
            n1txAntenna-tm4                    BIT STRING (SIZE (6)),
            n4txAntenna-tm4                    BIT STRING (SIZE (64)),
            n1txAntenna-tm5                    BIT STRING (SIZE (4)),
            n4txAntenna-tm5                    BIT STRING (SIZE (16)),
            n1txAntenna-tm6                    BIT STRING (SIZE (4)),
            n4txAntenna-tm6                    BIT STRING (SIZE (16))
        }       OPTIONAL,                                          -- Cond TM
    ue-TransmitAntennaSelection        CHOICE{
        release                            NULL,
        setup                      ENUMERATED {closedLoop, openLoop}
    }
}
AntennaInfoDedicated-v920 ::=      SEQUENCE {
    codebookSubsetRestriction-v920     CHOICE {
        n1txAntenna-tm8-r9                 BIT STRING (SIZE (6)),
        n4txAntenna-tm8-r9                 BIT STRING (SIZE (32))
    }       OPTIONAL                                               -- Cond TM8
}
AntennaInfoDedicated-r10 ::=    SEQUENCE
    transmissionMode-r10               ENUMERATED {
                                       tm1, tm2, tm3, tm4, tm5, tm6, tm7, tm8-v920,
                                       tm9-v1020, tm10-v1130, spare6, spare5,
spare4,
                                       spare3, spare2, spare1},
    codebookSubsetRestriction-r10          BIT STRING          OPTIONAL,
        -- Cond TMX
    ue-TransmitAntennaSelection        CHOICE (
        release                            NULL,
        setup                      ENUMERATED {closedLoop, openLoop}
    }
}
```

The codebookSubsetRestriction field is configured in a bitmap, and the size of the bitmap is equal to the number of code points of a codebook. Therefore, each bitmap denotes each code point. When the value of the bitmap is 1, the UE can report the code point to the base station through a PMI. When the value is 0, the UE cannot report the code point to the base station as a PMI. For reference, an MSB denotes a high precoder index, and an LSB denotes a low precoder index (e.g., $\mathbf{0}$).

In a cellular system, a base station needs to transmit a reference signal to a UE in order to measure a downlink channel state. In the LTE-A system, a UE measures the state of a channel between a base station and the UE using a CRS or CSI-RS transmitted from the base station. The state of the channel is measured basically in consideration of a plurality of factors, which includes the amount of interference in a downlink. The amount of interference in the downlink includes an interference signal and thermal noise caused by an antenna belonging to a neighboring base station. The amount of interference is important for the UE to determine the condition of a downlink channel. For example, when a base station having one transmission antenna transmits a signal to a UE having one reception antenna, the UE needs to determine energy per symbol, which can be received via a downlink using the reference signal received from the base station, and the amount of interference to be received at the same time during a period in which the symbol is received and needs to determine the ratio of energy per symbol to the amount of interference (Es/Io). The determined Es/Io is converted into a data transmission rate or an equivalent value, which is reported to the base station in the form of a channel quality indicator (CQI), and accordingly the base station can determine a data transmission rate at which the base station performs transmission to the UE in the downlink.

In the LTE-A system, the UE feeds back information about a downlink channel state to the base station so that the base station can perform downlink scheduling using the information. That is, the UE measures a reference signal transmitted by the base station via the downlink and feeds back information extracted from the reference signal to the base station in a form defined in the LTE and LTE-A standards. In the LTE and LTE-A systems, there are three types of information that the UE feeds back.

Rank indicator (RI): The number of spatial layers that a UE can receive in the current channel state.

Precoder matrix indicator (PMI): Indicator of a precoding matrix preferred by the UE in the current channel state Channel quality indicator (CQI): Maximum data rate at which a UE can perform reception in the current channel state. The CQI may be replaced with an SINR that can be used similarly to the maximum data rate, the maximum error correction code rate and modulation scheme, data efficiency per frequency, and or the like.

The RI, the PMI, and the CQI are semantically associated. For example, a precoding matrix supported by the LTE and LTE-A systems is defined differently by rank. Therefore, a PMI value in an RI of 1 and a PMI value in an RI of 2 are interpreted differently even though the values are the same. Also, when the UE determines a CQI, the UE assumes that a rank value and a PMI value, which the UE has reported to the base station, are applied by the base station. That is, when the UE reports RI_X, PMI_Y, and CQI Z to the base station, if the rank is RI_X and an applied precoding matrix is PMI_Y, the UE can perform reception at a data rate corresponding to CQI Z. Thus, in calculating a CQI, the UE assumes a transmission scheme to be performed by the base station, thus obtaining optimized performance when transmission is performed according to the transmission scheme.

In LTE and LTE-A, periodic feedback of a UE is configured to one of the following four feedback modes (interchangeable with reporting modes) depending on included information.

Reporting mode 1-0 (wideband CQI with no PMI): RI, broadband (interchangeable with a wideband or full band) CQI (wCQI)

Reporting mode 1-1 (wideband CQI with single PMI): RI, wCQI, PMI

Reporting mode 2-0 (subband CQI with no PMI): RI, wCQI, narrowband (interchangeable with a subband) CQI (sCQI).

Reporting mode 2-1 (subband CQI with single PMI): RI, wCQI, SCQI, PMI

The feedback timing of information about each of the four feedback modes is determined by the values of $N_{pd}$, $N_{OFFSET,CQI}$, $M_{RI}$, and $N_{OFFSET,RI}$, which are transmitted via a higher-layer signal. In feedback mode 1-0, the feedback timing is determined with a wCQI transmission period of $N_{pd}$ and a subframe offset of $N_{OFFSET,CQI}$. Further, an RI has a transmission period of $N_{pd}*M_{RI}$ and an offset of $N_{OFFSET,CQI}+N_{OFFSET,RI}$.

Feedback mode 1-1 has the same feedback timing as mode 1-0 except that a wCQI and a PMI are transmitted together at the wCQI transmission timing.

In feedback mode 2-0, an sCQI has a feedback period of $N_{pd}$ and an offset of $N_{OFFSET,CQI}$. Further, a wCQI has a feedback period of $H*N_{pd}$ and an offset of $N_{OFFSET,CQI}$, which is the same as the offset for the sCQI. Here, H=J*K+1, where K is transmitted via a higher-layer signal and J is a value determined according to a system bandwidth.

For example, J is defined as 3 for a 10-MHz system. That is, the wCQI is transmitted to replace the sCQI every H sCQI transmissions. An RI has a period of $M_{RI}*H*N_{pd}$ and an offset of $N_{OFFSET,CQI}+N_{OFFSET,RI}$.

Feedback mode 2-1 has the same feedback timing as mode 2-0 except that a wCQI and a PMI are transmitted together at the wCQI transmission timing.

feedback period and an offset for the RI and the first piece of PMI information are respectively defined as $M_{RI}*N_{pd}$ and $N_{OFFSET,CQI}+N_{OFFSET,RI}$. When a precoding matrix corresponding to the first PMI is W1 and a precoding matrix corresponding to the second PMI is W2, the UE and the base station share information indicating that a precoding matrix preferred by the UE is determined to be W1W2.

In feedback mode 2-1 for the eight CSI-RS antenna ports, feedback of precoding type indicator (PTI) information is added. A PTI is fed back along with an RI and has a feedback period of $M_{RI}*H*N_{pd}$ and an offset of $N_{OFFSET,CQI}+N_{OFFSET,RI}$. When the PTI is 0, all of a first PMI, a second PMI, and a wCQI are fed back, in which the wCQI and the second PMI are transmitted at the same timing with a period of $N_{pd}$ and an offset of $N_{OFFSET,CQI}$.

Further, the first PMI has a period of $H'*N_{pd}$ and an offset of $N_{OFFSET,CQI}$. Here, H' is transmitted via a high-layer signal. When the PTI is 1, the PTI and the RI are transmitted together, the wCQI and the second PMI are transmitted together, and an sCQI is additionally fed back at a separate timing. In this case, the first PMI is not transmitted. A period and an offset for the PTI and the RI are the same as those in a PTI of 0, and the sCQI is defined to have a period of $N_{pd}$ and an offset of $N_{OFFSET,CQI}$. The wCQI and the second PMI are fed back with a period of $H*N_{pd}$ and an offset of $N_{OFFSET,CQI}$, in which H is defined the same as in the case of four CSI-RS antenna ports.

The LTE and LTE-A systems support not only periodic feedback of a UE but also aperiodic feedback of the UE. When the base station wants to obtain aperiodic feedback information of a specific terminal, the base station configures an aperiodic feedback indicator, included in downlink control information (DCI) for uplink data scheduling of the UE, to perform specific aperiodic feedback, thereby performing uplink data scheduling of the UE. When the UE receives an indicator configured to perform aperiodic feedback via an nth subframe, the UE performs uplink transmission by including aperiodic feedback information in uplink data transmission via an (n+k)th subframe, where k is a parameter defined in the 3GPP LTE Release 11, which is 4 in frequency division duplexing (FDD) and is defined as in Table 9 in time division duplexing (TDD).

TABLE 9

| TDD UL/DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The foregoing feedback timings are for four or fewer CSI-RS antenna ports. For a UE allocated CSI-RSs for eight antennas ports, two pieces of PMI information need to be fed back unlike in the foregoing feedback timings. For the eight CSI-RS antenna ports, feedback mode 1-1 is further divided into two submodes, wherein an RI is transmitted along with a first piece of PMI information in a first submode, and a wCQI is transmitted along with a second piece of PMI information in a second submode.

Here, a feedback period and an offset for the wCQI and the second PMI are defined as $N_{pd}$ and $N_{OFFSET,CQI}$, a When the aperiodic feedback is configured, the feedback information includes an RI, a PMI, and a CQI as in periodic feedback, and the RI and the PMI may not be fed back according to the feedback configuration. The CQI may include both a wCQI and an sCQI or may include only wCQI information.

The LTE and LTE-A systems also provide a codebook subsampling function for periodic channel state reporting. In the LTE and LTE-A systems, the periodic feedback of the UE is transmitted to the base station via a PUCCH, and the amount of information that can be transmitted through the PUCCH at a time is limited. Therefore, various feedback objects, such as an RI, a wCQI, an sCQI, PMI1, wPMI2, and sPMI2, may be transmitted on the PUCCH through subsampling, or two or more types of feedback information may be jointly encoded and transmitted on the PUCCH.

For example, when the number of CSI-RS ports configured by the base station is eight, an RI and PMI1 reported in submode 1 of PUCCH feedback mode 1-1 may be jointly encoded as illustrated below in Table 10. Referring to Table 10, the RI of three bits and PMI1 of four bits are jointly encoded into a total of five bits. In submode 2 of PUCCH feedback mode 1-1, referring to Table 11, PMI1 of four bits and PMI2 of four bits are jointly encoded into a total of four bits. Since submode 2 has a higher a subsampling level than submode 1 (four cases are subsampled into three cases in submode 1, while eight cases are subsampled into minus four cases in submode 2), a greater number of precoding indexes cannot be reported in submode 2.

In another example, when the number of CSI-RS ports configured by the base station is eight, PMI2 reported in PUCCH feedback mode 2-1 may be subsampled as illustrated below in Table 12. Referring to Table 12, PMI2 is reported as four bits when an associated RI is 1. However, when the associated RI is more than 2, a differential CQI for a second codeword needs to be reported together, and thus PMI2 is subsampled and reported as two bits. In LTE and LTE-A, it is possible to apply a total of six types of subsampling or joint encoding including Table 10, Table 11, and Table 12 for periodic feedback.

TABLE 10

| value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1}\text{-}8)$ |
| 16-17 | 3 | $2(I_{RI/PMI1}\text{-}16)$ |
| 18-19 | 4 | $2(I_{RI/PMI1}\text{-}18)$ |
| 20-21 | 5 | $2(I_{RI/PMI1}\text{-}20)$ |
| 22-23 | 6 | $2(I_{RI/PMI1}\text{-}22)$ |
| 24-25 | 7 | $2(I_{RI/PMI1}\text{-}24)$ |
| 26 | 8 | 0 |
| 27-31 | reserved | NA |

TABLE 11

| RI | Relationship between the first PMI value and codebook index $i_1$ | | Relationship between the second PMI value and codebook index $i_2$ | | total #bits |
|---|---|---|---|---|---|
| | Value of the first PMI $I_{PMI1}$ | Codebook index $i_1$ | Value of the second PMI $I_{PMI1}$ | Codebook index $i_2$ | |
| 1 | 0-7 | $2 I_{PMI1}$ | 0-1 | $2I_{PMI2}$ | 4 |
| 2 | 0-7 | $2 I_{PMI1}$ | 0-1 | $I_{PMI2}$ | 4 |
| 3 | 0-1 | $2 I_{PMI1}$ | 0-7 | $4\lfloor I_{PMI2}/4 \rfloor + I_{PMI2}$ | 4 |
| 4 | 0-1 | $2 I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

TABLE 12

| | Relationship between the second PMI value and codebook index $i_2$ | |
|---|---|---|
| RI | value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2}\text{mod2}) + 2$ |
| 4 | 0-3 | $2I_{PMI2}$ |
| 5 | 0 | 0 |
| 6 | 0 | 0 |
| 7 | 0 | 0 |
| 8 | 0 | 0 |

FIG. 2 shows that data for eMBB, URLLC, and mMTC services, which are considered in an NR system, are allocated along with a forward compatible resource (FCR) in frequency-time resources.

When URLLC data is generated and needs to be transmitted while data 200 and 210 for eMBB and mMTC services are transmitted in a particular allocated frequency band, a portion pre-allocated for the eMBB and the mMTC data is emptied and the URLLC data is transmitted via the portion (220). Since a short delay time is particularly important for the URLLC service among the above services, URLLC data can be allocated to a portion of resources allocated for eMBB data and transmitted therethrough, and such eMBB resources may be reported to a UE in advance. To this end, the eMBB data may not be transmitted in frequency-time resources where the eMBB data and the URLLC data are overlapped, and thus the transmission performance of the eMBB data may be reduced. That is, in this case, the transmission of the eMBB data may fail due to the URLLC data allocation. Here, the length of a transmission time interval (TTI) used for the URLLC transmission may be shorter than the TTI length used for transmitting the eMBB or mMTC service.

A synchronization signal is used to achieve synchronization with a cell in a network when a UE accesses a wireless communication system. Specifically, a synchronization signal refers to a reference signal transmitted by a base station for time and frequency synchronization and for cell search at the initial access of a UE. In the LTE system, a primary synchronization signal (PSS), a secondary synchronization signal (SSS), or the like may be transmitted by the base station for synchronization.

Figure 3:
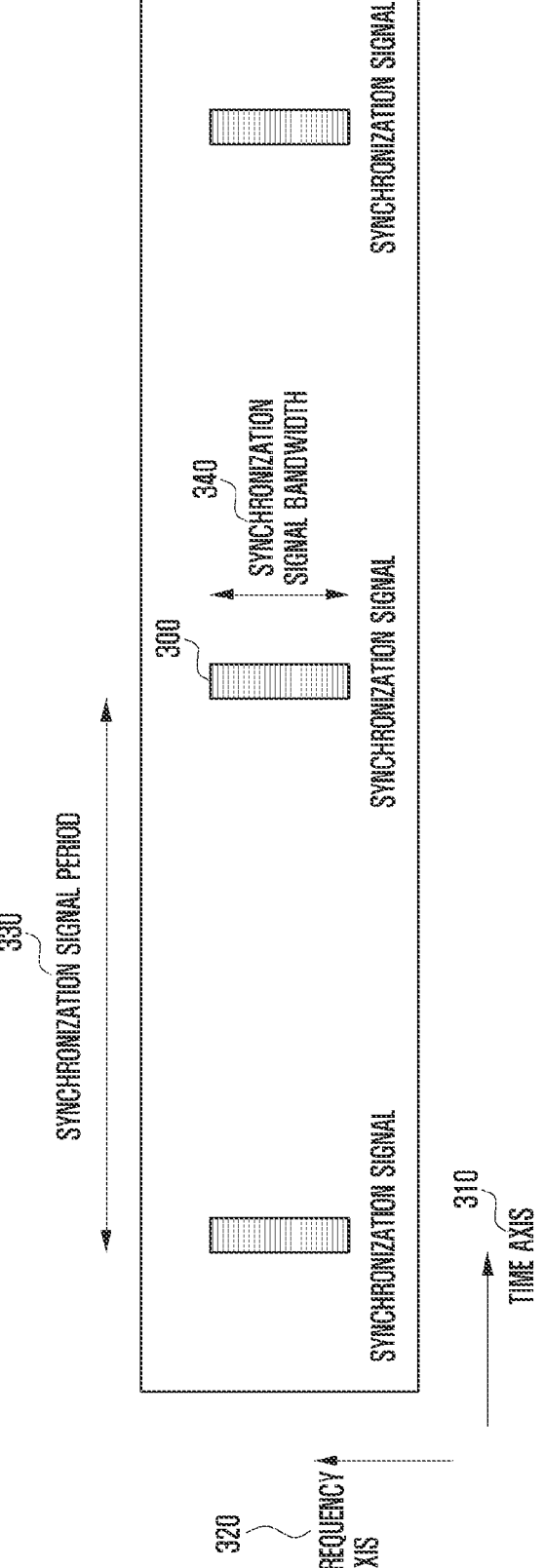
FIG. 3 illustrates an embodiment of transmitting a synchronization signal in a 5G communication system considered in the disclosure.

FIG. 3 illustrates an embodiment of transmitting a synchronization signal in a 5G communication system considered in the disclosure. In FIG. 3, a synchronization signal 300 may be transmitted at intervals of a certain period 330 on a time axis 310. Also, the synchronization signal 300 may be transmitted within a certain synchronization signal transmission bandwidth 340 on a frequency axis 320. The synchronization signal may map a particular sequence to a subcarrier in the transmission bandwidth 340 in order to indicate a cell number (cell ID). A cell number may be mapped to the synchronization signal by one sequence or a combination of a plurality of sequences, and thus a UE may detect the sequence used for the synchronization signal, thereby detecting the number of a cell which the UE wants to access.

The sequence used for the synchronization signal may be a sequence having a constant amplitude zero autocorrelation (CAZAC) characteristic, such as an Zadoff-Chu sequence or a Golay sequence, or a pseudo-random noise sequence, such as an M-sequence or a Gold sequence. In the disclosure, it is assumed that the above-mentioned synchronization signal is used for a synchronization signal, but the disclosure is not limited to a particular signal.

The synchronization signal 300 may be configured using one OFDM symbol or using a plurality of OFDM symbols. When the synchronization signal 300 is configured using a plurality of OFDM symbols, sequences for a plurality of different synchronization signals may be mapped to the respective OFDM symbols. For example, similarly to in the LTE system, a PSS may be generated using three Zadoff-Chu sequences, and an SSS may be generated using a Gold sequence. A PSS of one cell may have three different values according to the physical-layer cell ID of the cell, and three cell IDs in one cell ID group correspond to different PSSs. Therefore, the UE may detect a PSS of a cell, thereby identifying one of three cell ID groups supported by the LTE system. The UE additionally detects an SSS among 168 cell IDs reduced from 504 cell IDs through the cell ID group identified through the PSS, thereby finally identifying the cell ID of the cell.

As described above, a UE synchronizes with a cell in a network, acquires a cell number, and identifies cell frame timing. Once this process succeeds, the UE needs to receive important cell system information. This information is repeatedly broadcast by the network and is information that the UE needs to have in order to access the cell and generally operate properly in the cell. In the LTE system, system information is transmitted through two different transmission channels, limited-amount system information called a master information block (MIB) is transmitted using a physical broadcast channel (PBCH), and a main part of the system information corresponding to a system information block (SIB) is transmitted using a physical downlink shared channel (PDSCH). Specifically, in the LTE system, the system information included in the MIB includes a downlink transmission bandwidth, PHICH configuration information, and a system frame number (SFN).

Figure 4:
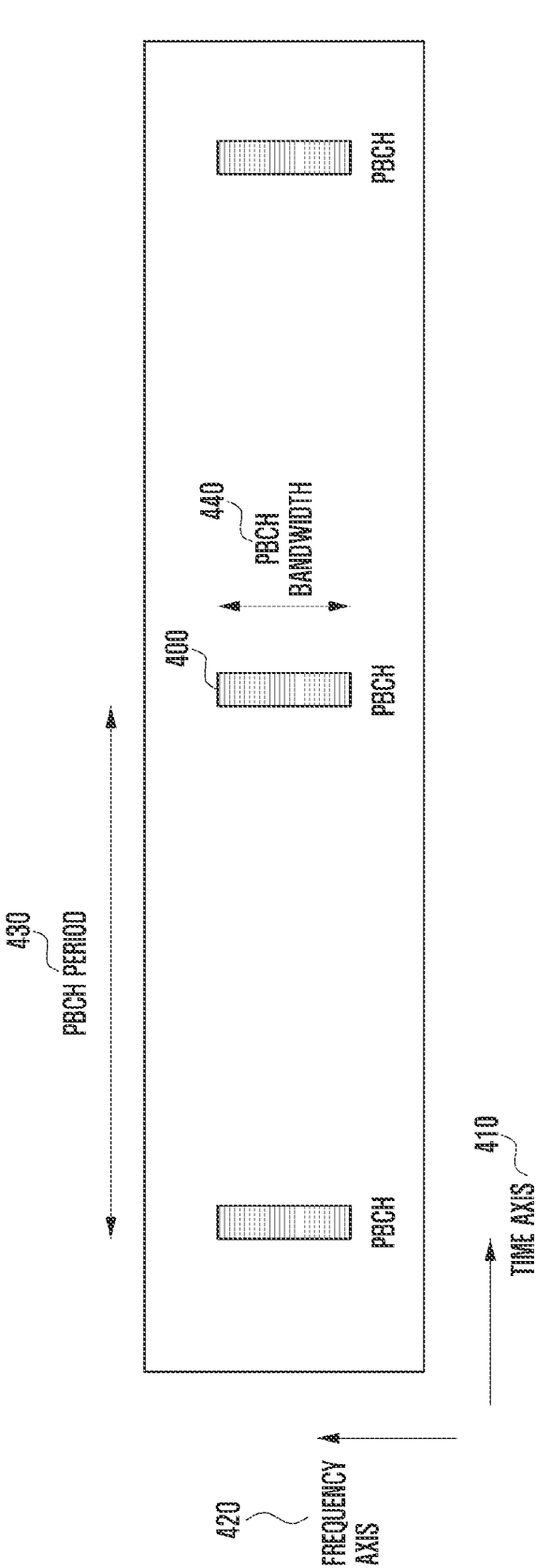
FIG. 4 illustrates an embodiment of transmitting a PBCH in a 5G communication system considered in the disclosure.

FIG. 4 illustrates an embodiment of transmitting a PBCH in the 5G communication system considered in the disclosure. In FIG. 4, a PBCH 400 may be transmitted at intervals of a certain period 430 on a time axis 410. Also, the PBCH 400 may be transmitted within a certain PBCH transmission bandwidth 440 on a frequency axis 420. A base station transmits the same signal at intervals of the certain period 430 in order to enhance coverage, and a UE may combine and receive the same signal. In addition, a transmission scheme using a plurality of antenna ports, such as transmit diversity, may be applied to PBCH transmission, thereby obtaining a diversity gain without additional information about a transmission scheme used by a receiver.

In the disclosure, it is assumed that the above-mentioned PBCH is used for a PBCH, but the disclosure is not limited to a particular structure. Similarly to in the current LTE system, the PBCH 400 may be configured using a plurality of OFDM symbols in resources in a time-frequency domain or may be configured to be distributed among resources in the time-frequency domain. A UE needs to receive and decode a PBCH in order to receive system information. In the LTE system, a UE performs channel estimation on a PBCH using a CRS.

In the LTE system, a synchronization signal and a PBCH among major physical-layer channels are positioned as follows in the time-frequency domain. Regarding the position on the frequency, a PSS and an SSS are transmitted via six center RBs excluding ten guard subcarriers, and a PBCH is also transmitted via six center RBs. Regarding the position on the time, positions for transmitting the PSS and the SSS change depending on whether a cell operates in FDD or TDD and are divided in a time domain within a frame. As in the LTE system, when a synchronization signal and a major physical-layer channel, such as a PBCH, are transmitted at very close positions in the time-frequency domain, if the major physical-layer channel is estimated using the synchronization signal, channel estimation accuracy may be improved.

Figure 5:
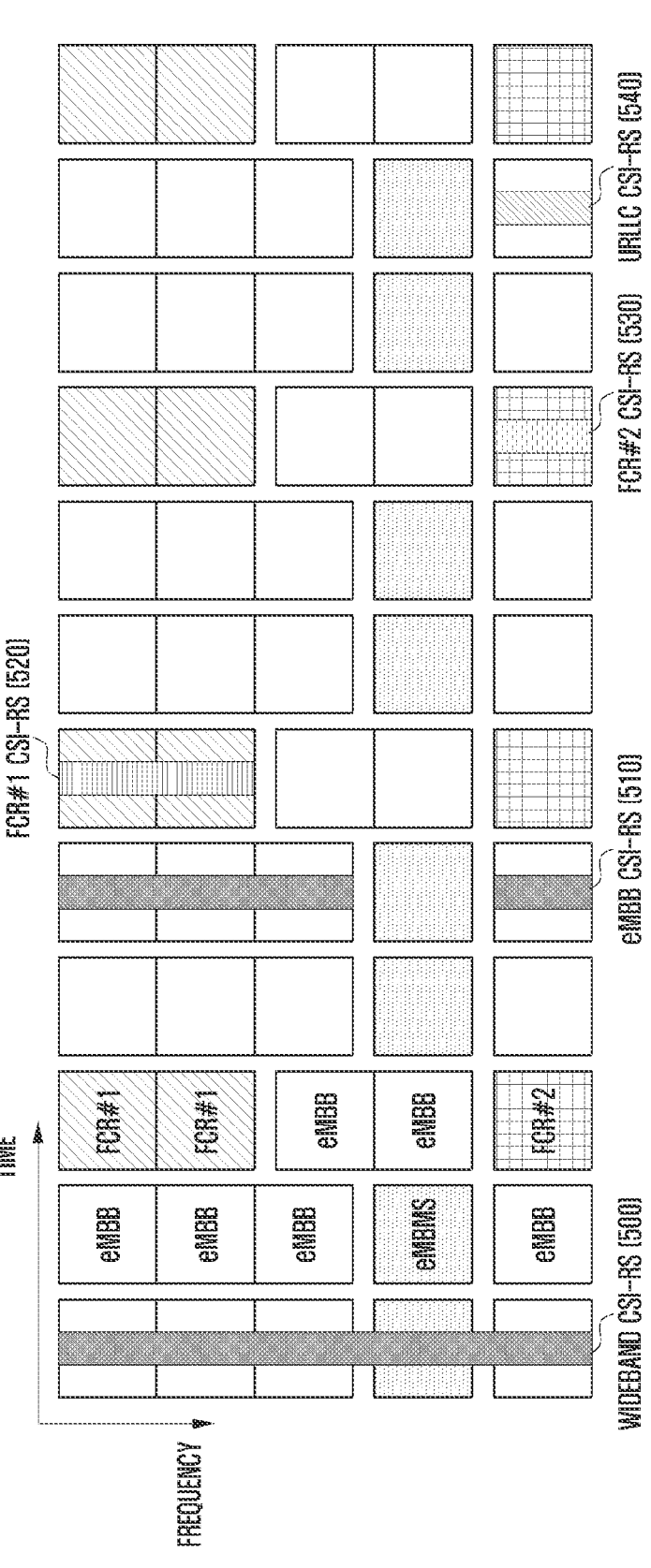
FIG. 5 illustrates a case where services are multiplexed in time and frequency resources in an NR system.

FIG. 5 illustrates a case where services are multiplexed in time and frequency resources in the NR system. A base station may allocate a full-band or multiple-band CSI-RS to a UE in order to secure initial channel state information as indicated by 500. This full-band or multiple-band CSI-RS requires a large amount of reference signal overhead and thus may be disadvantageous for optimizing system performance. However, in the absence of previously obtained information, it is necessary to transmit this full-band or multiple-band CSI-RS. After the full-band or multiple-band CSI-RS is transmitted, individual services may be provided with different requirements for each service, and thus the accuracy of required channel state information and the necessity of updating required channel state information may also be changed. Accordingly, after securing the initial channel state information, the base station may trigger subband CSI-RSs 510, 520, and 530 for the respective services in a corresponding band if necessary for each service. Although FIG. 5 illustrates a case of transmitting a CSI-RS for each one service at one time, it is also possible to transmit CSI-RS for a plurality of services as needed.

As illustrated in Tables 1 and 2, the LTE system supports periodic CSI-RS transmission. A periodic CSI-RS enables a UE to periodically measure resources and to periodically report CSI. However, such periodic CSI-RS transmission is disadvantageous for supporting a UE of existing LTE and future systems. For example, when a CSI-RS pattern of the LTE system is different from a CSI-RS pattern of the NR system, a ZP CSI-RS resource may be additionally required to perform rate matching of corresponding resources. Further, when the type of a CSI-RS to be subsequently supported in the NR system is different from that of an existing CSI-RS, an existing NR UE and a subsequent NR UE need to support and use different CSI-RS patterns, in which case a periodic CSI-RS may further increase overhead. Accordingly, the following aperiodic CSI-RS transmission methods may be considered.

Aperiodic CSI-RS resource configuration and trigger method 1: Method 1 is a method of pre-configuring a plurality of aperiodic CSI-RS resources and triggering some of the configured resources.

Aperiodic CSI-RS resource configuration and trigger method 2: Method 2 is a method of pre-configuring a plurality of aperiodic CSI-RS resources, activating some of the configured resources, and triggering some of the activated resources.

Aperiodic CSI-RS resource configuration and trigger method 3: Method 3 is a method of pre-configuring a plurality of aperiodic CSI-RS resources and periodically transmitting a CSI-RS via a CSI-RS resource according to activation until the resource is deactivated.

Aperiodic CSI-RS resource configuration and trigger method 1 is a method of pre-configuring a plurality of aperiodic CSI-RS resources and triggering some of the configured resources. In this method, since the plurality of resources needs to always be configured dynamically and the number of all configurations needs to be supported, the complexity of a UE may be relatively high. Method 2 is a method of supporting dynamical transmission of only some of the configured resources. In this case, since the number of CSI-RS resources that can be transmitted is relatively small, the complexity of a UE is less than that in method 1, and dynamic CSI-RS transmission is also possible. In method 3, a plurality of resources is configured, and all or some of the resources are periodically transmitted using the concept of semi-persistent scheduling (SPS). Method 3 may entail an insignificant change in hardware of a UE and may not remarkably increase complexity compared to Method 1 and Method 2.

In supporting aperiodic CSI-RS transmission, an activation or deactivation operation and a triggering operation may be transmitted and configured using a DCI or MAC control element (CE) signal. In supporting the above methods, it is also considered to support a plurality of CSI-RS transmission methods. Here, CSI-RS transmission in aperiodic CSI-RS resource configuration and trigger method 3 may be referred to as a semi-persistent (periodic) CSI-RS transmission, instead of aperiodic CSI-RS transmission.

In addition to CSI-RS transmission mentioned above, the NR system supports aperiodic, periodic, and semi-persistent channel state information. Here, the periodic channel state information of the NR system may not support subband reporting among the above-mentioned feedback modes. Reporting used in periodic channel state reporting can transmit a limited amount of reports. Therefore, as described above, in the LTE system, a UE can select some subbands of a bandwidth part to report channel state information. However, since reporting via a selective subband carries very limited information, the utility of the information is not great. Thus, such reporting is not supported, thereby reducing the complexity of a UE and increasing the efficiency of the reporting. In addition, since subband reporting is not supported, no PMI can be reported or only one PMI corresponding to a broadband or a partial band can be transmitted in periodic channel state information reporting of the NR system.

Aperiodic channel state information reporting of the NR system supports the following reporting modes.

Reporting mode 1-2 (wideband CQI with multiple PMIs): RI, wideband CQI (wCQI), multiple wideband and subband PMIs Reporting mode 2-0 (subband CQI with no PMI): RI, wCQI, subband CQI (sCQI) of UE-selected band Reporting mode 2-2 (subband CQI with multiple PMIs): RI, wCQI, sCQI, multiple wideband and subband PMIs Reporting mode 3-0 (subband CQI with no PMI): RI, wCQI, subband CQI (sCQI) of full band Reporting mode 3-2 (subband CQI with multiple PMIs): RI, wCQI, subband CQI (sCQI) of full band, multiple wideband and subband PMIs Similar to the periodic channel state reporting described above, reporting modes 2-0 and 2-2 are types in which one of subbands in a bandwidth part for a UE is selected for reporting, and may not be supported in the NR system due to low efficiency thereof. In the periodic channel state reporting in the LTE system, a reporting mode is determined using a PMI/RI report configuration and a CQI configuration of a corresponding channel state reporting mode configuration. However, in the aperiodic channel state reporting, a channel state reporting mode is directly set. In the NR system, a channel state report configuration may be provided via a PMI/RI report configuration and a CQI report configuration.

Table 13 illustrates a CSI reporting setting, an RS setting, and a CSI measurement setting for channel state reporting.

Figure 6:
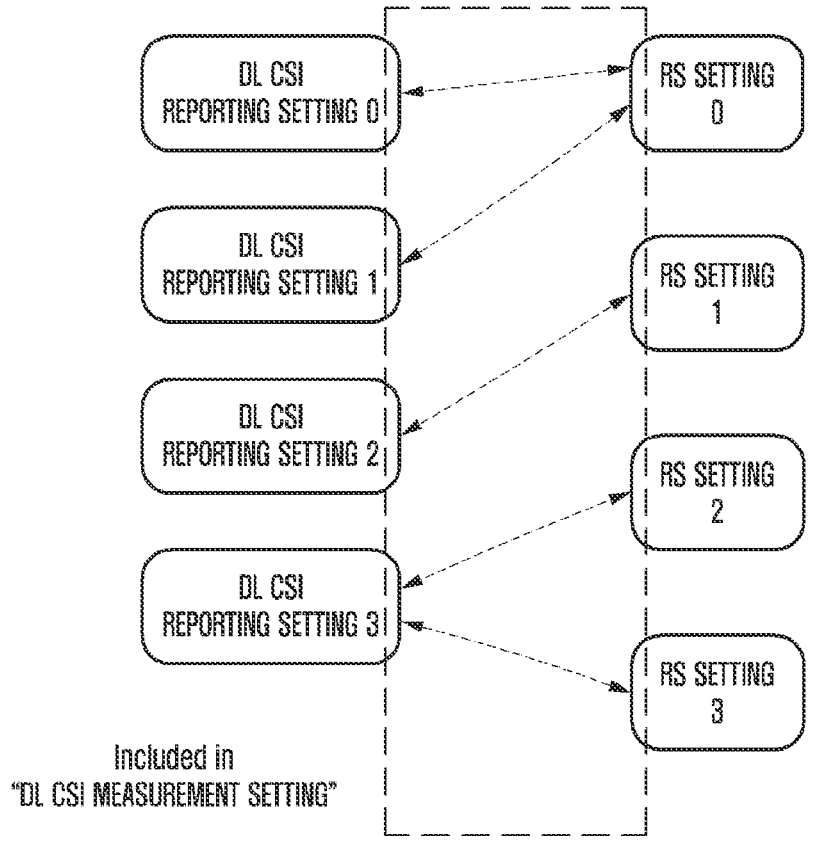
FIG. 6 illustrates a relationship between a CSI reporting setting, an RS setting, and a CSI measurement setting.

FIG. 6 illustrates a relationship between a CSI reporting setting, an RS setting, and a CSI measurement setting.

TABLE 13

| |
|---|
| * CSI-related settings consisting of: |
| - CSI reporting settings. |
| * CSI parameter can be individually configured, e.g. time and/or frequency granularity. |
| - FFS: Details of configurability |
| * Definition of CSI parameters (e.g., a CQI, a PMI, and an RI) is FFS |
| - RS (at least for CSI measurement) settings, e.g., CSI-RS (CSI-IM as a special case). |
| * FFS: Other RS for CSI measurement |
| - CSI measurement settings |
| * To configure which RS setting is used for a particular CSI reporting setting |
| The RS setting, the CSI reporting setting, and the CSI measurement setting in Table 13 may include the following settings. |
| • RS setting: Transmission type of a reference signal (periodic, aperiodic, semi-persistent), transmission period and offset of a reference signal |
| • CSI reporting setting: Whether to report an RI, a PMI, a CQI, a beam index (BI), or a CSI-RS resource index (CRI) (which may be configured individually or in combination), reporting method (periodic, aperiodic, semi-persistent, or aperiodic and semi-persistent reporting may be configured as one parameter), codebook configuration information, PMI form (full band (wideband) or/and partial band (narrowband)), channel state reporting type (implicit or/and explicit, or Type I/Type II), channel quality reporting type (CQI or/and RSRP), resource configuration for channel state reporting |
| • Channel measurement setting (CSI measurement setting): Configuring about which RS setting and CSI reporting setting are used for reporting, associated setting of RS setting and reporting time (e.g., when a reference signal is transmitted in an nth subframe or slot, the reporting time may be configured using parameters, such as $D_{0-0}$, $D_{1-0}$, $D_{2-1}$, $D_{3-2}$, and $D_{3-3}$ and may thus be defined as $n + D_{0-0}$). |

Among the foregoing settings, a plurality of settings may be configured for a UE as illustrated in FIG. 6, in which CSI reporting settings and RS settings may be freely and flexibly connected through CSI measurement settings and may be indicated to a UE.

In the NR system, two types of channel state reporting having low spatial resolution and high spatial resolution are supported as below. Table 14 illustrates these two types of channel state reporting.

TABLE 14

| |
|---|
| * NR supports CSI reporting with two types of spatial information feedback. |
| - Type I feedback: Normal |
| * Codebook-based PMI feedback with normal spatial resolution |
| - Type II feedback: Enhanced |
| * "Explicit" feedback and/or codebook-based feedback with higher spatial resolution |
| - For Type I and II, CSI feedback per subband as well as wideband feedback is supported. |
| - For Type I and II, beam-related feedback can be included (beam-related feedback may be included for types 1 and 2). |
| - For Type I feedback, NR supports at least the following (DL) CSI reporting parameters. |
| * Resource selection indicator (Examples for further study are a reference signal resource, a port, a reference signal sequence, and a beam) |
| * Rank indicator (RI) |
| * Precoding matrix indicator (PMI) |
| * Channel quality feedback |
| - For Type I CSI, PMI codebook has at least two stages W = W1W2 |
| * W1 codebook includes of beam groups/vectors |

TABLE 14-continued

```
* FFS structure and configuration of W1 codebook,
e.g. the number of ports, a grid of beams, orthogonality,
non-orthogonality, beam broadening, etc.
* FFS frequency granularity of W1 and W2 reporting
* FFS on additional support of W3 (location of W3 matrix
is FFS), e.g. multi-panel support and analog beam selection
* Note multi-panel support may be captured in W1, W2,
and/or W3.
```

In addition, Type II reporting can be supported in semi-persistent channel state reporting. In the NR system, semi-persistent channel state reporting requires dynamic activation and deactivation as compared to periodic channel state reporting, thus requiring relatively high UE complexity. Therefore, periodic channel state reporting is preferably performed using transmission methods, such as PUCCH formats 1, 2, and 3, which have relatively low complexity and high coverage as compared to the existing LTE system. Table 15 illustrates a resource configuration for PUCCH format 3 in the LTE system.

TABLE 15

```
CQI-ReportPeriodic-r10 ::=         CHOICE {
    release                            NULL,
    setup                              SEQUENCE {
        cqi-PUCCH-ResourceIndex-r10        INTEGER (0..1184),
        cqi-PUCCH-ResourceIndexP1-r10      INTEGER (0..1184),          OPTIONAL,    -- Need OR
        cqi-pmi-ConfigIndex            INTEGER (0..1023),
        cqi-FormatIndicatorPeriodic-r10        CHOICE {
            widebandCQI-r10                    SEQUENCE {
                csi-ReportMode-r10         ENUMERATED (submode1, submode2)    OPTIONAL    -- Need OR
            },
            subbandCQI-r10                         SEQUENCE {
                k                              INTEGER (1..4)
                periodicityFactor-r10              ENUMERATED (n2, n4)
            }
        },
        ri-ConfigIndex                 INTEGER (0..1023)    OPTIONAL,                  -- Need OR
        simultaneousAckNackAndCQI      BOOLEAN,
        cqi-Mask-r9                    ENUMERATED (setup)    OPTIONAL,                 -- Need OR
        csi-ConfigIndex-r10            CHOICE {
            release                        NULL,
            setup                          SEQUENCE {
                cqi-pmi-ConfigIndex2-r10           INTEGER (0..1023),
                ri-ConfigIndex2-r10                INTEGER (0..1023)    OPTIONAL     -- Need OR
            }
        }        OPTIONAL                                                            -- Need ON
    }
}
```

TABLE 14-continued

```
- For Type II CSI,
* Study the following CSI feedback schemes
* Analog CSI feedback
* Linear combination-based CSI feedback
```

Type I channel state reporting reports a channel state to a base station through an RI, a PMI, a CQI, and a CRI on the basis of a codebook as in the existing LTE system. However, Type II reporting may provide a higher level of resolution through greater PMI reporting overhead for implicit CSI similar to in Type I reporting, and this PMI reporting may be performed by linear combination of a precoder, a beam, a co-phase, and the like used for Type I reporting. Also, CSI may be reported in an explicit CSI form different from a conventional form in order to report a direct channel state, and a representative example is a method of reporting a covariance matrix of a channel. It is also possible to use a combination of implicit information and explicit information. For example, a covariance matrix of a channel is reported via a PMI, and a CQI or an RI may be further reported.

As mentioned above, Type II channel state reporting requires high reporting overhead. Therefore, such reporting may not be suitable for periodic channel state reporting that does not have a large number of bits for reporting. However, since aperiodic channel state reporting is supported through a PUSCH that can support great overhead, Type II reporting requiring high reporting overhead can be supported only in aperiodic channel state reporting.

On the other hand, semi-persistent channel state reporting can be supported by a UE having high UE complexity, and the UE can support transmission of a large amount of data through transmission based on existing PUCCH format 4 or 5. PUCCH formats 4 and 5 use tail-biting convolutional coding (TBCC) and QPSK modulation. In format 5, data is divided and transmitted to two UEs through an orthogonal sequence. Therefore, in one RB transmission, transmission is performed using 144 REs and a coding rate of 1/3, and thus up to 96 bits (in the configuration of one RB) and up to 48 bits can be transmitted according to PUCCH formats 4 and 5, respectively. In format 4, a plurality of RBs can be configured, and accordingly as many bits as the number of RBs multiplied by 96 bits can be transmitted. Table 16 illustrates resource configurations for PUCCH formats 4 and 5.

TABLE 16

```
Format4-resource-r13      ::=      SEQUENCE {
    startingPRB-format4-r13              INTEGER (0..109),
    numberofPRB-format4-r13              INTEGER (0..7)
}
Format5-resource-r13      ::=      SEQUENCE {
    startingPRB-format5-r13              INTEGER (0..109),
    cds-index-format5-r13                INTEGER (0..1)
}
```

Therefore, semi-persistent channel state reporting is capable of supporting channel state reporting having a relatively larger amount than periodic channel state reporting. Accordingly, Type II channel state reporting requiring a large amount of reporting is not supported periodically in periodic channel state reporting but may be supported in aperiodic channel state reporting and semi-persistent channel state reporting.

In addition, PMI and CQI reporting by subband, which is not supported in periodic channel state reporting, may be supported in semi-persistent channel state reporting and aperiodic channel state reporting. As described above, since semi-persistent channel state reporting and aperiodic channel state reporting can support a relatively large amount of channel state reporting, it is possible to improve the efficiency of channel state reporting by transmitting as much channel state reporting as possible to a base station, and it is possible to improve overall system performance by providing information necessary for scheduling and precoding per subband for the base station.

As mentioned above, in periodic channel state reporting, it is necessary to minimize reporting complexity and overhead in order to minimize complexity and resource usage in supporting the reporting. Semi-persistent channel state reporting can support more complex operations on the basis of a flexible operation of the reporting. To this end, a short-duration PUCCH (hereinafter, short PUCCH) may be used in periodic channel state reporting, while a long-duration PUCCH (hereinafter, long PUCCH) may be used in semi-persistent channel state reporting.

A long PUCCH can be transmitted through at least three OFDM symbols and at most 14 OFDM symbols in one slot and can also be transmitted via an aggregation of a plurality of slots. One purpose of a long PUCCH is to transmit a large amount of information at once. To transmit a large amount of information, a long PUCCH may be transmitted through up to 14 OFDM symbols in a slot, thereby securing a large number of resources on the time axis. In addition, it is possible to aggregate an additional slot. Further, a long PUCCH may be transmitted using a large number of PRBs on the frequency, thus adding a large number of frequency resources to the transmission of the long PUCCH. A long PUCCH enables a UE to transmit a large amount of information to a base station at one time through a relatively large number of time and frequency resources.

Another purpose of a long PUCCH is to enable a UE to secure coverage required to transmit uplink control information (UCI). Unlike a base station, a UE performs transmission with lower power than the base station due to an implementation space, a battery, or the like. Also, unlike in a downlink which is planned in advance through cell planning in advance, an interference UE may dynamically vary according to the distribution and usage of users in an uplink. In the worst case, a UE may suffer severe interference by an adjacent UE when transmitting a signal. Therefore, the UE experiences a low signal-to-interference-plus-noise ratio (SINR). In this case, additional allocation of frequency resources reduces the energy per bit of a signal transmitted by the UE. Thus, in order to secure the coverage of the signal transmitted by the UE, the same information is transmitted via a plurality of time resources, thereby maintaining the energy per bit and improving overall transmission power for the signal. Therefore, the same signal is repeatedly transmitted via a plurality of allocated time resources, thereby enabling the UE to secure the coverage of the uplink signal. Also, a long PUCCH supports transmission based on a DFT-S OFDM waveform exhibiting a low peak-to-average power ratio (PAPR), thereby enhancing the uplink transmission efficiency of a UE.

Compared to a long PUCCH, a short PUCCH enables efficient transmission of a small amount of information using a small number of resources. To this end, a short PUCCH enables transmission of UCI via a small number of OFDM symbols (e.g., one or two OFDM symbols) and is based on a CP-OFDM waveform for efficient data transmission. Short PUCCH transmission may be efficiently performed using a CP-OFDM and a small number of OFDM symbols and may be possible for UEs with a relatively good uplink channel state. However, when the quality of an uplink channel is not sufficiently good because a UE is located at a cell boundary or there is an adjacent UE simultaneously supporting uplink transmission, short PUCCH transmission may not be supported.

Even in a short PUCCH structure, different methods may be supported for multiplexing of a reference signal and transmission data depending on the number of OFDM symbols used for transmission. For example, in one-symbol transmission, multiplexing using frequency resources may be configured for data and a reference signal. In two-symbol transmission, multiplexing using time resources in addition to frequency resources may be considered for data and a reference using the characteristics of the corresponding resource. Tables 17 and 18 illustrate resource multiplexing options according to the number of short PUCCH transmission OFDM symbols. Table 17 illustrates a resource multiplexing option based on one OFDM symbol, and Table 18 illustrates a resource multiplexing option based on two OFDM symbols.

TABLE 17

* RS and UCI of one UE are multiplexed by FDM in each symbol.
* Sequence-based design without reference signal is used only for small (1 to 2) payload size case.
- Information about which sequence/code is transmitted is delivered.
- Sequence is mapped over contiguous or non-contiguous REs.
- UCI sequence can be CDMed with DMRS sequence of other UEs.
* Sequence-based design is used with reference signal only for small (1 to 2) payload size case.
- Information about which/what sequence/code is transmitted is delivered. -RS and UCI are multiplexed by CDM manner
* Pre-DFT multiplexing of RS and UCI
- Consider for both small and large UCI payload size cases
- Possibility 1: {CP + Pilot} + {CP + Data} to avoid multi-path interference (MPI) between pilot and data.
- Possibility 2: CP + {Pilot + Data} as current DFT-s-OFDM
- Other possibilities are not precluded

TABLE 18

* RS and UCI are multiplexed by FDM in each symbol.
* RS and UCI are multiplexed by TDM manner.
* RS and UCI are multiplexed by FDM in one symbol, and only UCI is carried on another symbol without RS.
  * Sequence-based design without RS only for small payload size case
  * Sequence-based design with RS only for small payload size case
  * Pre-DFT multiplexing in one or both symbol(s)

In channel state reporting in the LTE system, as mentioned in Table 1, a base station sets reference signal and report-related configurations for a UE on the basis of a CSI process through a higher-layer configuration. Accordingly, in periodic channel state reporting, channel state information is reported using preset resources at a preset reporting time. In aperiodic channel state reporting, preset configuration information is reported through a trigger in DCI transmitted from the base station through a downlink control signal.

As mentioned above, in semi-persistent channel state reporting, when supporting activation through DCI, activation and deactivation with low latency may be supported, but the UE may not receive the DCI or may receive wrong DCI, thus reporting channel state information according to wrong time and wrong configurations. Further, with activation through an MAC CE, erroneous reception is less likely to occur due to the support of an ARQ, but latency is not favorable compared to higher-layer signaling, such as RRC signaling. Therefore, in order to overcome the disadvantages of DCI-based activation and deactivation and MAC CE-based activation and deactivation, the MAC CE-based activation and deactivation and the DCI-based activation and deactivation may be used in combination. For example, the channel reporting settings, the RS settings, and the channel measurement settings in Table 13 are set for a UE through K (K≥1) higher-layers, and N (N≥1) settings of the set K reporting settings are set through an MAC CE as candidate resources that the base station can activate for the UE.

Figure 7:
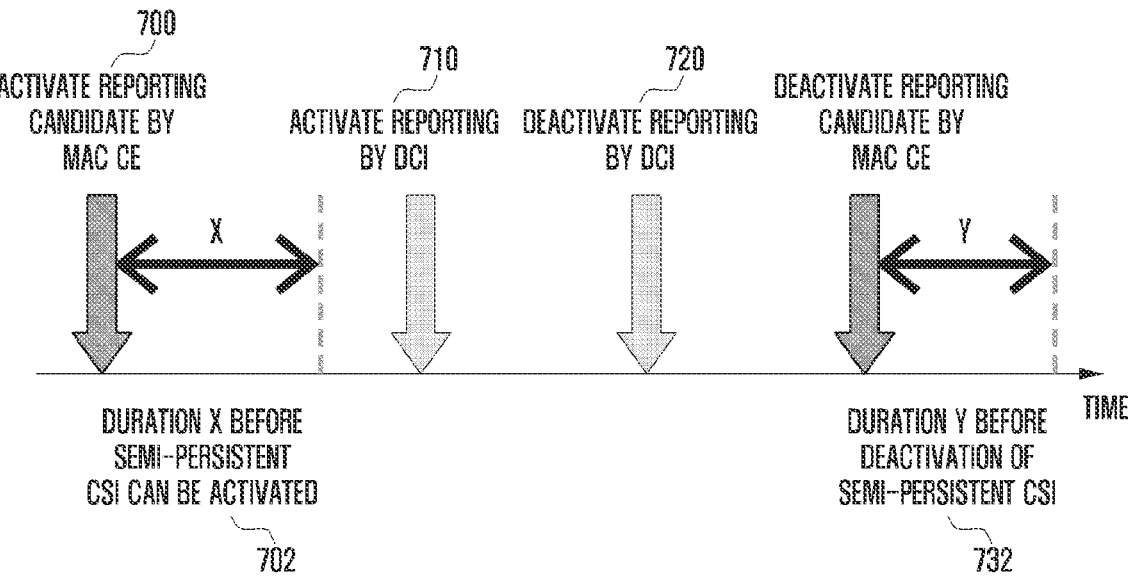
FIG. 7 illustrates an example of candidate activation through an MAC CE and subsequent activation of actual semi-persistent channel state reporting via DCI.

FIG. 7 illustrates an example of candidate activation through an MAC CE and subsequent activation of actual semi-persistent channel state reporting via DCI.

As illustrated in FIG. 7, a base station sets some (N) of reporting settings as activation candidate resources through an MAC CE (700). Then, the base station may activate M (M≥1) resources among the N semi-persistent reporting candidate resources through DCI transmitted by the base station so that a UE can perform reporting (710). Here, X or Y slots, subframes, or mini-slots may be needed (702, 732) until the base station is allowed to activate (710) and deactivate (720) the reporting candidate resources for the UE through the DCI after the resources are activated via the MAC CE. Here, although different activation and deactivation signals of candidate setting are shown, activation and deactivation signals of the candidate setting may be configured using the same bitmap. For example, 0 may indicate deactivation of a candidate, and 1 may indicate activation. Candidate resources for semi-persistent reporting may also be used together with candidate resources for aperiodic channel status reporting.

In addition, the activation and deactivation of candidate setting based on the MAC CE may be equally applied to a semi-persistent CSI-RS.

When semi-persistent channel status reporting setting and activation is performed using the RS setting, the channel state reporting setting, and the channel measurement setting in Table 14, information configured by the base station through a higher layer may be used as the RS setting and the channel state reporting setting, and the channel measurement setting may be transmitted by the base station to the UE through the DCI. In this case, the base station can flexibly change the measurement setting in the semi-persistent channel state reporting settings that support flexible activation and deactivation of channel state reporting, thereby efficiently operating reporting resources.

As mentioned above, aperiodic channel state reporting and semi-persistent channel state reporting share a large number of characteristics, such as Type II channel state reporting and channel state reporting for subbands. Accordingly, when a trigger for aperiodic channel state reporting and a downlink control signal for activating semi-persistent channel state reporting are separately provided, great overhead for support of different DCI formats, information quantity for triggering and activation, time and frequency resources for uplink transmission, or the like is required for reporting. Thus, a trigger for aperiodic channel state reporting and bits for activating semi-persistent channel state reporting may be shared (i.e., triggering of aperiodic channel state reporting and activation of semi-persistent channel state reporting are performed with the same information), thereby minimizing DCI formats, information quantity, and the use of frequency and time resources and achieving efficient operation. For example, in the LTE system, a bit of 1 or 0 is used for a CSI process or cells to indicate whether a CSI process or a cell is triggered for aperiodic channel state reporting. Such information may also be used in the NR system to support triggering or activation of aperiodic or semi-persistent channel state reporting for the foregoing CSI measurement settings or a CSI process supported by the NR system. Further, X and Y may be the same period.

In the resource allocation, a reporting type indication using DCI may be supported. For example, 0 may indicate aperiodic channel state reporting, and 1 may indicate semi-persistent channel state reporting. In this case, when the base station indicates 0 along with channel state measurement information, the UE may determine that aperiodic channel state reporting is triggered and may report channel state information via only one time resource. When the base station indicates 1, the UE may determine that semi-persistent channel state reporting is activated or deactivated and may report channel state information via a plurality of time resources.

As a resource allocation method for semi-persistent channel state reporting described above, the following methods may be used.

Resource allocation method 1 for semi-persistent channel state reporting: A method of configuring a resource for semi-persistent channel state reporting through a higher layer Resource allocation method 2 for semi-persistent channel state reporting: A method of dynamically configuring a resource for semi-persistent channel state reporting through DCI or an MAC CE Resource allocation method 1 for semi-persistent channel state reporting is a method of configuring a resource through a higher layer. For semi-persistent channel state reporting, higher-layer channel reporting settings may be configured in advance as in the PUCCH resource configuration (0 to 1184) in Table 15. When aperiodic channel state reporting and semi-persistent channel state reporting are triggered or activated and deactivated on the basis of one piece of DCI, if semi-persistent channel state reporting uses resource allocation method 1 and resource allocation for aperiodic channel state reporting is transmitted through the DCI or an MAC CE, the UE may not need resource allocation information transmitted using the DCI or the MAC CE. Therefore, in this case, a resource allocation bit may be used as a method for distinguishing aperiodic channel state reporting from semi-persistent channel state reporting. For example, when any resource is not allocated through the resource allocation information, aperiodic channel state reporting may not be supported. Therefore, when any resource is not allocated (e.g., all bits of the resource allocation information are 0) and an indication of this information is transmitted to the UE, the UE determines that the indication is a trigger for semi-persistent channel statue reporting and uses semi-persistent channel statue reporting.

Figure 8:
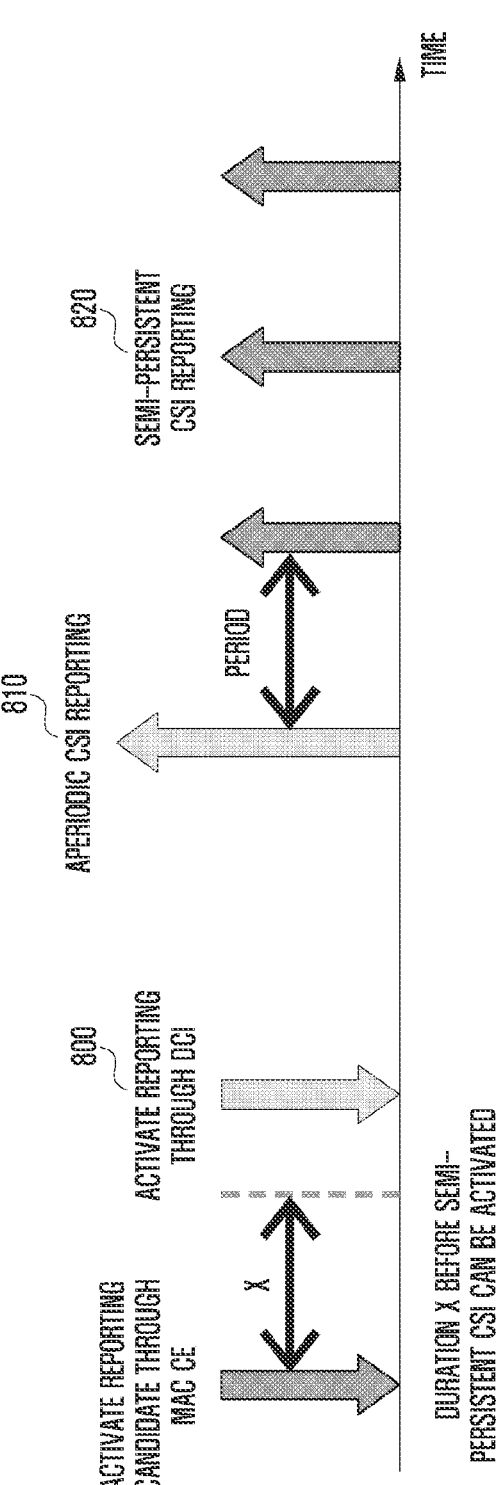
FIG. 8 illustrates an example of the operation of a UE that reports an aperiodic channel state in initial reporting of semi-persistent channel state reporting.

In an alternative method according to FIG. 8, when the base station indicates (800) a semi-persistent channel state reporting trigger using an independent indication bit through DCI in the above situation, the UE may perform (810) aperiodic channel state reporting on the basis of a resource allocation information bit at the initial transmission time of an initial semi-persistent channel state reporting or the time of aperiodic channel state reporting by the DCI and may perform (820) semi-persistent channel state reporting via a resource set in advance through a higher layer at the transmission time of a remaining semi-persistent channel state report.

FIG. 8 illustrates an example of the operation of a UE that reports an aperiodic channel state in initial reporting of semi-persistent channel state reporting. This aperiodic channel state reporting enables a base station to identify whether the UE properly receives a corresponding semi-persistent channel state reporting activation or deactivation signal, thereby securing the reliability of an indication through DCI.

Here, resource allocation for aperiodic channel state reporting by the base station may employ a method illustrated in resource allocation method 2 below.

Resource allocation method 2 is a method of configuring a resource through DCI or an MAC CE, which transmits a reporting configuring resource to a UE. Here, the following methods may be used as a resource transmission unit definition method.

Resource allocation unit definition method 1 for semi-persistent channel state reporting: A method of allocating a reporting resource to a particular RBG and transmitting channel state information via the particular RBG Resource allocation unit definition method 2 for semi-persistent channel state reporting: A method of allocating a reporting resource to particular noncontiguous RBs and transmitting channel state information via the particular RBG Resource allocation unit definition method 3 for semi-persistent channel state reporting: A method of allocating a reporting resource to particular contiguous RBs and transmitting channel state information via the particular RBG Resource allocation unit definition method 1 is a method of allocating a semi-persistent channel state reporting to a particular RBG and transmitting the reporting via the RBG. In the channel state report, the size of the RBG may change depending on the system bandwidth supported by a system. Table 19 illustrates the RBG size according to the system bandwidth configuration in the LTE system.

TABLE 19

| Bandwidth (#RBs) | RBG size (P) |
|---|---|
| ≤10 | 1 |
| 11-26 | 2 |
| 27-63 | 3 |
| 64-110 | 4 |

Accordingly, the RBG size may change according to the system bandwidth configuration. For example, in 50 RBs, three RBs are set to one RBG according to Table 19, and accordingly there are 18 subbands. For this configuration, an RBG may be configured by a bitmap using an 18-bit field. In this case, a range in which the UE needs to estimate a channel is smaller than the full band, thus reducing the channel estimation complexity of the UE. Further, it is possible to flexibly use resources in RBGs smaller than subbands.

Figure 9:
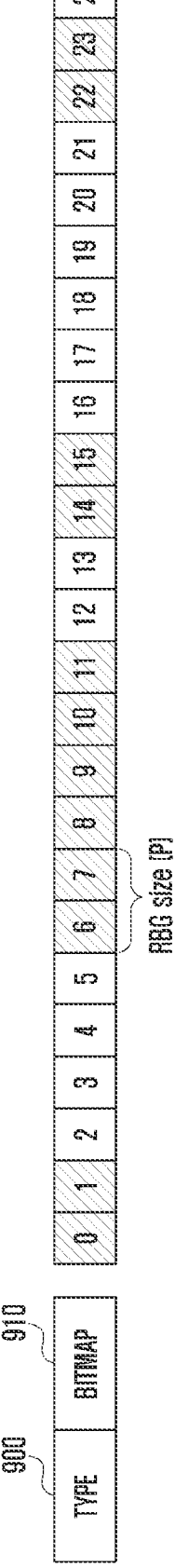
FIG. 9 illustrates downlink resource allocation type 0.

FIG. 9 illustrates downlink resource allocation type 0.

As illustrated in FIG. 9, type 0 is a method of allocating resources in a predetermined RBG according to the system bandwidth. To allocate resources on the basis of type 0, a base station uses a bit 900 to first indicate a resource allocation type. Further, for actual resource allocation, a UE may be allocated an RBG using a bitmap 910 having a size of $$\lceil N_{RB}^{DL}/P \rceil$$

using the RBG size according to system bandwidth in Table 19 and may receive downlink data through the resource. Likewise, the base station may allocate a semi-persistent channel state reporting by RBG using the method in order to indicate whether to transmit a semi-persistent channel state reporting to the UE via the RBG.

Resource allocation unit definition method 2 is a method of allocating a semi-persistent channel state reporting to particular noncontiguous RBs and transmitting the reporting via the noncontiguous RBs. This method supports aperiodic reporting by noncontiguous RBs, thereby increasing flexibility in using resources.

Figure 10:
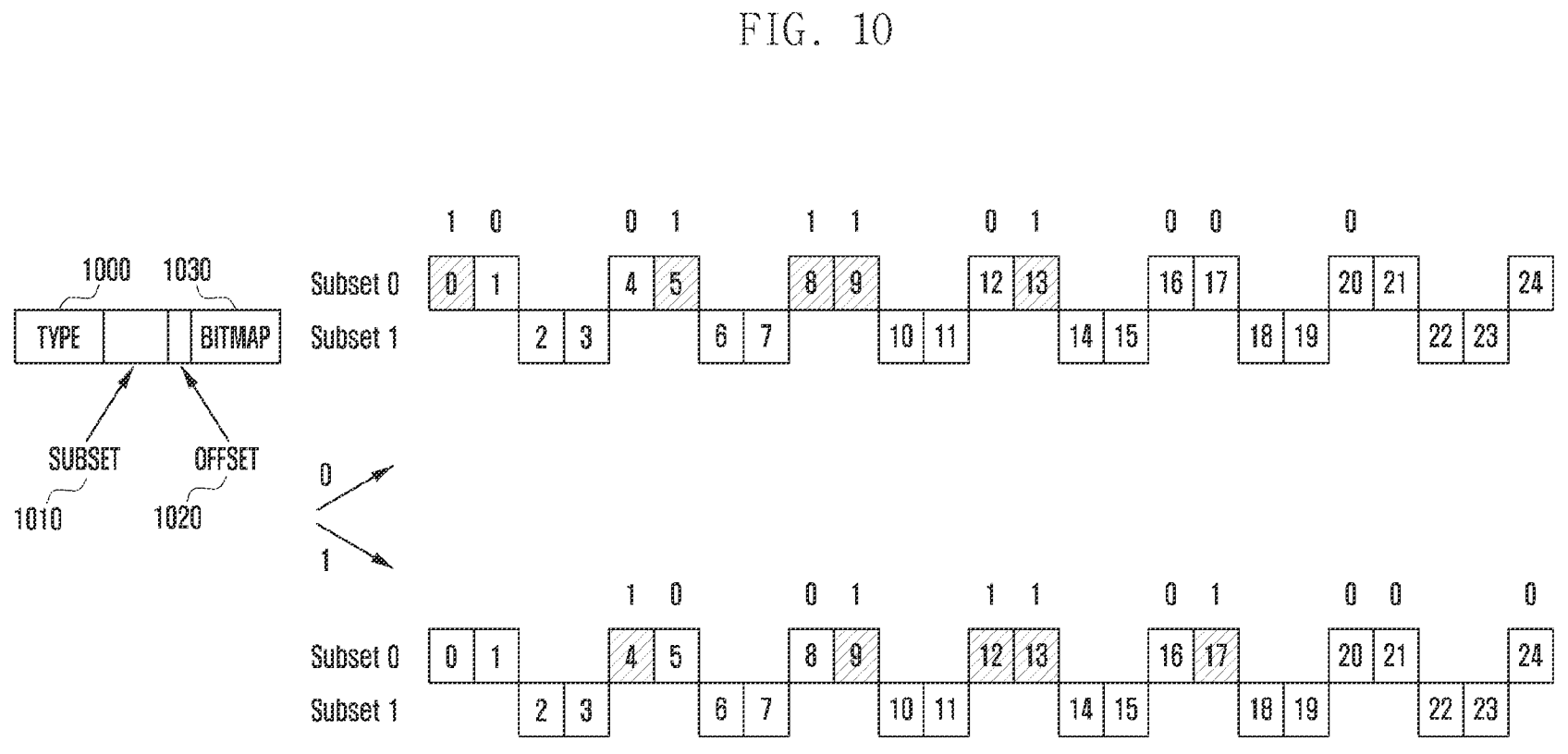

FIG. 10 illustrates downlink resource allocation type 1.

As illustrated in FIG. 10, to allocate resources on the basis of type 1, a base station uses a bit 1000 to first indicate a resource allocation type. Further, if resources are allocated by RB at once in the entire band, signaling overhead is excessively increased, and thus a resource may be divided into two parts using an offset 1020 for transmission. In addition, type I and type 0 use the same amount of signaling, for which a UE may be allocated an RB using a bitmap 1030 having a size of $$(\lceil N_{RB}^{DL}/P \rceil - \lceil \log_2(P) - 1 \rceil),$$

which corresponds to a bitmap having a size of $$\lceil N_{RB}^{DL}/P \rceil$$

used for type 1 minus a $\lceil \log_2(P) \rceil$ bit 1010 for subset selection and one bit for offset selection, and may receive downlink data through the resource. The base station may indicate a resource for semi-persistent channel state reporting to the UE by reusing the method of downlink resource allocation type 1.

Resource allocation unit definition method 3 is a method of allocating a semi-persistent channel state reporting to particular contiguous RBs and transmitting the reporting via the contiguous RBs. Unlike supporting semi-persistent channel state reporting by noncontiguous RBs, this method indicates only an RB position where allocation starts, the length of RBs, and an RB position where allocation terminates, thus reducing signaling overhead compared to the other allocation methods.

FIG. 11 illustrates downlink resource allocation type 2.

As illustrated in FIG. 11, to allocate resources on the basis of resource allocation type 2, a base station uses a bit 1100 to first indicate whether resources are allocated in the form of a localized virtual resource block (LVRB) of in the form of a distributed virtual resource block (DVRB). On the basis of this bit, a start RB position and the length are indicated through a resource indication value (RIV). Here, the start position and the length may be obtained by Equation 2 according to the DCI format.

For, *DCI* format 1*A*, 1*B* and 1*D*, [Equation 2]

$$RIV = \begin{cases} N_{RB}^{DL}(L_{CRBs} - 1) + RB_{start} & \left(L_{CRBs} - 1 \le \lfloor N_{RB}^{DL}/2 \rfloor\right) \\ N_{RB}^{DL}\left(N_{RB}^{DL} - L_{CRBs} + 1\right) + \left(N_{RB}^{DL} - 1 - RB_{start}\right) & \text{otherwise} \end{cases}$$

For *DCI* format 1*C*, $$RIV = \begin{cases} N'_{VRB}^{DL}(L'_{CRBs} - 1) + RB'_{start} & \left(L'_{CRBs} - 1 \le \lfloor N'_{VRB}^{DL}/2 \rfloor\right) \\ N'_{VRB}^{DL}\left(N'_{VRB}^{DL} - L'_{CRBs} + 1\right) + \left(N'_{RB}^{DL} - 1 - RB_{start}\right) & \text{otherwise} \end{cases}$$

where $RB'_{start} = RB_{start}/N_{RB}^{step}$ $L'_{CRBs} = L_{CRBs}/N_{RB}^{step}$ $N'_{VRB}^{DL} = \lfloor N_{VRB}^{DL}/N_{RB}^{step} \rfloor$ Here, resource allocation bits $$\lceil \log_2(N_{RB}^{DL}(N_{RB}^{DL} + 1)/2) \rceil$$

and $$\lceil \log_2(\lfloor N_{VRB,gap1}^{DL}/N_{RB}^{step} \rfloor \cdot (\lfloor N_{VRB,step}^{DL}/N_{RB}^{step} \rfloor + 1)/2) \rceil$$

are used.

Although the embodiment of the disclosure illustrates only the downlink resource allocation methods, an uplink resource allocation method operating according to the same principle may employ the foregoing signaling according to the same principle.

When a semi-persistent channel state reporting resource is allocated by the resource allocation method, an indication for this resource allocation may be commonly used by semi-persistent channel state reporting and aperiodic channel state reporting. Therefore, as described above, when the base station transmits the indication for the resource allocation to the UE through the same DCI, the UE may check whether the indication is to trigger aperiodic channel state reporting or to activate or deactivate semi-persistent channel state reporting and may check whether the allocated resource is used for aperiodic channel state reporting or for semi-persistent channel state reporting according to the indication.

Also, when the indication for the resource allocation is used for semi-persistent CSI-RS transmission and aperiodic CSI-RS transmission, the gist of the disclosure may be applied equally. That is, a semi-persistent CSI-RS and an aperiodic CSI-RS may be activated/deactivated or transmitted via the same DCI and it may be indicated via DCI whether a corresponding trigger is for the semi-persistent CSI-RS or for the aperiodic CSI-RS.

As still another method, a method of combining allocation using a higher layer and dynamic allocation, which are described above, may be used. For example, in this method, a plurality of resources for semi-persistent channel state reporting is allocated using a higher layer by resource allocation method 1 and is dynamically selected through DCI or an MAC CE. This method may be supported using independent DCI or MAC CE field. Alternatively, when the base station indicates to the UE that semi-persistent channel state reporting is supported using one bit, the UE may interpret a resource allocation field for aperiodic channel state reporting differently as a field for resource selection for semi-persistent channel state reporting.

As mentioned above, both aperiodic channel state reporting and semi-persistent channel state reporting may support a plurality of subband reports. As mentioned above, periodic channel state reporting of the existing LTE system has dependency between reporting times (inter-subframe dependency). In this case, however, if one piece of information is not properly decoded, all of other pieces of information cannot be properly decoded. For example, if an RI is not properly decoded, all PMI and CQI information associated with this RI reporting cannot be correctly decoded. Therefore, the NR system is required to reduce such dependency. However, subband reporting has an increase in reporting amount. To this end, if reporting is performed at separate reporting times, the number of reporting times increases, and thus dependency between reporting times also increases. In this case, if reporting at an earlier time is not properly performed, subsequent reports lose validity. Also, assuming that the time for periodic channel state reporting cannot always be guaranteed in an unlicensed band, this risk increases. In order to reduce the information transmission amount of a report, unlike aperiodic channel state reporting, semi-persistent channel state reporting may consider the following methods.

Subband information amount reduction method 1 for semi-persistent channel state reporting: A method of using relatively large subbands.

Subband information amount reduction method 2 for semi-persistent channel state reporting: A method of using subbands having different sizes according to a size allowed in resource allocation and a reporting information amount to be reported at a reporting time.

Subband information amount reduction method 1 for semi-persistent channel state reporting is using a relatively large subband. For example, the LTE system uses a subband with a size of one, two, three, or four PRBs depending on the system bandwidth. In this case, when a subband with a size of two, four, six, or eight PRBs is supported for semi-persistent channel state reporting, a channel state information reporting amount for the subband may be halved.

Subband information amount reduction method 2 for semi-persistent channel state reporting is a method of using subbands having different sizes according to a size allowed in resource allocation and a reporting information amount to be reported at a reporting time. Table 20 illustrates resource configurations for PUCCH formats 4 and 5 of the LTE system.

TABLE 20

| Format4-resource-r13 ::= | SEQUENCE { |
| startingPRB-format4-r13 | INTEGER (0..109), |
| numberOfPRB-format4-r13 | INTEGER (0..7) |
| } | |
| Format5-resource-r13 ::= | SEQUENCE { |
| startingPRB-format5-r13 | INTEGER (0..109), |
| cdm-index-format5-r13 | INTEGER (0..1) |
| } | |

According to PUCCH formats 4 and 5, up to 96 bits (in the configuration of one RB) and up to 48 bits can be transmitted, respectively. In format 4, a plurality of RBs can be configured, and accordingly as many bits as the number of RBs multiplied by 96 bits can be transmitted. Therefore, the UE can calculate transmittable subband information by calculating the maximum transmission amount. Here, the calculation may be performed in consideration of various aspects, such as a multi-cell, multiple CSI processes, a multi-CSI measurement set trigger, and Type II CSI simultaneous transmission. For example, when 20 bits are needed for one subband channel state reporting and there is a remaining space of 40 bits allowed for entire semi-persistent channel state reporting, the UE may generate two pieces of subband information by configuring a subband size to a half of the entire system band or a total band allocated for the UE and may report the subband channel state information to the base station.

Figure 12:
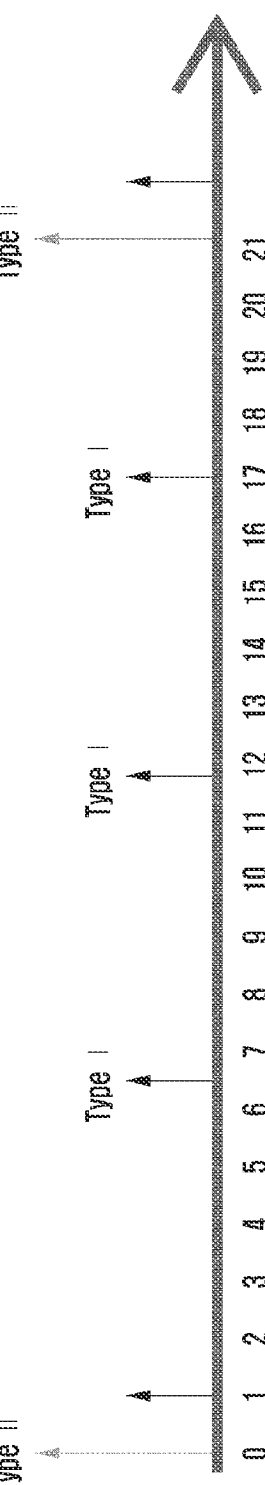
FIG. 12 illustrates an example of supporting both Type I channel reporting and Type II channel reporting.

As mentioned above, semi-persistent channel state reporting can support both Type I channel state information and Type II channel state information. In this case, one measurement setting or CSI process may be configured to support both Type I channel state information and Type II channel state information at different reporting times. FIG. 12 illustrates an example of supporting both Type I channel reporting and Type II channel reporting.

As mentioned above, Type II channel state reporting requires a large amount of information. Therefore, it may be difficult to report Type II information together with Type I information. In this case, the channel state information may be reported by the following methods.

Reporting method 1 in the occurrence of a collision between Type I channel state reporting and Type II channel state reporting: Type II information may preferentially be transmitted.

Reporting method 2 in the occurrence of a collision between Type I channel state reporting and Type II channel state reporting: Information configured by a base station through a higher layer may be selected and transmitted.

In reporting method 1 in the occurrence of a collision between Type 1 channel state reporting and Type II channel state reporting, Type II information is preferentially transmitted. As described above, since Type II information provides a large amount of information and involves high reference signal overhead, high UE complexity, and high reporting overhead in generating the information, Type II information is generated or triggered per long period. On the other hand, Type I information requires relatively low reference signal overhead, low UE complexity, and low reporting overhead and thus is relatively frequently generated and reported. Therefore, since Type II information is more important information, it is advantageous for the base station that the UE preferentially transmits Type II channel state information. This method may be equally applied to the LTE system. The LTE system supports advanced channel state reporting through the following linear combination compared to an existing codebook.

A precoder is normalized by the following equation.

$$W_1 = \begin{bmatrix} B & 0 \\ 0 & B \end{bmatrix},$$

$$B = \left[ p_0 b_{k_1^{(0)}, k_2^{(0)}}, \ldots, p_{L-1} b_{k_1^{(L-1)}, k_2^{(L-1)}} \right]$$

-continued

-For rank 1: $W = \begin{bmatrix} w_{0,0} \\ w_{1,1} \end{bmatrix} = W_1 W_2$, and $W_2 = \begin{bmatrix} c_{0,0} \\ c_{1,0} \end{bmatrix}$ -For rank 2: $W = \begin{bmatrix} w_{0,0} & w_{0,1} \\ w_{1,0} & w_{1,1} \end{bmatrix} = W_1 W_2$, and $W_2 = \begin{bmatrix} c_{0,0} & c w_{0,1} \\ c_{1,0} & c_{1,1} \end{bmatrix}$ $-c_{r,l} = [c_{r,l,0}, \ldots, c_{r,l,L-1}]^T$, $r = 0, 1, l = 0, 1$ $w_{r,l} = \sum_{l=0}^{L-1} b_{k_1^{(l)}, k_2^{(l)}} \cdot p_i \cdot c_{r,l,i}$; $r = 0, 1, l = 0, 1$ L=2 indicates the number of beams.

$b_{k_1, k_2}$ is a 2D DFT beam from an oversampled grid.

$k_1 = 0, 1, \ldots, N_1 O_1 - 1$ $k_2 = 0, 1, \ldots, N_2 O_2 - 1$ $0 \le p_i \le 1$ is a beam power scaling factor for beam i.

$c_{r,l,i}$ is a beam combining coefficient for beam I, polarization) r, and layer l.

Here, beam selection of W1 is represented as below.

$O_1 = O_2 = 4$(if $N_2 = 1, O_2 = 1$)

$2N_1 N_2 \in \{4, 8, 12, 16, 20, 24, 28, 32\}$

The leading (stronger) beam index:

$-k_1^{(0)} = 0, 1, \ldots, N_1 O_1 - 1$ $-k_2^{(0)} = 0, 1, \ldots N_2 O_2 - 1$ The second (weaker) beam index:

$-k_1^{(1)} = k_1^{(0)} + O_1 d_1$ $-k_2^{(1)} = k_2^{(0)} + O_2 d_2$ $*d_1 \in \{0, \ldots, \min(N_1, L_1) - 1\}$ $*d_2 \in \{0, \ldots, \min((N_2, L_2) - 1\}$ $*(d_1, d_2) \ne (0, 0)$ $*$Where $L_1, L_2$ are defined as:

-If $N_1 \ge N_2$ and $N_2 \ne 1 \rightarrow L_1 = 4, L_2 = 2$

-If $N_1 < N_2$ and $N_2 \ne 1 \rightarrow L_1 = 4, L_2 = 2$

-If $N_2 = 1 \rightarrow L_1 = 8, L_2 = 1$

Here, beam power of W1 is determined as below.
Second beam power is quantized by two bits.

$p_0 = 1, p_1 \in \{1, \sqrt{0.5}, \sqrt{0.25}, 0\}$

Here, W2 is determined as below.

$$c_{0,0,0} = c_{0,1,0} = 1 \text{ always}$$
$$c_{r,l,i} \in \{1, j, -1, -j\}, \forall \ i, r, l$$

When $$N_1 = N_2 = 4,$$

overhead of W1 is represented as below:

indicate leading beam: $(\log_2(N_1 N_2 O_1 O_2)) - (\log_2 (16 N_1 N_2)) = 8 bits$ indicate second beam:

$$\left\lceil \begin{pmatrix} 7 \\ 1 \end{pmatrix} \right\rceil = 3 \text{ bits}$$

Relative power of weaker beam: 2 bits

The bit numbers of W1 and W2 according to each rank are illustrated below.

TABLE 21

| Rank | W1(bits) | W2(bits) |
|------|----------|----------|
| 1    | 13       | 6        |
| 2    | 13       | 12       |

In reporting method 2 in the occurrence of a collision between Type I channel state reporting and Type II channel state reporting, information configured by a base station through a higher layer is selected and transmitted. The base station may directly configured reporting priorities for a UE through a higher layer. Thus, the UE determines and decides reporting priorities according to priorities configured in a measurement setting in the occurrence of a collision. This method may be used for the same channel state reporting (Type I and Type I) and is more useful when various services are simultaneously supported as in FIG. 2.

Although the proposed methods of the disclosure have been described as being used for downlink channel state reporting, the proposed methods of the disclosure may also be equally applied to uplink channel state reporting and sidelink channel state reporting.

Although the proposed methods of the disclosure have been described as being used for semi-persistent channel state reporting and aperiodic channel state reporting, the proposed methods of the disclosure may also be equally applied to a semi-persistent CSI-RS and an aperiodic CSI-RS.

A reference signal that a UE needs for channel estimation in receiving data is transmitted at regular frequency and time intervals.

Figure 13:
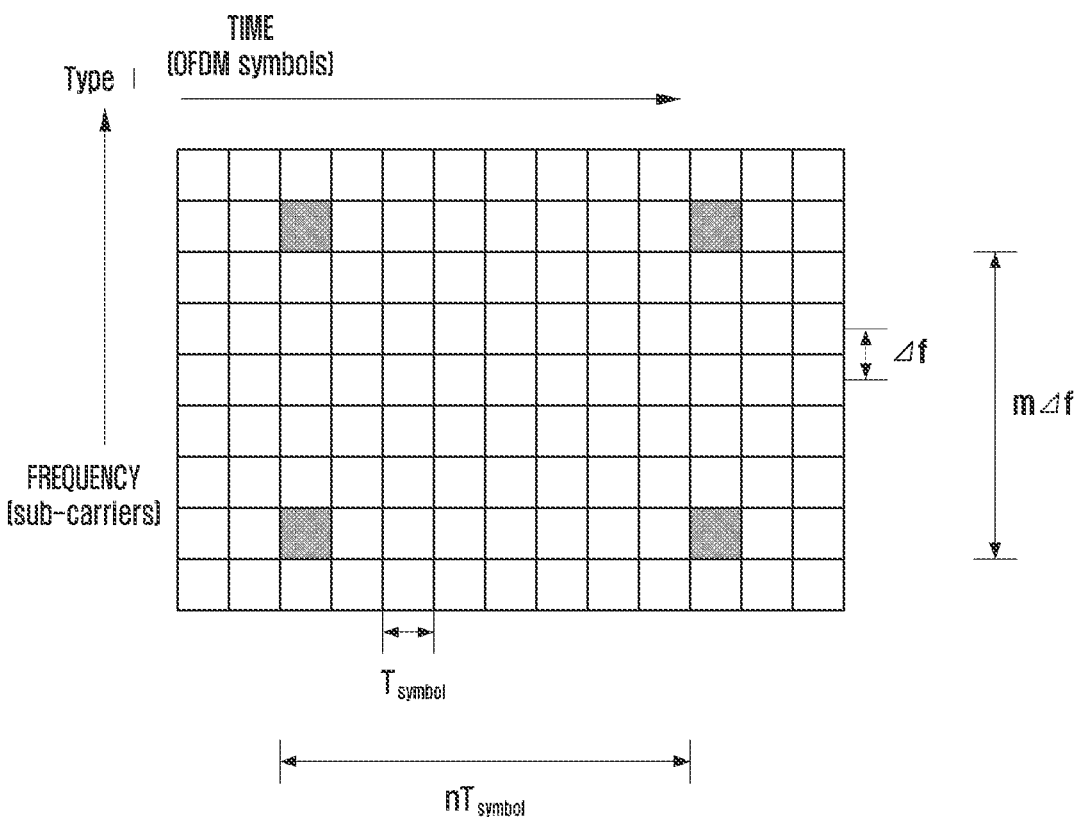
FIG. 13 illustrates an example of time and frequency intervals between reference signals.

FIG. 13 illustrates an example of time and frequency intervals between reference signals.

The time and frequency intervals between the reference signals illustrated in FIG. 13 may vary according to subcarrier spacing. The intervals change depending on the maximum delay spread and the maximum Doppler spread that occur in a channel according to the subcarrier spacing. Equations 3 and 4 represent time and frequency intervals between reference signals considering the maximum delay spread and the maximum Doppler spread.

$$n \leq \frac{1}{2 T_{symbol} v_{max}} \qquad \text{[Equation 3]}$$

$$m \leq \frac{1}{2 \Delta f \tau_{max}} \qquad \text{[Equation 4]}$$

Here, Vmax denotes the maximum Doppler spread, $T_{symbol}$ denotes OFDM symbol duration, $\Delta f$ denotes the subcarrier spacing, and $\tau_{max}$ denotes the maximum delay spread. In the NR system, not only $\Delta f$ but also $T_{symbol}$ changes in inverse proportion to a change in subcarrier spacing. Therefore, efficiency with which a base station transmits data to a UE changes depending on subcarrier spacing or numerology.

FIG. 14 illustrates system performance that varies according to subcarrier spacing on the basis of various channel models.

As shown in FIG. 14, even when data is transmitted in the same band, system performance changes according to subcarrier spacing. Therefore, in order to deal with a change in the system performance, a UE may transmit a channel state reporting to a base station by reflecting the subcarrier spacing or numerology. When the UE transmits a channel state reporting to the base station by reflecting the subcarrier spacing or numerology, the UE can report an accurate channel state and a CQI to the base station, and the base station can minimize data loss and maximize system performance on the basis of the channel state report. For reporting that reflects the subcarrier spacing or numerology, the base station may configure subcarrier spacing for the UE using the following methods.

Subcarrier spacing setup method 1 for channel state reporting: Subcarrier spacing for channel state reporting is configured using a direct method.

Subcarrier spacing setup method 2 for channel state reporting: Subcarrier spacing for channel state reporting is configured using an indirect method.

Subcarrier spacing setup method 1 for channel state reporting is a method of configuring subcarrier spacing for channel state reporting using a direct method. In this method, the base station directly sets, for the UE, subcarrier spacing necessary for channel state reporting, so that the UE can identify the subcarrier spacing for data transmission and can receive data. To this end, the base station may configure or transmit the subcarrier spacing using RRC signaling, an MAC CE, or the DCI to the UE. When using an MAC CE or DCI, the base station may designate some of subcarrier spacing candidates preset by RRC signaling through the MAC CE or DCI, may reselect some of the subcarrier spacing candidates configured by RRC signaling as candidates for DCI indication through the MAC CE, and may select final subcarrier spacing via DCI.

Subcarrier spacing setup method 2 for channel state reporting is a method of configuring subcarrier spacing for channel state reporting using an indirect method. The base station can indirectly configure subcarrier spacing in order to configure subcarrier spacing for channel state reporting. For example, the UE may identify subcarrier spacing for channel state reporting through reference numerology configured by the base station. For example, when the reference numerology is 15 kHz, the UE may recognize that numerology for channel state reporting is also 15 kHz. In another example, it is also possible to follow the subcarrier spacing or numerology of a CSI-RS. The UE may identify subcarrier spacing or numerology for channel state reporting according numerology set for CSI-RS transmission performed or configured for channel state reporting to the UE. In still another example, numerology of data transmission performed most recently to the UE may be used. In the NR system, general data and data transmitted for high mobility and URLLC transmission may have different numerologies. In this case, channel state reporting may be performed according to the numerology of data transmission most recently performed.

Figure 15:
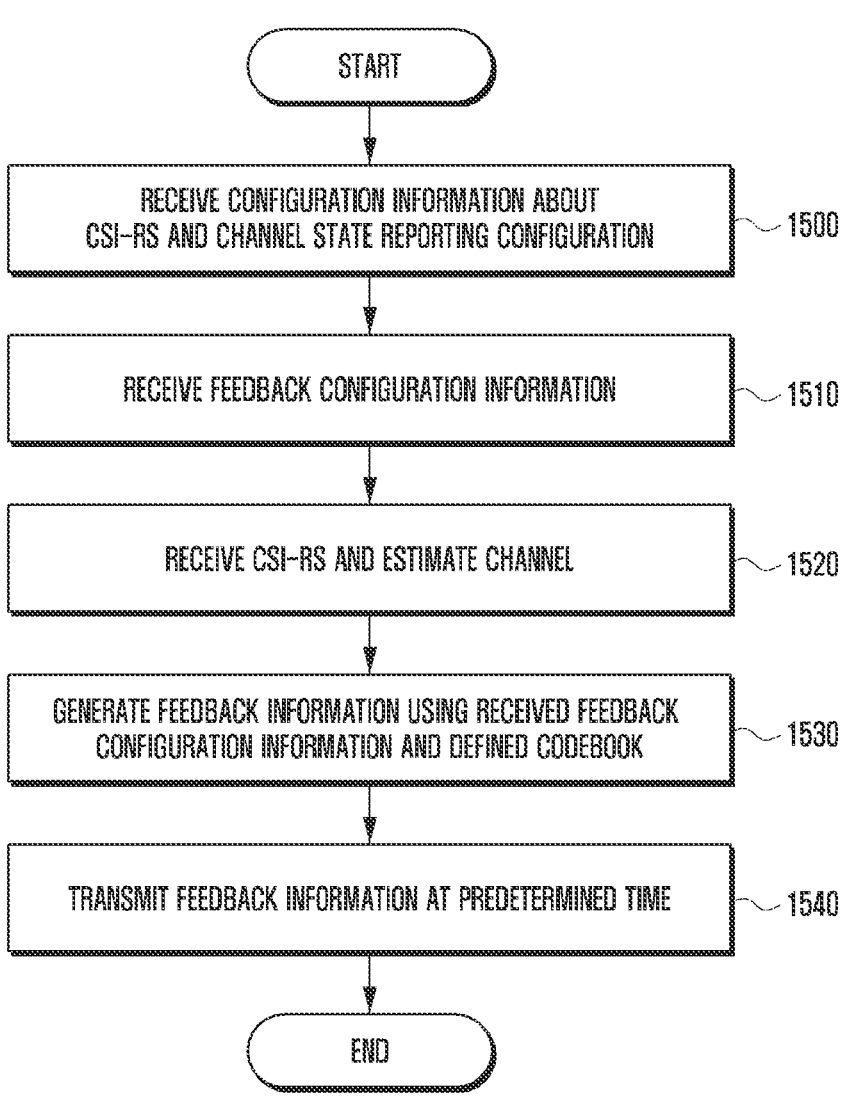
FIG. 15 is a flowchart illustrating the sequence of operations of a UE according to an embodiment of the disclosure.

FIG. 15 is a flowchart illustrating the sequence of operations of a UE according to an embodiment of the disclosure.

Referring to FIG. 15, in operation 1500, the UE receives configuration information about a CSI-RS and a channel state reporting configuration. Also, the UE may identify, on the basis of the received configuration information, at least one of the number of ports for respective non-precoded (NP) CSI-RSs, the number of antennas by dimension, which is N1 and N2, an oversampling factor by dimension, which is O1 and O2, one subframe config for transmitting a plurality of CSI-RSs and a plurality of resource configs for configuring a position, codebook subset restriction-related information, CSI report-related information, a CSI process index, and transmission power information (P$_C$). In operation 1510, the UE receives one piece of feedback configuration information based on a CSI-RS position. This information may include periods and offsets of a PMI and/or a CQI, a period and an offset of an RI, a period and an offset of a CRI, wideband or subband configurations, or submode configurations. In operation 1520, the UE receives a CSI-RS on the basis of the information and estimates a channel between a base station antenna and a reception antenna of the UE on the basis of the CSI-RS. In operation 1530, the UE generates a feedback information rank, a PMI, and a CQI using the received feedback configuration on the basis of the estimated channel and may select an optimal CRI on the basis of the feedback information rank, the PMI, and the CQI. In operation 1540, the UE transmits the pieces of feedback information to the base station at a feedback time predetermined according to the feedback configuration or an aperiodic channel state reporting trigger of the base station, thereby completing generating and reporting channel feedback.

Figure 16:
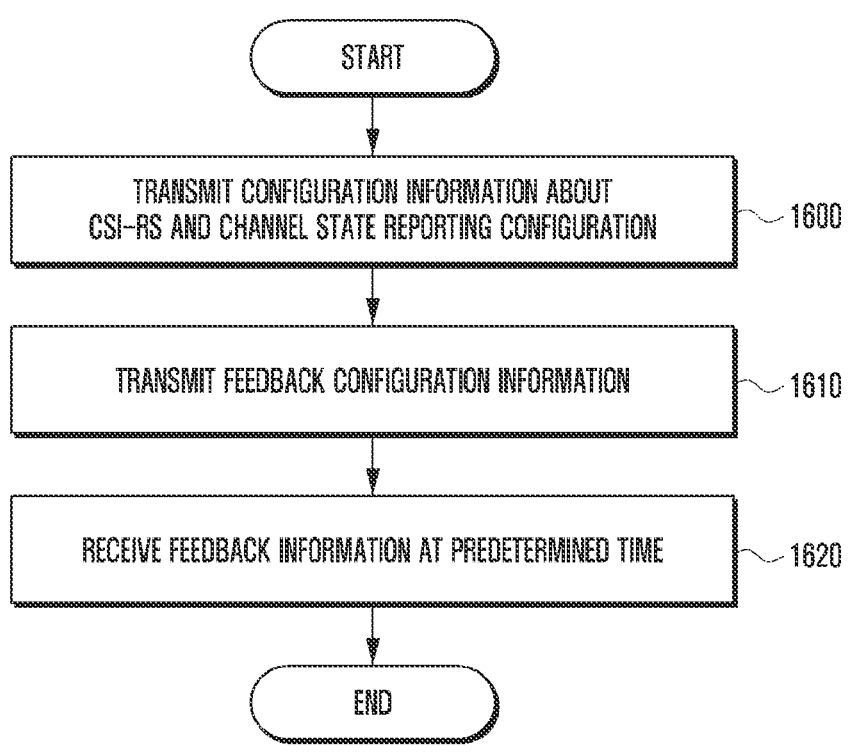
FIG. 16 is a flowchart illustrating the sequence of operations of a base station according to an embodiment of the disclosure.

FIG. 16 is a flowchart illustrating the sequence of operations of a base station according to an embodiment of the disclosure.

Referring to FIG. 16, in operation 1600, the base station transmits configuration information about a CSI-RS for channel estimation and a channel state reporting configuration to a UE. In order to transmit a CSI-RS on the basis of the configuration information, at least one of the number of ports for NP CSI-RSs, the number of antennas by dimension, which is N1 and N2, an oversampling factor by dimension, which is O1 and O2, one subframe config for transmitting a plurality of CSI-RSs and a plurality of resource configs for configuration a position, codebook subset restriction-related information, CSI report-related information, a CSI process index, and transmission power information (P$_C$) may be included. In operation 1610, the base station transmits feedback configuration information based on at least one CSI-RS to the UE. This information may include periods and offsets of a PMI/CQI, a period and an offset of an RI, a period and an offset of a CRI, wideband or subband configurations, or submode configurations. Next, the base station transmits a configured CSI-RS to the UE. The UE estimates a channel by antenna port and estimates an additional channel for a virtual resource on the basis of the estimated channel. The UE determines feedback, generates a CRI, a PMI, an RI, and a CQI corresponding to the feedback, and transmits the CRI, the PMI, the RI, and the CQI to the base station. In operation 1620, the base station receives feedback information from the UE at a predetermined time and uses the feedback information in determining the state of a channel between the UE and the base station.

Figure 17:
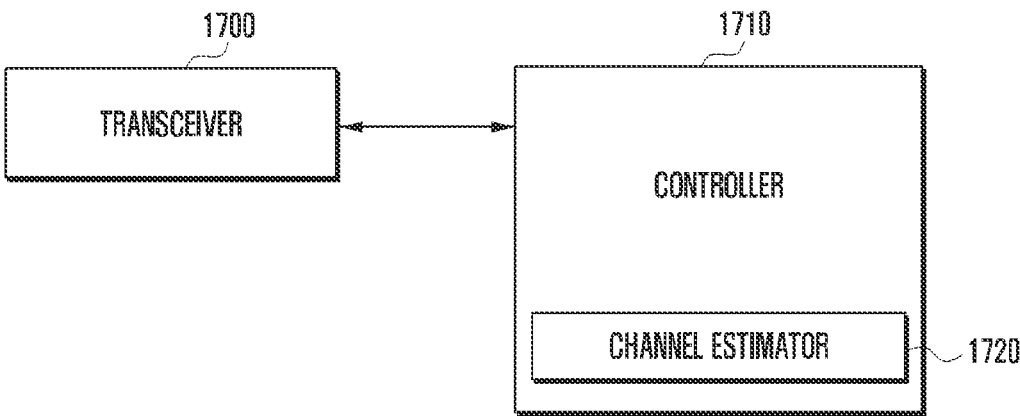
FIG. 17 is a block diagram illustrating the internal structure of a UE according to an embodiment of the disclosure.

FIG. 17 is a block diagram illustrating the internal structure of a UE according to an embodiment of the disclosure.

Referring to FIG. 17, the UE includes a transceiver 1700 and a controller 1710. The transceiver 1700 functions to transmit or receive data to or from the outside (e.g., a base station). Here, the transceiver 1700 may transmit feedback information to the base station under the control of the controller 1710. The controller 1710 controls the states and operations of all components included in the UE. Specifically, the controller 1710 generates feedback information according to information allocated from the base station. In addition, the controller 1710 controls the transceiver 1700 to feed back generated channel information to the base station according to timing information allocated from the base station. To this end, the controller 1710 may include a channel estimator 1720. The channel estimator 1720 identifies necessary feedback information through a CSI-RS and feedback allocation information. The channel estimator 1720 estimates a channel using a received CSI-RS on the basis of the feedback information.

FIG. 17 shows an example in which the UE includes the transceiver 17010 and the controller 1710, but the UE may further include various components depending on functions implemented in the UE, without being limited thereto. For example, the UE may further include a display unit to display the current state of the UE, an input unit that enables a user to input a signal to implement a function, a storage unit to store generated data in the UE, or the like. The channel estimator 1720 is illustrated as being included in the controller 1710 but is not limited thereto. The controller 1710 may control the transceiver 1700 to receive configuration information about each of at least one reference signal resource from the base station. Further, the controller 1710 may measure the at least one reference signal and may control the transceiver 1700 to receive feedback configuration information for generating feedback information according to the measurement result from the base station.

The controller 1710 may measure the at least one reference signal received through the transceiver 1700 and may generate feedback information according to the feedback configuration information. The controller 1710 may control the transceiver 1700 to transmit the generated feedback information to the base station at a feedback time according to the feedback configuration information. Also, the controller 1710 may receive a CSI-RS from the base station, may generate feedback information on the basis of the received CSI-RS, and may transmit the generated feedback information to the base station.

In addition, the controller 1710 may receive a CSI-RS from the base station, may generate feedback information on the basis of the received CSI-RS, and may transmit the generated feedback information to the base station.

Figure 18:
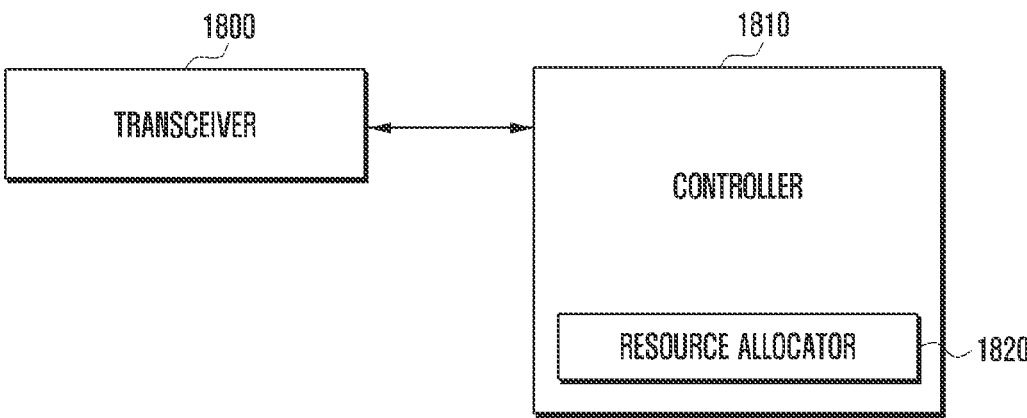
FIG. 18 is a block diagram illustrating the internal structure of a base station according to an embodiment of the disclosure.

FIG. 18 is a block diagram illustrating the internal structure of a base station according to an embodiment of the disclosure.

Referring to FIG. 18, the base station includes a controller 1810 and a transceiver 1800. The controller 1810 controls the states and operations of all components included in the base station. Specifically, the controller 1810 allocates a CSI-RS resource for channel estimation to a UE and allocates a feedback resource and a feedback time to the UE. To this end, the controller 1810 may further include a resource allocator 1820. Also, the controller 1810 allocates a feedback configuration and a feedback time in order to prevent a collision between feedbacks from a plurality of UEs, and receives and interprets feedback information configured at a corresponding time. The transceiver 1800 functions to transmit and receive data, a reference signal, and feedback information to and from the UE. Here, the transceiver 1800 transmits a CSI-RS to the UE through an allocated resource under the control of the controller 1810, and receives feedback on channel information from the UE. Also, the transceiver 1800 transmits a reference signal on the basis of a CRI, a rank, partial PMI information, a CQI, or the like obtained from channel state information transmitted by the UE.

The resource allocator 1820 is shown as being included in the controller 1810 but is not limited thereto. The controller 18010 may control the transceiver 1800 to transmit configuration information about each of at least one reference signal to the UE or may generate the at least one reference signal. Further, the controller 1810 may control the transceiver 1800 to transmit feedback configuration information for generating feedback information according to the measurement result to the UE. The controller 1810 may transmit the at least one reference signal to the UE and may control the transceiver 1800 to receive feedback information transmitted from the UE at a feedback time according to the feedback configuration information. In addition, the controller 1810 may transmit feedback configuration information to the UE, may transmit a CSI-RS to the UE, and may receive feedback information generated on the basis of the feedback configuration information and the CSI-RS from the UE. The controller 1810 may transmit a CSI-RS beamformed on the basis of feedback information to the UE and may receive feedback information generated on the basis of the CSI-RS from the UE.

Embodiment 2

Wireless communication systems are evolving from providing initial voice-oriented services into wideband wireless communication systems that offer high-speed and high-quality packet data services, such as 3GPP High Speed Packet Access (HSPA), Long-Term Evolution (LTE), Evolved Universal Terrestrial Radio Access (E-UTRA), LTE-Advanced (LTE-A), 3GPP2 High Rate Packet Data (HRPD), Ultra Mobile Broadband (UMB), and IEEE 802.16e communication standards. In addition, a 5G or new radio (NR) communication standard is being developed as a fifth-generation wireless communication system.

Wireless communication systems including a 5G wireless communication system can provide a UE with at least one service among enhanced Mobile Broadband (eMBB), massive machine-type communications (mMTC), and ultra-reliable and low-latency communications (URLLC). These services may be provided to the same UE during the same time period. In one embodiment, eMBB may be a service intended for high-speed transmission of high-capacity data, mMTC may be a service intended for minimization of UE power and connection of a plurality of UE, and URLLC may be a service intended for high reliability and low latency, without being limited thereto. These three services may be main scenarios in an LTE system or a beyond-LTE 5G or new radio or next radio (NR) system.

Hereinafter, embodiments of the disclosure will be described in detail with reference to the accompanying drawings. When detailed descriptions about related known functions or configurations are determined to make the gist of the disclosure unclear in describing the disclosure, the detailed descriptions will be omitted herein. Also, terms used below are defined in view of functions in the disclosure and thus may be changed depending on the user, the intent of an operator, or the custom. Accordingly, the terms should be defined based on the following overall description of this specification.

Hereinafter, a base station is an entity that performs resource allocation for a UE and may be at least one of a gNode B, an eNode B, a Node B, a BS, a wireless access unit, a base station controller, or a node on a network. A UE may include a user equipment (UE), a mobile station (MS), a cellular phone, a smartphone, a computer, or a multimedia system capable of performing communication functions. In the disclosure, a downlink (DL) is a wireless transmission path for a signal transmitted from a base station to a UE, and an uplink (UL) is a wireless transmission path for a signal transmitted from a UE to a base station.

Although embodiments of the disclosure will be described with reference to the LTE or LTE-A system as an example, these embodiments of the disclosure may also be applied to other communication systems having a similar technical background or channel form. For example, 5G mobile communication technology (5G or NR) developed after LTE-A may be included in these systems. In addition, embodiments of the disclosure may be partially modified and applied to other communication systems by a person skilled in the art without departing from the scope of the disclosure.

The LTE system as a representative example of the wideband wireless communication systems employs an orthogonal frequency-division multiplexing (OFDM) scheme in the downlink and employs a single-carrier frequency division multiple access (SC-FDMA) scheme in the uplink. Generally, this multi-access scheme allocates and manages time-frequency resources, which carry data or control information by user, not to overlap, that is, to establish orthogonality, thereby distinguishing data or control information for each user.

The LTE system adopts a hybrid automatic repeat request (HARQ) scheme in which a physical layer retransmits data when a decoding failure occurs in initial transmission. In the HARQ scheme, if a receiver fails to correctly decode data, the receiver transmits a negative acknowledgment (NACK) indicating decoding failure to a transmitter so that the transmitter can retransmit the data in a physical layer. The receiver combines the data retransmitted by the transmitter with the previous data that the receiver failed to decode, thereby improving data reception performance. In addition, when the receiver correctly decodes the data, the receiver may transmit an acknowledgment (ACK) indicating successful decoding to the transmitter so that the transmitter can transmit new data.

Figure 19:
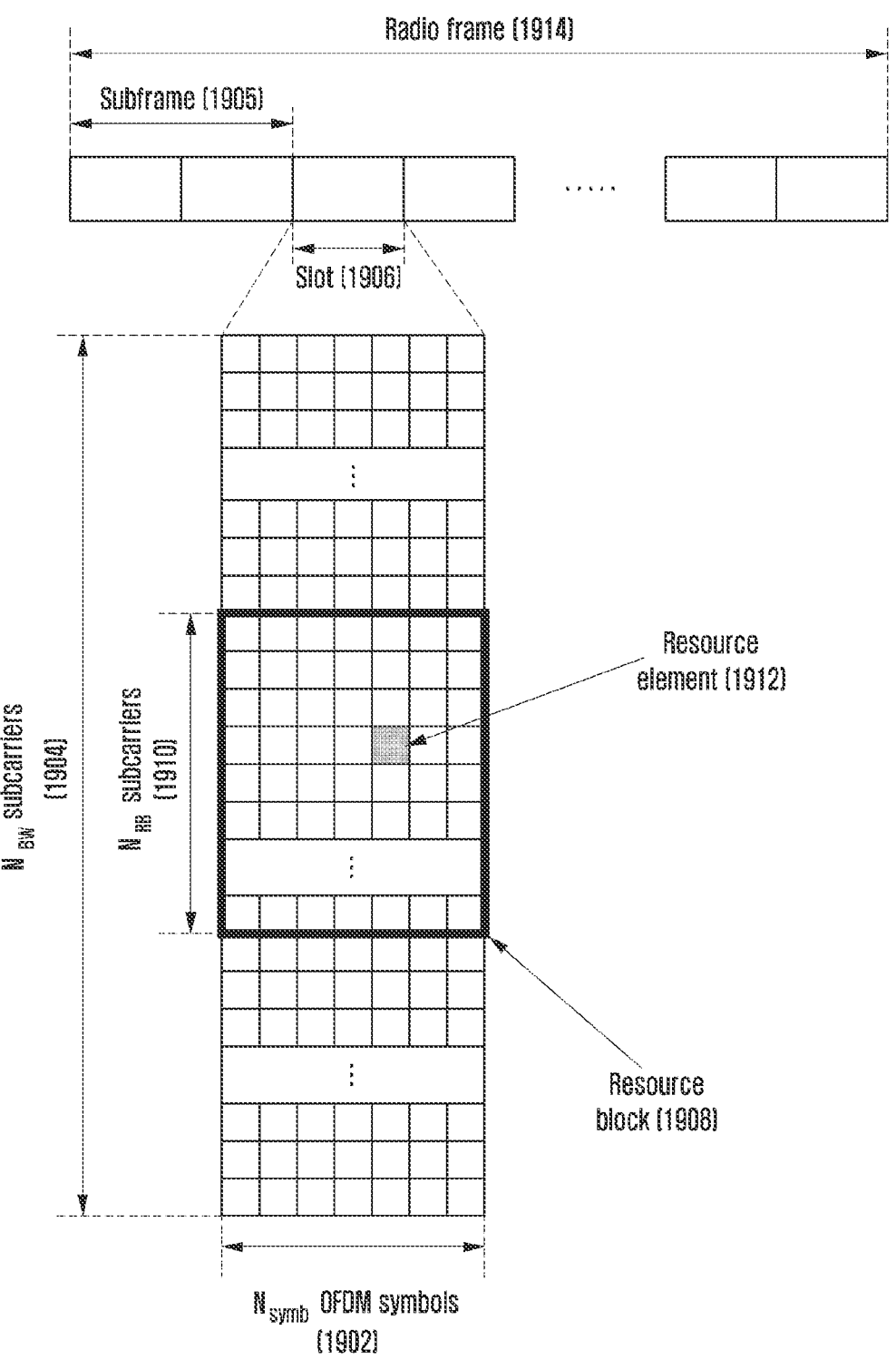
FIG. 19 illustrates a basic structure of a time-frequency domain that is a radio resource region in which data or a control channel is transmitted in a downlink of an LTE system or a similar system.

FIG. 19 illustrates a basic structure of a time-frequency domain that is a radio resource region in which data or a control channel is transmitted in a downlink of an LTE system or a similar system.

Referring to FIG. 19, the horizontal axis represents a time domain and the vertical axis represents a frequency domain. A minimum transmission unit in the time domain is an OFDM symbol. $N_{symb}$ OFDM symbols 1902 form one slot 1906, and two slots form one subframe 1905. The length of a slot is 0.5 ms, and the length of a subframe is 1.0 ms. A radio frame 1914 is a time-domain including ten subframes. A minimum transmission unit in the frequency domain is a subcarrier, and the entire system transmission bandwidth includes a total of New subcarriers 1904. However, such specific values may be changed.

A basic unit of a resource in the time-frequency domain is a resource element (RE) 1912, which may be represented by an OFDM symbol index and a subcarrier index. A resource block (RB) or a physical resource block (PRB) 1908 may be defined by $N_{symb}$ consecutive OFDM symbols 1902 in the time domain and $N_{RB}$ consecutive subcarriers 1910 in the frequency domain. Thus, one RB 1908 in one slot may include $N_{symb}*N_{RB}$ REs 1912. Generally, a minimum frequency-domain allocation unit for data is an RB. In the LTE system, $N_{symb}=7$ and $N_{RB}=12$ in general, and $N_{BW}$ may be proportional to the system transmission bandwidth. Data rate increases in proportion to the number of RBs scheduled for a UE.

The LTE system may define and manage six transmission bandwidths. In a frequency division duplex (FDD) system which operates a downlink and an uplink separately by frequency, a downlink transmission bandwidth and an uplink transmission bandwidth may be different from each other. A channel bandwidth represents an RF bandwidth corresponding to a system transmission bandwidth. Table 22 illustrates a relationship between a system transmission bandwidth and a channel bandwidth defined in the LTE system. For example, an LTE system with a 10 MHz channel bandwidth can have a transmission bandwidth of 50 RBs.

TABLE 22

|  | Channel bandwidth $BW_{Channel}$ [MHz] | | | | | |
|---|---|---|---|---|---|---|
|  | 1.4 | 3 | 5 | 10 | 15 | 20 |
| Transmission bandwidth configuration $N_{RB}$ | 6 | 15 | 25 | 50 | 75 | 100 |

Downlink control information may be transmitted within first N OFDM symbols in a subframe. In one embodiment, $N=\{1, 2, 3\}$ in general. Therefore, N may be variably applied in each subframe according to the amount of control information to be transmitted in a current subframe. The transmitted control information may include a control channel transmission interval indicator indicating the number of OFDM symbols through which the control information is transmitted, scheduling information about downlink data or uplink data, and HARQ ACK/NACK information.

In the LTE system, scheduling information about downlink data or uplink data is transmitted from a base station to a UE through downlink control information (DCI). DCI is defined according to various formats, and it is determined according to each format whether DCI includes scheduling information (UL grant) about uplink data or scheduling information (DL grant) about downlink data, whether DCI is compact DCI having small-size control information, whether to apply spatial multiplexing using multiple antennas, and whether DCI is used for power control. For example, DCI format 1, which is scheduling control information (DL grant) about downlink data, may include at least one of the following pieces of control information.

Resource allocation type 0/1 flag: Indicates whether a resource allocation method is type 0 or type 1. Type 0 allocates resources in resource block groups (RBGs) by applying a bitmap. In the LTE system, a basic unit for scheduling is an RB represented by time-frequency domain resources, and an RBG includes a plurality of RBs and is a basic unit for scheduling in type 0. Type 1 allocates a specific RB in an RBG.

Resource block assignment: Indicates an RB allocated for data transmission. A represented resource is determined according to the system bandwidth and the resource allocation method.

Modulation and coding scheme (MCS): Indicates a modulation scheme used for data transmission and the size of a transport block (TB) as data to be transmitted.

HARQ process number: Indicates an HARQ process number.

New data indicator: Indicates whether HARQ is initial transmission or retransmission.

Redundancy version: Indicates a redundancy version of HARQ.

Transmit Power Control (TPC) command for physical uplink control channel (PUCCH): Indicates a transmission power control command for a PUCCH.

The DCI may be transmitted on a physical downlink control channel (PDCCH) (or interchangeable with control information) or an Enhanced PDCCH (or interchangeable with enhanced control information), which is a physical downlink control channel, via channel coding and modulation.

In general, the DCI is scrambled with a specific radio network temporary identifier (RNTI, hereinafter interchangeable with a UE identifier) independently for each UE to be added with a cyclic redundancy check (CRC), is channel-coded, and is configured as an independent PDCCH to be transmitted. In the time domain, the PDCCH is mapped and transmitted during the control channel transmission interval. The frequency-domain mapping position of the PDCCH may be determined by the identifier (ID) of each UE and may be transmitted throughout the entire system transmission band.

Downlink data may be transmitted on a physical downlink shared channel (PDSCH), which is a physical downlink data channel. The PDSCH may be transmitted after the control channel transmission interval, and scheduling information, such as a specific mapping position in the frequency domain and a modulation scheme, is determined on the basis of the DCI transmitted through the PDCCH.

Through the MCS among the control information included in the DCI, a base station notifies a UE of a modulation scheme applied to the PDSCH to be transmitted and the transport block size (TBS) of data to be transmitted. In one embodiment, the MCS may include five bits or more or fewer bits. The TBS corresponds to the size of a data transport block to be transmitted by the base station to which channel coding for error correction is not yet applied.

Modulation schemes supported by the LTE system includes quadrature phase shift keying (QPSK), 16-quadrature amplitude modulation (16QAM), and 64QAM, modulation orders ($Q_m$) of which are 2, 4, and 6, respectively. That is, two bits per symbol may be transmitted in QPSK, four bits per symbol may be transmitted in 16QAM, and six bits per symbol may be transmitted in 64QAM. Further, 256QAM or more modulation schemes may be used depending on system modifications.

Figure 20:
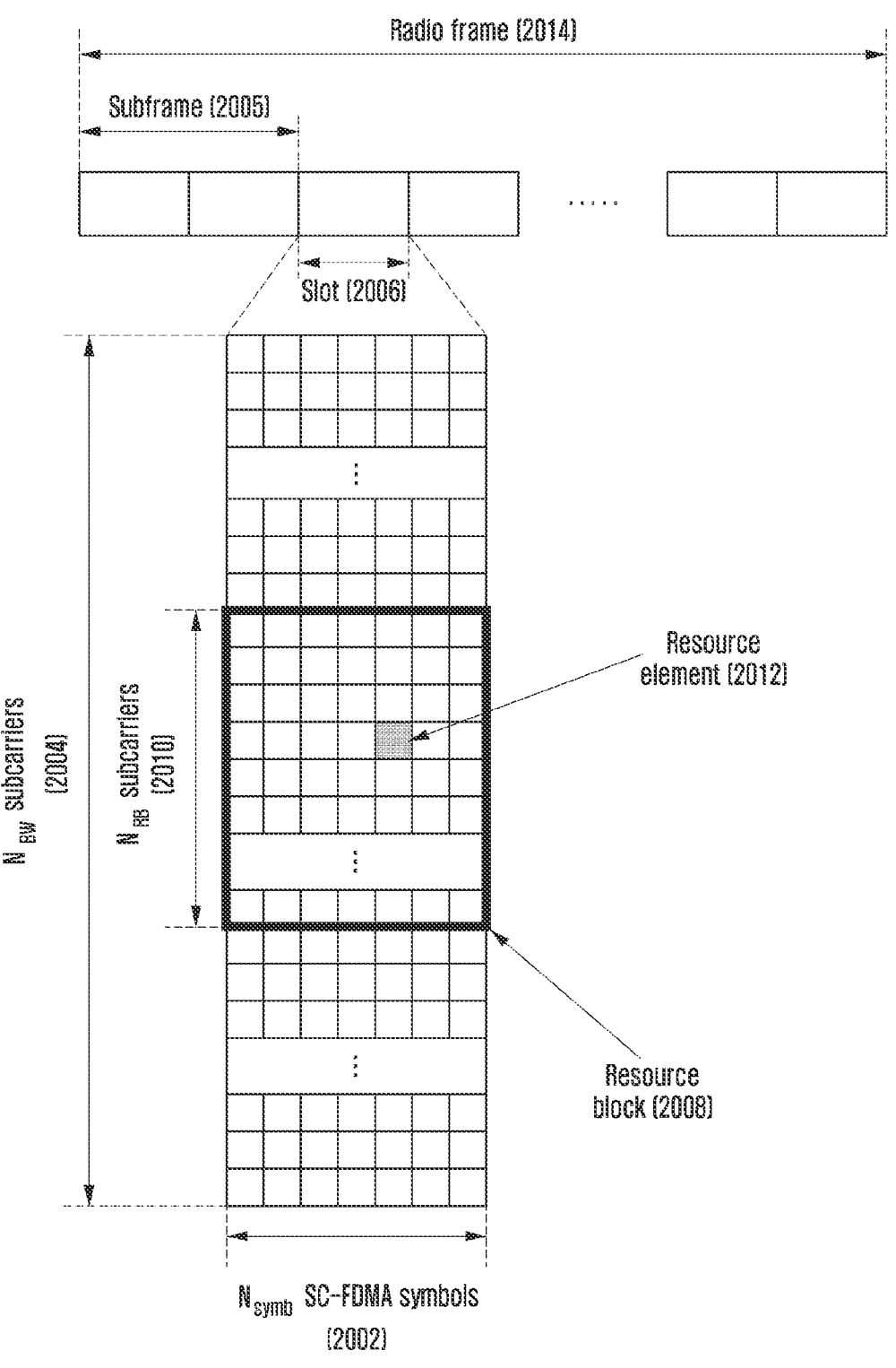
FIG. 20 illustrates a basic structure of a time-frequency domain that is a radio resource region in which data or a control channel is transmitted in an uplink of an LTE-A system.

FIG. 20 illustrates a basic structure of a time-frequency domain that is a radio resource region in which data or a control channel is transmitted in an uplink of an LTE-A system.

Referring to FIG. 20, the horizontal axis represents a time domain and the vertical axis represents a frequency domain. A minimum transmission unit in the time domain is an SC-FDMA symbol 2002, and N$_{symb}$ SC-FDMA symbols may form one slot 2006. Two slots form one subframe 2005. A minimum transmission unit in the frequency domain is a subcarrier, and the entire system transmission bandwidth 2004 includes a total of N$_{BW}$ subcarriers. N$_{BW}$ may be a value proportional to the system transmission bandwidth.

A basic unit of a resource in the time-frequency domain is an RE 2012, which may be defined by an SC-FDMA symbol index and a subcarrier index. An RB 2008 may be defined by N$_{symb}$ consecutive SC-FDMA symbols in the time domain and N$_{RB}$ consecutive subcarriers in the frequency domain. Thus, one RB may include N$_{symb}$*N$_{RB}$ REs. Generally, a minimum transmission unit for data or control information is an RB. A PUCCH is mapped to a frequency region corresponding to one RB and is transmitted during one subframe.

In the LTE system, a timing relationship of a PUCCH or a physical uplink shared channel (PUSCH) as an uplink physical channel in which an HARQ ACK/NACK corresponding to a PDSCH or a PDCCH or EPDDCH including a semi-persistent scheduling release (SPS release) is transmitted may be defined. For example, in an LTE system operating in FDD, an HARQ ACK/NACK corresponding to a PDSCH transmitted in an n4th subframe or a PDCCH or EPDCCH including an SPS release may be transmitted on a PUCCH or a PUSCH in an nth subframe.

In the LTE system, a downlink HARQ employs an asynchronous HARQ scheme in which a data retransmission time is not fixed. That is, when an HARQ NACK of initial transmission data transmitted from a base station is fed back from a UE, the base station freely determines the transmission time of retransmission data according to a scheduling operation. The UE may perform buffering on data determined as an error as a result of decoding received data for an HARQ operation and may then combine the data with next retransmission data.

When the UE receives a PDSCH including downlink data transmitted from the base station in subframe n, the UE transmits uplink control information including an HARQ ACK or NACK of the downlink data to the base station through a PUCCH or PUSCH in subframe n+k. Here, k may be defined differently according to FDD or time division duplex (TDD) of the LTE system and the subframe configuration of the LTE system. For example, in an FDD LTE system, k is fixed at 4. However, in a TDD LTE system, k may be changed according to the subframe configuration and the subframe number. Also, in data transmission through a plurality of carriers, a different value of k may be applied according to the TDD configuration of each carrier.

In the LTE system, unlike the downlink HARQ, an uplink HARQ employs a synchronous HARQ scheme in which a data transmission time is fixed. That is, an uplink/downlink timing relationship of a PUSCH, a preceding PDCCH, and a physical hybrid indicator channel (PHICH) as a physical channel in which a downlink HARQ ACK/NACK corresponding to the PUSCH is transmitted may be determined by the following rule for transmission and reception.

When the UE receives a PDCCH including uplink scheduling control information transmitted from the base station or a PHICH in which a downlink HARQ ACK/NACK is transmitted in subframe n, the UE transmits uplink data corresponding to the control information through a PUSCH in subframe n+k. Here, k may be defined differently according to FDD or TDD of the LTE system and the configuration thereof. For example, in an FDD LTE system, k may be fixed at 4. However, in a TDD LTE system, k may be changed according to the subframe configuration and the subframe number. Also, in data transmission through a plurality of carriers, a different value of k may be applied according to the TDD configuration of each carrier.

Further, when the UE receives a PHICH including information related to a downlink HARQ ACK/NACK from the base station in subframe i, the PHICH corresponds to a PUSCH transmitted by the UE in subframe i-k. Here, k may be defined differently according to FDD or TDD of the LTE system and the configuration thereof. For example, in an FDD LTE system, k is fixed at 4. However, in a TDD LTE system, k may be changed according to the subframe configuration and the subframe number. Also, in data transmission through a plurality of carriers, a different value of k may be applied according to the TDD configuration of each carrier.

TABLE 23

| Transmission made | DCI format | Search Space | Transmission scheme of PDSCH corresponding to PDCCH |
|---|---|---|---|
| Mode 1 | DCI format 1A | Common and WE specific by C-RNTI | Single-antenna port, port 0 (see subclause 7.1.1) |
| | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
| | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
| | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
| | DCI format 1 2 | UE specific by C-RNTI | Closed-loop spatial multiplexing (see subclause 7.1.4)or Transmit diversity (see subclause 7.1.2) |
| Mode 5 | DCI format 1A | Common and UE specific by C-RNTI | Transmit diversity (see subclause 7.1.2) |
| | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
| | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 1 | UE specific by C-RNTI | Single-antenna port; port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |

TABLE 23-continued

| Trans-mission made | DCI format | Search Space | Transmission scheme of PDSCH corresponding to PDCCH |
|---|---|---|---|
| | DCI format 2B | UE specific by C-RNTI | Dual layer transmission; port 7 and 8 (see subclause 7.1.5A) or single-antenna port; port 7 or 8 (see subclause 7.1.1) |

Table 23 shows supportable DCI format types according to each transmission mode under the conditions configured by a C-RNTI in 3GPP TS 36.213. The UE performs search and decoding assuming that there is a relevant DCI format in a control region according to a preset transmission mode. For example, if transmission mode 8 is indicated to the UE, the UE searches for DCI format 1A in a common search space and a UE-specific search space and searches for DCI format 2B only in the UE-specific search space.

The description of the wireless communication system has been made with reference to an LTE system, and the content of the disclosure is not limited to the LTE system but may be applied to various wireless communication systems, such as NR or 5G systems. Also, when the content of the disclosure is applied to a different wireless communication system according to one embodiment, k may be modified and applied to the system using a modulation scheme corresponding to FDD.

Figure 21:
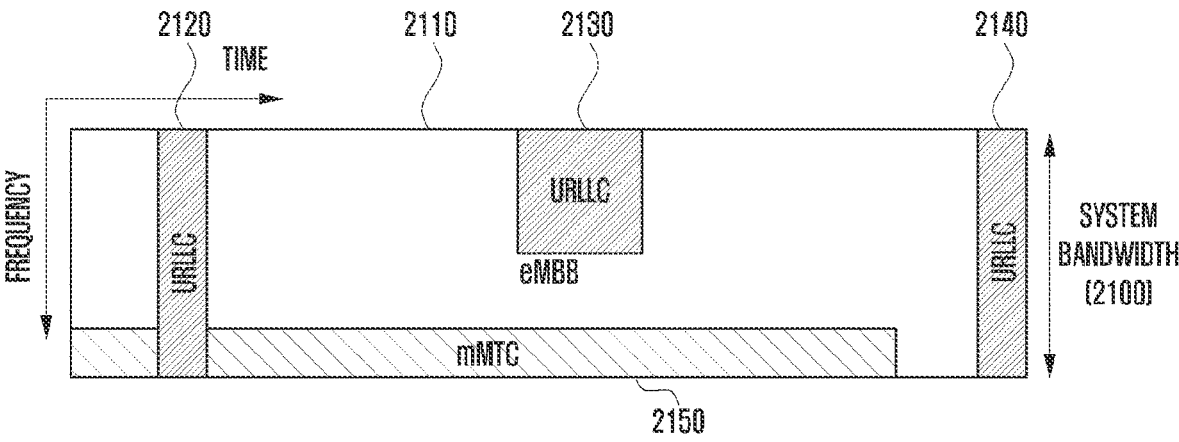
FIG. 21 and FIG. 22 show that data for eMBB, URLLC, and mMTC services considered in a 5G or NR system are allocated in frequency-time resources.
Figure 22:
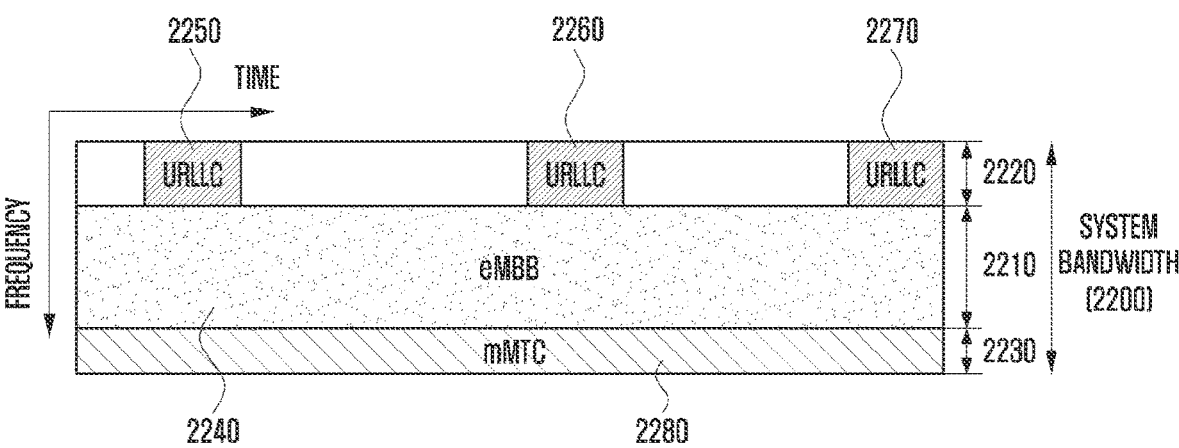

FIG. 21 and FIG. 22 show that data for eMBB, URLLC, and mMTC services considered in a 5G or NR system are allocated in frequency-time resources.

FIG. 21 and FIG. 22 illustrate a scheme in which frequency and time resources are allocated for information transmission in each system.

In FIG. 21, data for eMBB, URLLC, and mMTC is allocated in the entire system frequency band 2100. When URLLC data 2120, 2130, and 2140 is generated and need to be transmitted while e-MBB 2110 and mMTC 2150 are transmitted in a specific allocated frequency band, the URLLC data 2120, 2130, and 2140 may be transmitted by emptying a portion already allocated for the eMBB 2110 and the mMTC 2150 or by not transmitting the eMBB 2110 and the mMTC 2150. Among the above services, the URLLC requires a reduction in delay time, and thus the URLLC data 2120, 2130, and 2140 may be allocated a portion of a resource 2110 allocated for the eMBB and may be transmitted through the portion. If the URLLC is additionally allocated to and transmitted via the resource allocated for the eMBB, the eMBB data may not be transmitted in the overlapping frequency-time resource, and thus the transmission performance of the eMBB data may be reduced. That is, in the above case, eMBB data transmission failure may occur due to URLLC allocation.

In FIG. 22, the entire system frequency band 2200 may be divided into subbands 2210, 2220 and 2230, which may be used for transmitting services and data. Information about subband configuration may be predetermined and may be transmitted from a base station to a UE through higher signaling. Alternatively, regarding the information about the subbands, the base station or a network node may separately provide the services at discretion to the UE without transmitting separate subband configuration information. In FIG. 22, a first subband 2210 is used for eMBB data transmission, a second subband 2220 is used for URLLC data transmission, and a third subband 2230 is used for mMTC data transmission.

In an embodiment, the length of a TTI used for URLLC transmission may be shorter than the length of a TTI used for eMBB or mMTC transmission. Also, a response of URLLC-related information may be transmitted faster than that of eMBB or mMTC, thus transmitting receiving information with low latency.

Hereinafter, an eMBB service is referred to as a first-type service, and eMBB data is referred to as first-type data. The first-type service or the first-type data is not limited to eMBB but may be applicable to a case where high-speed data transmission is required or broadband transmission is performed. A URLLC service is referred to as a second-type service, and URLLC data is referred to as second-type data. The second-type service or the second-type data is not limited to URLLC but may be applicable to other systems where low latency is required or high-reliability transmission is required or where low latency and high reliability are required at the same time. An mMTC service is referred to as a third-type service, and mMTC data is referred to as third-type data. The third-type service or the third-type data is not limited to mMTC but may be applicable to a case where low speed, wide coverage, or low power is required. In describing an embodiment, the first-type service may be construed as including or not including the third-type service.

The structure of a physical-layer channel used for each type to transmit these three types of services or data may be different. For example, at least one of a TTI length, a frequency resource allocation unit, a control channel structure, and a data mapping method may be different.

Although the three services and the three pieces of data have been illustrated above, there may be more types of services and corresponding data, in which case the content of the disclosure may be applied.

The terms 'physical channel' and 'signal' used in a conventional LTE or LTE-A system may be used to describe methods and devices proposed in embodiments. However, the content of the disclosure may be applied to wireless communication systems other than LTE and LTE-A systems.

The content of the disclosure is applicable to FDD and TDD systems.

In the following disclosure, higher signaling is a signal transmission method in which a signal is transmitted from a base station to a UE using a downlink data channel of a physical layer or from the UE to the base station using an uplink data channel of the physical layer and may also be referred to as RRC signaling, PDCP signaling, or an MAC control element (MAC CE).

Figure 23:
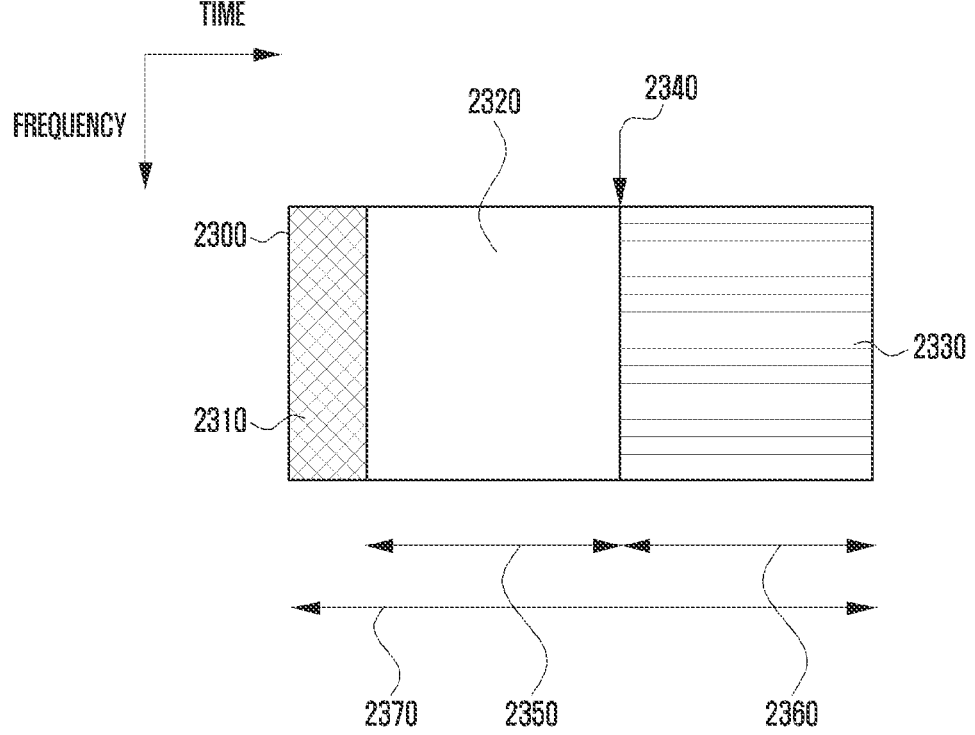
FIG. 23 illustrates an example of a data information structure.

FIG. 23 illustrates an example of a data information structure.

FIG. 23 shows a process in which a base station transmits control information and data information 2300 in a transmission interval 2370 scheduled for one UE or a plurality of UEs. In FIG. 23, the scheduled data information may be downlink data information or uplink data information. The transmission interval 2370 is a minimum scheduling unit (e.g., in slots or mini-slots) for the base station to transmit data to a UE. Here, a mini-slot is an entity including a smaller of symbols than a slot.

The UE checks whether there is control information thereof in a control region 2310 every period of the transmission interval or every multiple of the period of the transmission interval. In FIG. 23, the transmission interval 2370 is divided into a first sub-transmission interval 2350 and a second sub-transmission interval 2360. First data 2320 is transmitted in the first sub-transmission interval 2350, and second data 2330 is transmitted in the second sub-transmission interval 2360. Both the first data and the second data may be downlink data or uplink data, or one thereof may be uplink data and the other may be downlink data.

The sub-transmission intervals may be allocated for data transmission for different UEs or for transmission of data having different HARQ identifier numbers for the same UE. Therefore, the base station can schedule data having one HARQ identifier number for a UE in a data region other than the control region in the transmission interval 2370, can multi-schedule pieces of data having separate HARQ identifier numbers for different UEs in the respective sub-transmission intervals 2350 and 2360, or can multi-schedule pieces of data having different HARQ identifier numbers for the same UE in the respective sub-transmission intervals 2350 and 2360.

Here, to notify a UE of the position of a time resource region where data information for the UE is present, the base station may indicate the sub-transmission intervals 2350 and 2360 or may use a start indicator (or end indicator) 2340 of the sub-transmission interval. That is, when the base station indicates to a UE that 2340 is the symbol value (or slot or mini-slot value) of the start indicator through information about the time when data information is allocated, the UE determines that data information for the UE is transmitted in the second sub-transmission interval 2360. When the base station indicates to a UE that 2340 is the symbol value (or slot or mini-slot value) of the end indicator through information about the time when data information is allocated, the UE determines that data information for the UE is transmitted in the first sub-transmission interval 2350.

In addition, when the UE determines the position of a frequency and/or time resource region in which data information for the UE is allocated through the control information transmitted in the control region 2310, the UE determines whether the data information is allocated to the entire transmission interval 2370 or to the sub-transmission interval 2350 or 2360. Whether the data information is allocated to the sub-transmission interval is determined through information about the sub-transmission interval 2350 or 2360 or the start indicator (or end indicator) 2340 of the sub-transmission interval. Notifying the UE of the information about the sub-transmission interval means a method of notifying the UE of both the symbol value of the start indicator of the sub-transmission interval and the symbol value of the end indicator. Notifying the UE of information about the start indicator (or end indicator) of the sub-transmission interval means a method of notifying the UE of the symbol value of the start indicator (or end indicator) of the sub-transmission interval. If the UE knows only the symbol value of the start indicator of the sub-transmission interval, the UE implicitly determines that data for the UE is transmitted in the second sub-transmission interval.

On the other hand, if the UE knows only the symbol value of the end indicator of the sub-transmission interval, the UE implicitly determines that the data for the UE is transmitted in the first sub-transmission interval. A method for determining whether a symbol value is the symbol value of the start indicator of the sub-transmission interval or the symbol value of the end indicator of the sub-transmission interval is as follows. The UE may perform determination through type information indicating a start indicator or an end indicator including one bit or one more bits added by indicator or through existing values forming the control information. For example, it is possible to identify whether a symbol indicating an indicator of the sub-transmission interval is a symbol of a start indicator or a symbol of an end indicator through NDI indicating whether transmitted data is via initial transmission or retransmission. Specifically, if the UE identifies that the data is retransmitted data information through NDI information, the UE determines the symbol value of the received indicator of the sub-transmission interval as the symbol value of the end indicator of the sub-transmission interval and receives (or transmits) the retransmitted data in the first sub-transmission interval. On the other hand, if the UE identifies that the data is initially transmitted data information through the NDI information, the UE determines the symbol value of the received indicator of the sub-transmission interval as the symbol value of the start indicator of the sub-transmission interval and receives (or transmits) the initially transmitted data in the second sub-transmission interval.

There is a possibility that the size of data information received or transmitted by a UE varies depending on the size of an allocated frequency region and the size of an allocated time region. In the LTE (or LTE-A) system, the TBS is determined according to the TBS index ($I_{TBS}$) and the number of PRBs ($N_{PRB}$). Table 24 illustrates part of a table showing a method of determining a TBS. In the LTE (or LTE-A) system, since a transmission interval is fixed at 1 ms, various transmission intervals do not arise. However, in the disclosure, there may be two or more sub-transmission intervals within one transmission interval, and the size of data that can be transmitted within each sub-transmission interval is likely to be smaller than the size of data that can be transmitted within one transmission interval.

Therefore, in determining a TBS, the base station and the UE needs to consider the TBS index ($I_{TBS}$), the number of PRBs ($N_{PRB}$), and the number of symbols ($N_{sym}$) present in a sub-transmission interval. Therefore, the base station and the UE may recalculate a TBS value according to TBS tables in which the number of symbols ($N_{sym}$) present in a sub-transmission interval is additionally configured or the number of symbols ($N_{sym}$) present in a sub-transmission interval in a reference TBS table configured with a reference symbol number ($N^{ref}$), and the UE may determine a TBS value of the UE. For example, according to the reference TBS table, the UE may calculate the TBS (TBS_s) for the UE by the following equation: TBS_s=max (floor (TBS_s$^{ref}$*N$_{sym}$/N$^{ref}$), 1). The floor function may be replaced by another equation, such as a rounding function or a ceiling function. TBS_s$^{ref}$ is the TBS determined on the basis of the TBS index ($I_{TBS}$) and the number of PRBs ($N_{PRB}$) (or part thereof) in the TBS table with the reference symbol number ($N^{ref}$). The UE may determine the TBS for the UE corresponding to the sub-transmission interval using an equation other than the above equation.

In another example, when only part of code blocks (CBs) included a transmission block in initial transmission fails to be transmitted, the base station may retransmit only the code blocks that failed to be transmitted in order to increase transmission efficiency, which is called partial retransmission. When partial retransmission is possible, the UE considers both the total number of code blocks included in a transport block and the number of code blocks which failed to be transmitted when determining a TBS through control information. That is, since a TBS transmitted in partial retransmission is strictly the sum of sizes of failed code blocks, the UE determines a retransmission TBS readjusted through the indexes and the number of the failed code blocks. Also, in the case of partial retransmission, partial retransmission is performed through a sub-transmission interval of the entire transmission interval rather than through the entire transmission interval, and thus a TBS value may be determined by a method different from the above-described method.

In partial retransmission, the TBS is determined through the number of code blocks included in the partial retransmission in addition to the number of symbols ($N_{sym}$) existing in a sub-transmission interval. For example, the TBS may be obtained by the following equation: TBS_s=max (floor (TBS_s$^{ref}$*CB$^{retx}$/CB$^{tx}$), 1). Here, CB$^{retx}$ denotes the number of CBs used in partial retransmission, and CB$^{tx}$ denotes the number of CBs used in initial transmission. Alternatively, the TBS determined in partial retransmission may be determined considering the number of symbols included in a sub-transmission interval and the number of CBs transmitted in partial retransmission together.

TABLE 24

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 126 | 208 | 224 | 256 | 328 | 344 |
| 2 | 32 | 72 | 144 | 176 | 208 | 236 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 384 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1344 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2934 | 3752 | 4392 | 5160 | 5992 | 6712 | 7480 |

Figure 24:
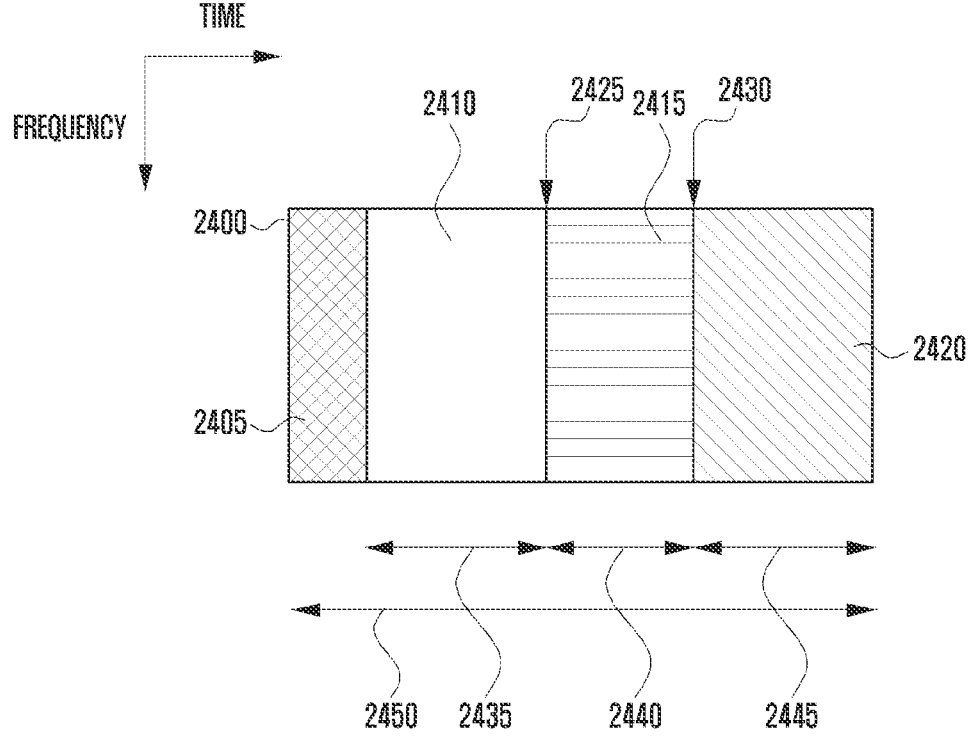
FIG. 24 illustrates another example of a data information structure.

FIG. 24 illustrates another example of a data information structure.

Unlike FIG. 23, FIG. 24 shows a process in which three pieces of data are transmitted to (or received from) UEs in one transmission interval 2450. Although FIG. 24 shows three pieces of data, the disclosure may be properly applied to a greater number of pieces of data. The three pieces of data may be transmitted to a plurality of UEs or one UE in a first sub-transmission interval 2435, a second sub-transmission interval 3440, and a third sub-transmission interval 2445, respectively. The data 2410 transmitted in the first sub-transmission interval 2435, the data 2415 transmitted in the second sub-transmission interval 2440, and the data 2420 transmitted in the third sub-transmission interval 2445 may be data for different UEs or data for one UE. That is, when one UE receives two or more pieces of data among the three pieces of data through two or more sub-transmission intervals, the two or more pieces of data are considered to have different HARQ identifiers. The pieces of data transmitted in the respective sub-transmission intervals may be downlink data or uplink data.

When three or more pieces of data are transmitted in one transmission interval, there is a limit to reporting a sub-transmission interval using a symbol value indicating a sub-transmission interval start indicator (or end indicator) illustrated in FIG. 23. That is, the sub-transmission interval start indicator (or end indicator) is valid only for the data 2410 and 2420 in FIG. 24. It is impossible to identify a sub-transmission interval for the data 2415 using only such one piece of information. Therefore, in FIG. 24, a start symbol value and an end symbol value of the sub-transmission interval are transmitted to UEs via control information. Alternatively, a method of transmitting a sub-transmission interval start indicator (or end indicator), which is valid only for the data 2410 and 2420, may be partially used for some UEs.

Figure 25:
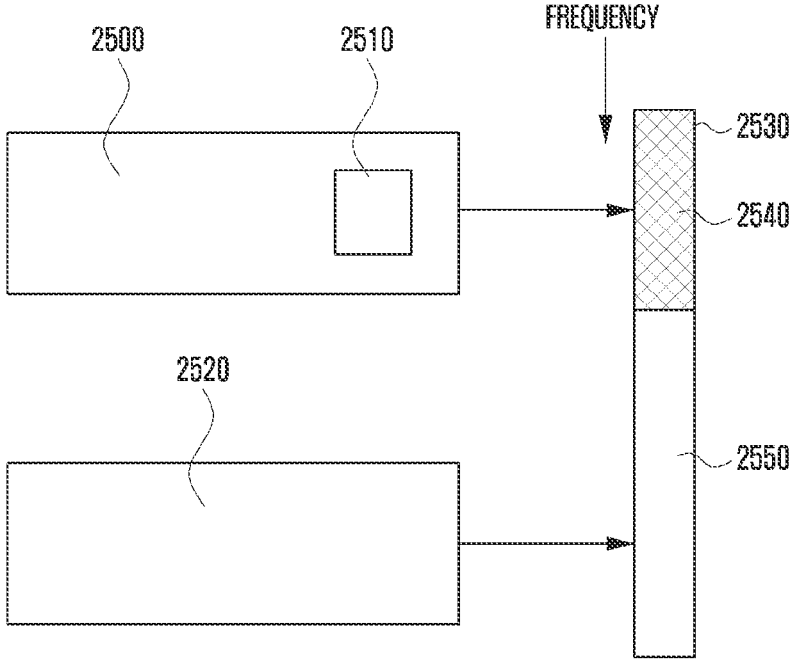
FIG. 25 illustrates a mapping relationship between a control information structure and a control region.

FIG. 25 illustrates a mapping relationship between a control information structure and a control region.

FIG. 25 shows a mapping relationship between a control region 2540 mapped to control information 2500 including information about a time resource 2510 to which the foregoing data information is allocated and a control region 2550 to which control information 2520 including no time resource information is allocated. In a data region in which a plurality of sub-transmission intervals can be employed within one transmission interval, a frequency region of each sub-transmission interval may be configured as a part of a frequency region of the entire data region, and an interval to which control information is allocated may have a frequency that is the same as or different from that of a data region scheduled by the control information.

Therefore, a frequency resource of a control region in which control information including allocated time resource information can be transmitted to a UE is limited to a certain frequency region, which may initially be configured statically or semi-statically as system information or may dynamically be changed by L1 signaling. Accordingly, the UE may recognize that pieces of control information of different sizes are present in frequency regions and may decode control information. A frequency region is determined depending on numerologies used in a communication system (e.g., subcarrier spacing or frequency bandwidth). In addition, a frequency band in which control information including time resource information can be transmitted may be determined according to a frequency region in which a mini-slot is supported or a minimum number of symbols supported by a mini-slot. Also, in some frequency bands, control information including time resource information and control information including no time resource information may be transmitted together.

Embodiment 2-1

Figure 26:
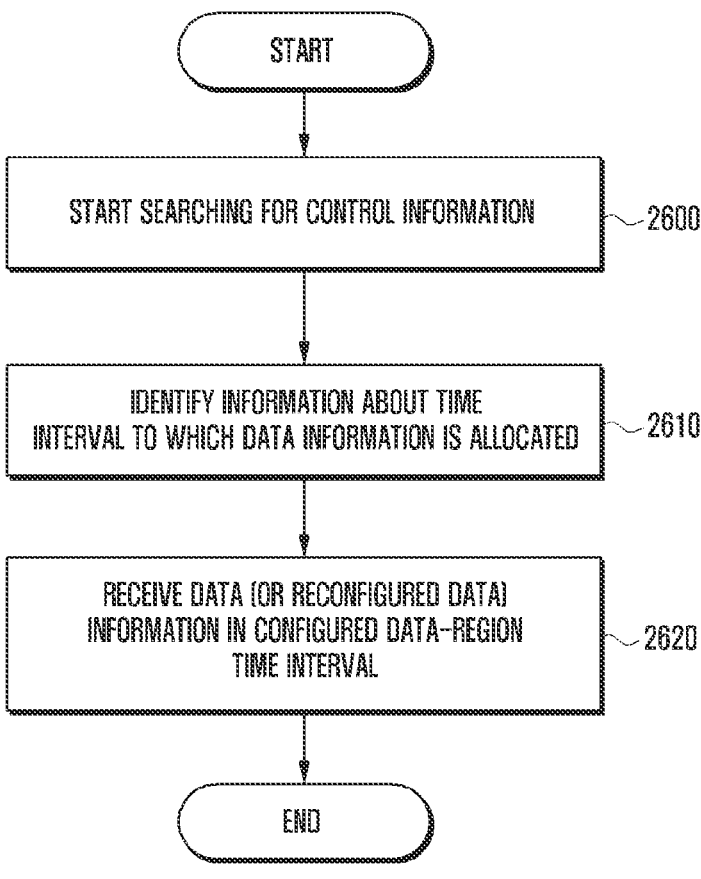
FIG. 26 illustrates a UE operation process according to embodiment 2-1.

FIG. 26 illustrates a UE operation process according to embodiment 2-1.

In FIG. 26, a UE searches for control information in a control region (2600), identifies information about time interval to which the data information is allocated (2610), and receives the data information of the UE according to the information about the time interval (2620). As described above, the information about the time interval may be determined using the start symbol value and an end symbol value of the sub-transmission interval, using the start symbol value of the sub-transmission interval and the symbol length, or using only the start symbol value (or the end symbol value) of the sub-transmission interval. Also, if the size of data (TBS) transmitted in the sub-transmission interval is based on a TBS table considering the TBS index ($I_{TBS}$), the number of PRBs ($N_{PRB}$), and the number of symbols ($N_{sym}$) present in the sub-transmission interval, a TBS satisfying the corresponding conditions is immediately applied. If the size of data (TBS) transmitted in the sub-transmission interval is based on a TBS table considering the TBS index ($I_{TBS}$), the reference number of PRBs ($N_{PRB}$), and a reference symbol number ($N^{ref}$), a new TBS is derived and used considering the number of symbols ($N_{sym}$) present in the sub-transmission interval and the reference symbol number ($N^{ref}$) as mentioned. In FIG. 26, the new TBS is defined as reset data information. Further, in partial retransmission, the reset data information may refer to pieces of data information including only code blocks that failed to be transmitted other than the number of symbols ($N_{sym}$) transmitted in the sub-transmission interval.

Embodiment 2-2

Figure 27:
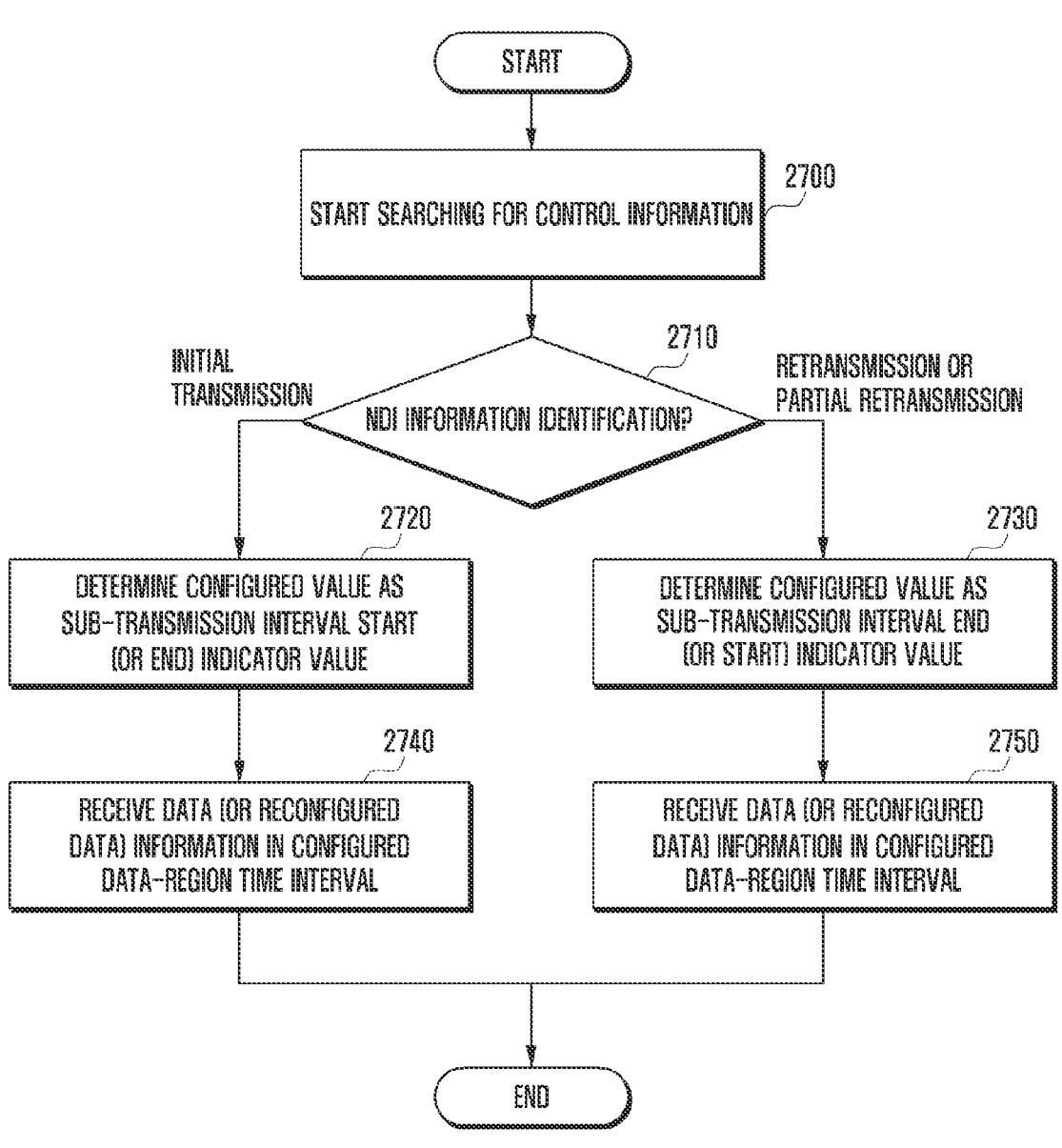
FIG. 27 illustrates a UE operation process according to embodiment 2-2.

FIG. 27 illustrates a UE operation process according to embodiment 2-2.

FIG. 27 illustrates a case where a sub-transmission interval including data information received or transmitted by a UE is indicated as a sub-transmission interval start indicator (or end indicator). First, the UE searches for control information in a control region (2700). The UE determines whether data to be processed in a scheduled resource region is retransmission data or initial transmission data through NDI information included in the control information (2710). If the data is initial transmission data, the symbol value of a sub-transmission interval indicator included in the control information is determined as a sub-transmission interval start (or end) indicator value (2720). If the data is retransmission data, the symbol value of the sub-transmission interval indicator included in the control information is determined as a sub-transmission interval end (or start) indicator value (2730). That is, the UE determines whether to determine the symbol value of the sub-transmission interval indicator included in the control information as a start indicator or an end indicator according to the NDI value. This embodiment is applicable to a case where up to two pieces of data exists in one transmission interval as illustrated in FIG. 23. Further, if there are three or more pieces of data in one transmission interval as illustrated in FIG. 24, this embodiment is applicable only to the foremost piece of data and the last piece of data in the transmission interval. Next, the UE receives data information in a configured data-region time interval on the basis of the received control information and the symbol value of the sub-transmission interval indicator (2740 and 2750).

In FIG. 27, the NDI information may be replaced with other pieces of control information (e.g., resource allocation information, HARQ identifier information, and MCS information) transmitted from a base station to the UE. In addition, when the other pieces of control information are used in addition to the NDI control information, the pieces of control information may be divided into two or more classifications and may be transmitted in respective sub-transmission intervals. Also, when control information including transmission of uplink data in the same transmission interval through a downlink control region is transmitted to the UE, time to switch from a downlink to an uplink between the UE and the base station is required, and thus the uplink data may be transmitted in the second sub-transmission interval in the case of FIG. 23. That is, when the UE is instructed to transmit uplink data in the same transmission interval through control information, the UE determines that the uplink data is transmitted in the second sub-transmission interval and interprets a sub-transmission interval indicator symbol value as a sub-transmission interval start symbol value.

Embodiment 2-3

Figure 28:
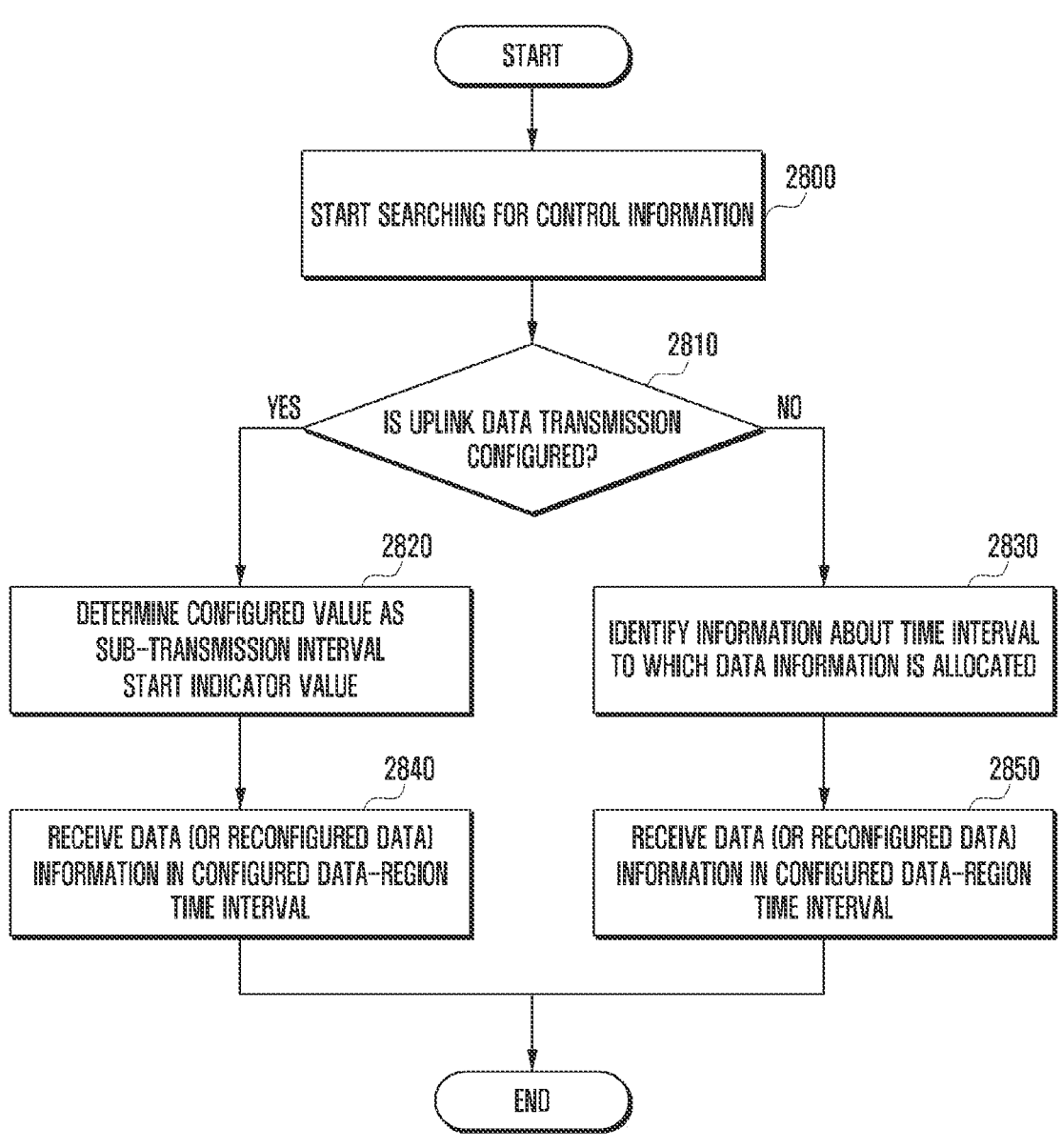
FIG. 28 illustrates a UE operation process according to embodiment 2-3.

FIG. 28 illustrates a UE operation process according to embodiment 2-3.

When a UE transmits uplink data in a transmission interval in which downlink control information is received, a guard period for supporting uplink transmission is required for a certain period considering propagation delay time between the UE and a base station, processing capabilities of the base station and the UE, and data size. The UE transmitting uplink data can support uplink data transmission when the UE knows both the start symbol value and the end symbol value of a sub-transmission interval of sub-transmission interval information. However, as shown in FIG. 28, when uplink data transmission is configured, the base station may transmit only a sub-transmission interval start symbol value to the UE, in which the UE determines that the configured value is a sub-transmission interval start indicator value (2820). Since uplink data is usually located in the last part of a transmission interval, the foregoing operation is applicable.

The UE searches for control information in a control region (2800). Next, the UE determines whether uplink data transmission is configured through the control information (2810). If uplink transmission is configured, the UE determines a value related to a configured time interval as a sub-transmission interval start indicator value (2820). If uplink transmission is not configured, the UE identifies information about a time interval to which data information is allocated (2830). The UE receives or transmits data information on the basis of the received control information and the value related to the data-region time interval (2840 and 2850).

Embodiment 2-4

Figure 29:
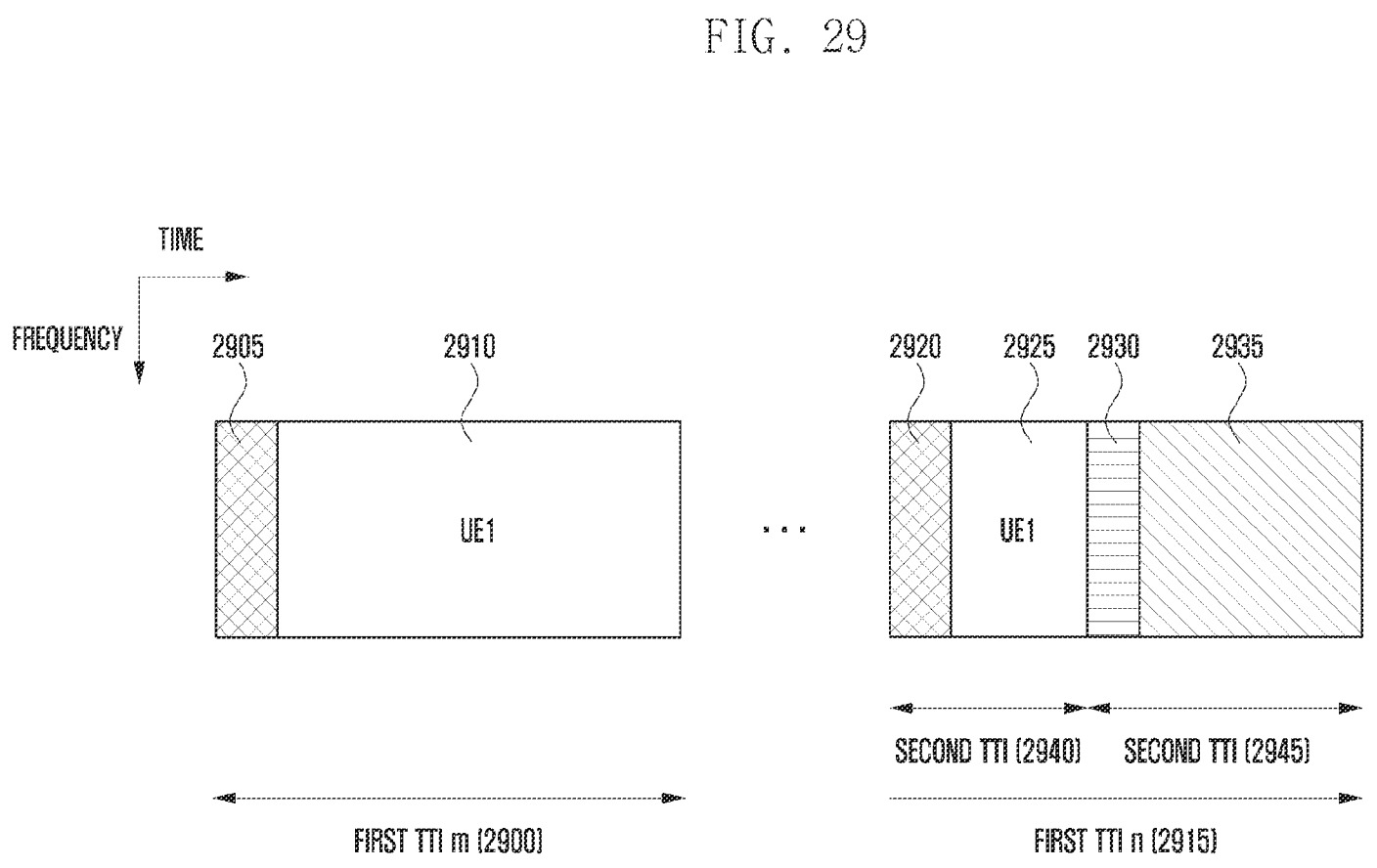
Figure 30:
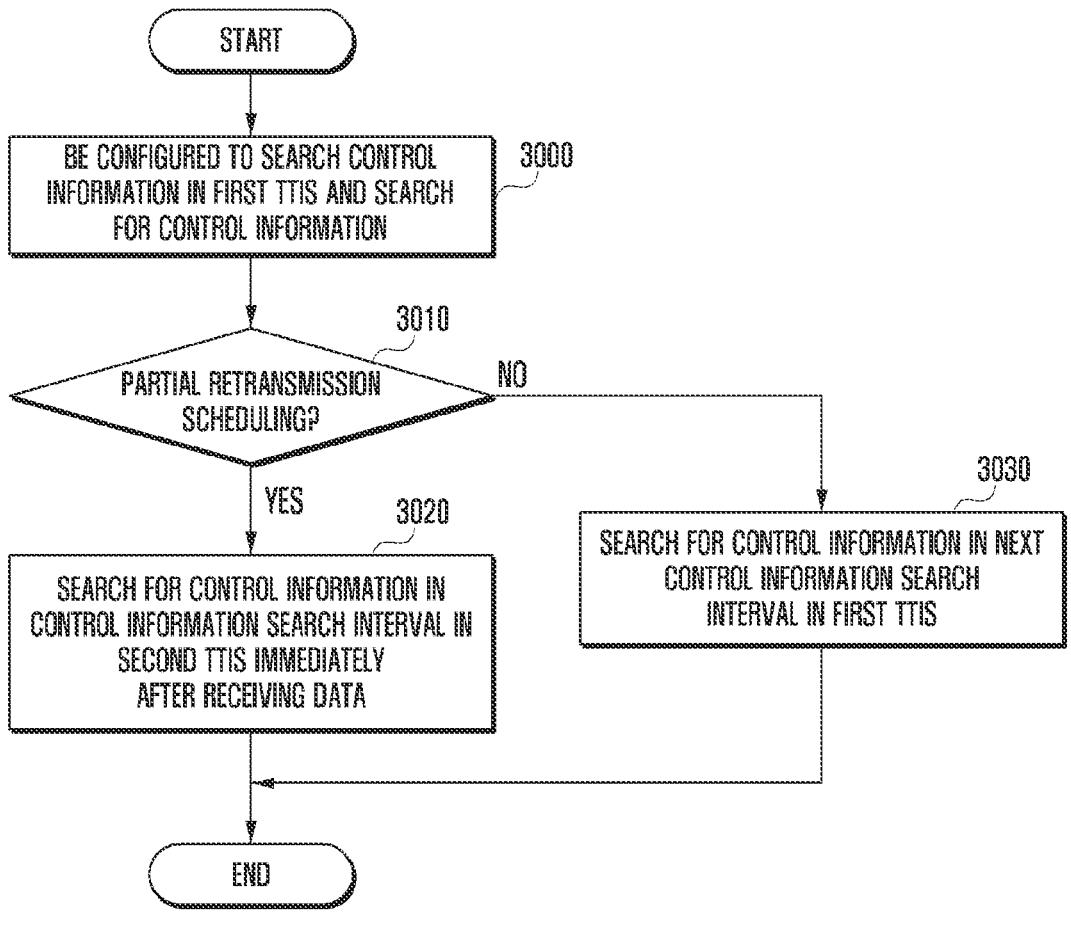
FIG. 30 illustrates a UE operation process according to embodiment 2-4.

FIG. 29 illustrates an example of resource allocation according to embodiment 2-4, and FIG. 30 illustrates a UE operation process according to embodiment 2-4. In this embodiment, a first TTI is a transmission time unit having a length greater than or equal to that of a second TTI. For example, the first TTI may be a slot including seven OFDM symbols, and the second TTI may be a mini-slot or sub-slot including two OFDM symbols. This example is merely for illustrative purposes. The first TTI may be a slot including 14 OFDM symbols, and the second TTI may be a mini-slot or sub-slot including four OFDM symbols. Further, if there is more than one second TTI in the first TTI, the second TTIs may include different numbers of OFDM symbols.

In FIG. 29, UE 1 receives a schedule for initial transmission 2910 in first TTI m 2900 from a base station and then receives a schedule for partial retransmission 2925 in a second TTI 2940 belonging to first TTI n 2915. UE 1 is a UE configured to search for control information only in a search region in which a control channel of a first TTI is transmitted. For example, UE 1 searches for control information only in a control channel in first TTIs, such as 2905 and 2920. The partial retransmission 2925 may include some code blocks of a transport block transmitted in the initial transmission 2910, or may be part of the entire transport block. Therefore, if there are remaining resources 2930 and 2935 in first TTI n 2915 after scheduling the partial retransmission 2925 for UE 1, the base station may schedule additional data transmission for UE 1 using the remaining resources. Accordingly, UE1 searches for control information in a region where the control information can be transmitted in order to search for scheduling control information that can be transmitted in a second TTI 2945 after partial retransmission is performed. For example, the UE may search for the control information in a control information search space 2930 of the second TTI 2945 after the partial retransmission 2925 is performed. In this example, the second TTI 2940 and the different second TTI 2945 may have different lengths.

Referring to FIG. 30, the UE is configured to search for control information in first TTIs and searches for control information in a first TTI control information search space according to the configuration (3000). The UE checks whether a schedule of the retrieved control information is scheduling information corresponding to partial retransmission (3010). If the retrieved control information is for partial retransmission, the UE searches for control information in a control information search interval in second TTIs immediately after receiving partial retransmission data (3020). If the retrieved control information is not for partial retransmission, the UE searches for control information in a control information search interval in first TTIs as configured (3030).

Embodiment 2-5

Figure 31:
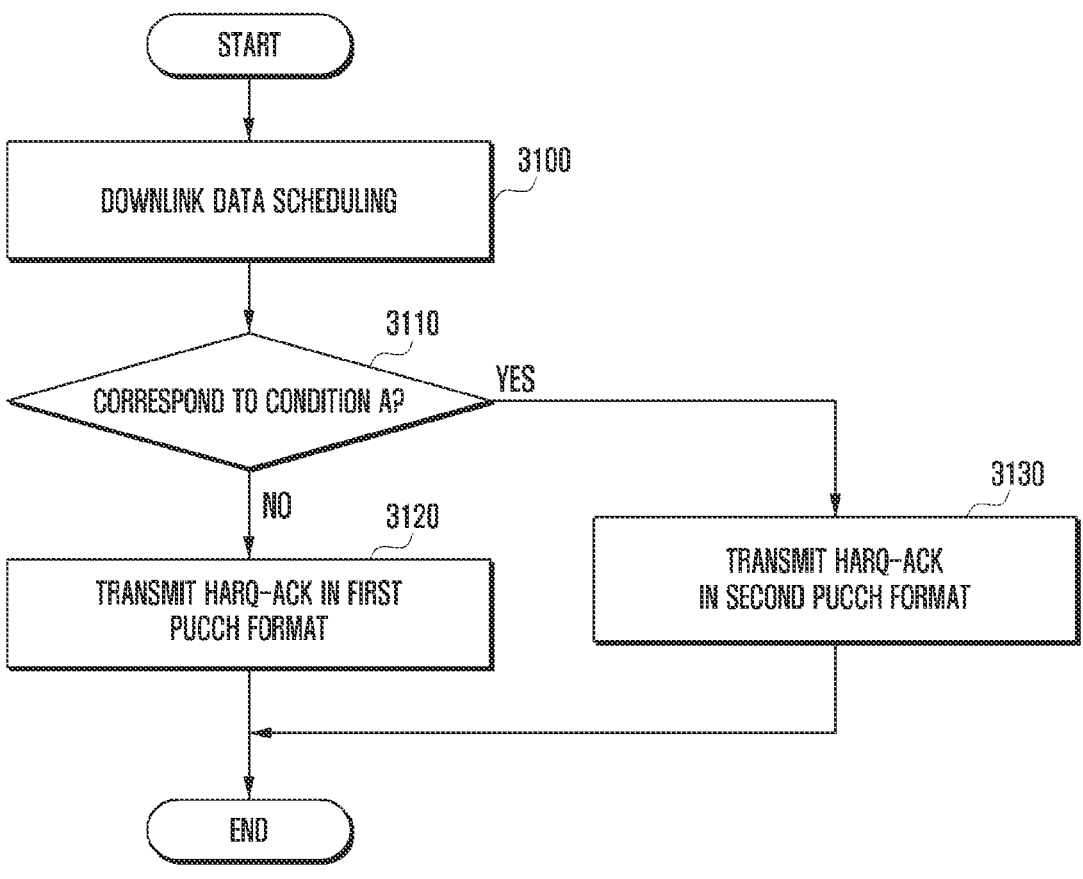
FIG. 31 illustrates a UE operation process according to embodiment 2-5.

FIG. 31 illustrates a UE operation process according to embodiment 2-5. When downlink data corresponding to entire transmission and partial retransmission are transmitted, the format of a PUCCH transmitted by a UE for transmission of HARQ-ACK feedback information corresponding to the data may be changed according to the number of HARQ-ACK bits. To perform the above operation, the UE may operate as follows.

The UE receives a schedule for downlink data (3100) and checks whether the schedule corresponds to condition A illustrated below (3110). Condition A may be one of the following conditions.

Is the number of HARQ-ACK bits corresponding to the scheduled data less than X bits? X may be a configured value or a predetermined value.

Does the schedule correspond to partial retransmission?

If the schedule corresponds to condition A, the UE transmits pieces of HARQ-ACK information to a base station in a second PUCCH format (3130). If the schedule does not correspond to condition A, the UE transmits the pieces of HARQ-ACK information to the base station in a first PUCCH format (3120).

The first PUCCH format may be a format capable of transmitting a larger number of information bits than the second PUCCH format, and the PUCCH formats are known in advance to the base station and the UE.

Figure 32:
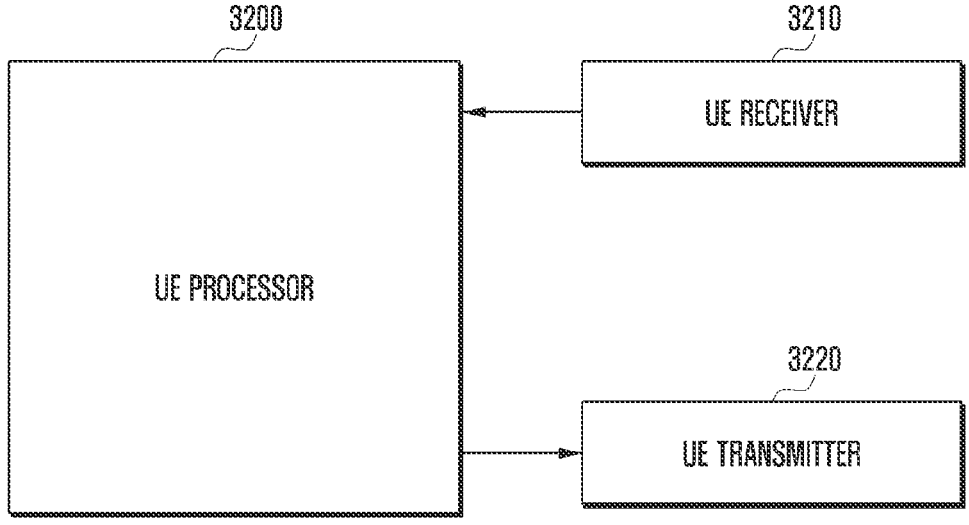
FIG. 32 is a block diagram illustrating the structure of a UE according to embodiments.

FIG. 32 is a block diagram illustrating the structure of a UE according to embodiments.

Referring to FIG. 32, the UE of the disclosure may include a UE receiver 3210, a UE transmitter 3220, and a UE processor 3200. The UE receiver 3210 and the UE transmitter 3220 may be collectively referred to as a transceiver in this embodiment. The transceiver may transmit and receive a signal to and from a base station. The signal may include control information and data. To this end, the transceiver may include an RF transmitter to upconvert and amplify the frequency of a transmitted signal and an RF receiver to perform low-noise amplification on a received signal and to downconvert the frequency of the received signal. The transceiver may receive a signal through a radio channel to output the signal to the UE processor 3200 and may transmit a signal output from the UE processor 3200 through the radio channel. The UE processor 3200 may control a series of processes so that the UE can operate according to the foregoing embodiments. For example, the UE receiver 3210 may receive scheduling control information including data transmission time interval information from the base station, and the UE processor 3200 may control the transceiver to transmit and receive data according to the control information.

Figure 33:
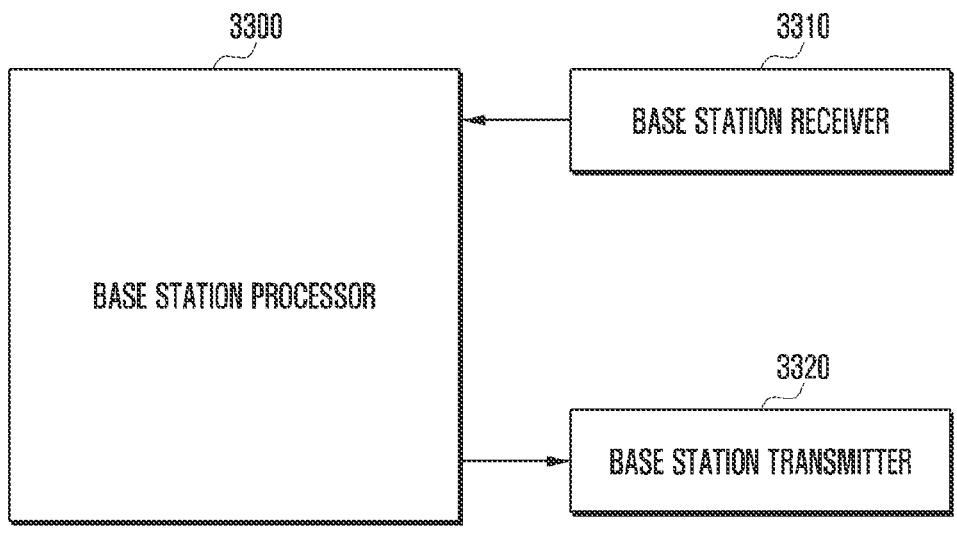
FIG. 33 is a block diagram illustrating the structure of a base station according to embodiments.

FIG. 33 is a block diagram illustrating the structure of a base station according to embodiments.

Referring to FIG. 33, the base station may include at least one of a base station receiver 3310, a base station transmitter 3320, and a base station processor 3300 in one embodiment. The base station receiver 3310 and the base station transmitter 3320 may be collectively referred to as a transceiver in one embodiment of the disclosure. The transceiver may transmit and receive a signal to and from a UE. The signal may include control information and data. To this end, the transceiver may include an RF transmitter to upconvert and amplify the frequency of a transmitted signal and an RF receiver to perform low-noise amplification on a received signal and to downconvert the frequency of the received signal. The transceiver may receive a signal through a radio channel to output the signal to the base station processor 3300 and may transmit a signal output from the base station processor 3300 through the radio channel. The base station processor 3300 may control a series of processes so that the base station can operate according to the foregoing embodiments. For example, the base station processor 3300 may determine a sub-transmission interval for scheduling data, may generate control information, and may control the transceiver to transmit the control information to the UE. Next, the base station processor 3300 may control the transceiver to transmit and receive data to and from the UE according to the control information.

The embodiments of the disclosure disclosed in this specification and drawings are provided only as illustrative examples to easily describe technical details of the disclosure and help the understanding of the disclosure and are not intended to limit the scope of the disclosure. That is, it will be obvious to those skilled in the art to which the disclosure pertains that other modifications based on the technical idea of the disclosure may be carried out. Also, the above embodiments may be combined with each other as needed. For example, portions of embodiments 1 and 2 of the disclosure may be combined with each other so that the base station and the terminal can be operated. Further, although the embodiments are provided on the basis of the NR system, other modifications based on the technical idea of the embodiments may be carried out in other systems, such as FDD or TDD LTE systems.

The invention claimed is:

1. A method performed by user equipment (UE) in a communication system, the method comprising:

receiving from a base station system information indicating a specific frequency region for control information including time domain resource assignment information, wherein the specific frequency region is contained within a part of an entire bandwidth in a frequency domain;

receiving, from a base station, control information on the specific frequency region, wherein the time domain resource assignment information indicates a transmission time interval for a physical downlink shared channel (PDSCH) among a plurality of transmission time intervals;

identifying a transport block size associated with a number of symbols; and receiving, from the base station, the PDSCH associated with the transport block size in the number of symbols from a start symbol based on the time domain resource assignment information, wherein the time domain resource assignment information indicates the start symbol of the transmission time interval, wherein the transmission time interval is defined based on the number of symbols from the start symbol, wherein a frequency region for transmission of the PDSCH in the transmission time interval is defined by the specific frequency region for the control information, in the frequency domain, and wherein the specific frequency region depends on a subcarrier spacing (SCS).

2. The method of claim 1, wherein the number of symbols of the transmission time interval is identified based on the time domain resource assignment information.

3. The method of claim 1, wherein the plurality of transmission time intervals comprises at least a transmission time interval of 2 symbols and a transmission time interval of 7 symbols.

4. A method performed by a base station in a communication system, the method comprising:

transmitting to a user equipment (UE), system information indicating a specific frequency region for control information including time domain resource assignment information, wherein the specific frequency region is contained within a part of an entire bandwidth in a frequency domain;

identifying a transport block size;

transmitting, to the UE, control information on the specific frequency region, wherein the time domain resource assignment information indicates a transmission time interval for a physical downlink shared channel (PDSCH) among a plurality of transmission time intervals; and transmitting, to the UE, the PDSCH associated with the transport block size in the number of symbols from a start symbol according to the time domain resource assignment information, wherein the transport block size is associated with the number of symbols, wherein the time domain resource assignment information indicates the start symbol of the transmission time interval, wherein the transmission time interval is defined based on the number of symbols from the start symbol, wherein a frequency region for transmission of the PDSCH in the transmission time interval is defined by the specific frequency region for the control information, in the frequency domain, and wherein the specific frequency region depends on a subcarrier spacing (SCS).

5. The method of claim 4, wherein the number of symbols of the transmission time interval is identified based on the time domain resource assignment information.

6. The method of claim 4, wherein the plurality of transmission time intervals comprises at least a transmission time interval of 2 symbols and a transmission time interval of 7 symbols.

7. A user equipment (UE) in a communication system, the UE comprising:

a transceiver; and at least one processor configured to:

receive from a base station system information indicating a specific frequency region for control information including time domain resource assignment information, wherein the specific frequency region is contained within a part of an entire bandwidth in a frequency domain;

receive, from a base station, control information on the specific frequency region, wherein the time domain resource assignment information indicates a transmission time interval for a physical downlink shared channel (PDSCH) among a plurality of transmission time intervals;

identify a transport block size associated with a number of symbols; and receive, from the base station, the PDSCH associated with the transport block size in the number of symbols from a start symbol based on the time domain resource assignment information;

wherein the time domain resource assignment information indicates the start symbol of the transmission time interval, wherein the transmission time interval is defined based on the number of symbols from the start symbol, wherein a frequency region for transmission of the PDSCH in the transmission time interval is defined by the specific frequency region for the control information, in the frequency domain, and wherein the specific frequency region depends on a subcarrier spacing (SCS).

8. The UE of claim 7, wherein the number of symbols of the transmission time interval is identified based on the time domain resource assignment information.

9. The UE of claim 7, wherein the plurality of transmission time intervals comprises at least a transmission time interval of 2 symbols and a transmission time interval of 7 symbols.

10. A base station in a communication system, the base station comprising:

a transceiver; and at least one processor configured to:

identify a transport block size;

transmit, to a user equipment (UE), system information indicating a specific frequency region for control information including time domain resource assignment information, wherein the specific frequency region is contained within a part of an entire bandwidth in a frequency domain, transmit, to the UE, control information on the specific frequency region, wherein the time domain resource assignment information indicates a transmission time interval for a physical downlink shared channel (PDSCH) among a plurality of transmission time intervals; and transmit, to the UE, the PDSCH associated with the transport block size in the number of symbols from a start symbol according to the time domain resource assignment information, wherein the transport block size is associated with the number of symbols, wherein the time domain resource assignment information indicates the start symbol of the transmission time interval, wherein the transmission time interval is defined based on the number of symbols from the start symbol, wherein a frequency region for transmission of the PDSCH in the transmission time interval is defined by the specific frequency region for the control information, in the frequency domain, and wherein the specific frequency region depends on a sub-carrier spacing (SCS).

11. The base station of claim 10, wherein the number of symbols of the transmission time interval is identified based on the time domain resource assignment information.

12. The base station of claim 10, wherein the plurality of transmission time intervals comprises at least a transmission time interval of 2 symbols and a transmission time interval of 7 symbols.

* * * * *